US012553089B2

(12) United States Patent
Markowitz et al.

(10) Patent No.: US 12,553,089 B2
(45) Date of Patent: Feb. 17, 2026

(54) COMPOSITIONS AND METHODS FOR PRESERVING DNA METHYLATION

(71) Applicant: Case Western Reserve University, Cleveland, OH (US)

(72) Inventors: Sanford D. Markowitz, Pepper Pike, OH (US); Helen Moinova, Beachwood, OH (US); David Wurtman, New York, NY (US)

(73) Assignee: Case Western Reserve University, Cleveland, OH (US)

( * ) Notice: Subject to any disclaimer, the term of this patent is extended or adjusted under 35 U.S.C. 154(b) by 0 days.

(21) Appl. No.: 17/613,825

(22) PCT Filed: May 28, 2020

(86) PCT No.: PCT/US2020/034830
§ 371 (c)(1),
(2) Date: Nov. 23, 2021

(87) PCT Pub. No.: WO2020/243240
PCT Pub. Date: Dec. 3, 2020

(65) Prior Publication Data
US 2022/0243281 A1    Aug. 4, 2022

Related U.S. Application Data

(60) Provisional application No. 62/853,392, filed on May 28, 2019.

(51) Int. Cl.
*C12Q 1/6886* (2018.01)
*C12N 15/10* (2006.01)
*C12Q 1/6806* (2018.01)

(52) U.S. Cl.
CPC ....... *C12Q 1/6886* (2013.01); *C12N 15/1003* (2013.01); *C12Q 1/6806* (2013.01); *C12Q 2600/154* (2013.01)

(58) Field of Classification Search
CPC ............ C12Q 1/6806; C12Q 2600/154; C12Q 2523/10; C12Q 2527/125
See application file for complete search history.

(56) References Cited

U.S. PATENT DOCUMENTS

| | | | | |
|---|---|---|---|---|
| 4,499,183 A | * | 2/1985 | Sujansky | G01N 33/56966 436/805 |
| 4,714,606 A | * | 12/1987 | Kass | C12Q 1/04 435/40.51 |
| 4,870,002 A | * | 9/1989 | Kiel | C12N 11/18 435/375 |
| 5,786,146 A | | 7/1998 | Herman et al. | |
| 6,017,704 A | | 1/2000 | Herman et al. | |
| 6,200,756 B1 | | 3/2001 | Herman et al. | |
| 6,265,171 B1 | | 7/2001 | Herman et al. | |
| 6,821,725 B1 | * | 11/2004 | Carrasco | A61K 49/0002 435/7.1 |
| 9,580,754 B2 | | 2/2017 | Markowitz et al. | |
| 2002/0168763 A1 | * | 11/2002 | Yan | A61P 9/00 435/325 |
| 2003/0211452 A1 | | 11/2003 | Vincek et al. | |
| 2004/0115692 A1 | * | 6/2004 | Linder | C12Q 1/6841 435/6.16 |
| 2004/0137551 A1 | * | 7/2004 | Markovic | C12Q 1/42 435/21 |
| 2007/0298431 A1 | | 12/2007 | Mai | |
| 2010/0248250 A1 | * | 9/2010 | Tanigami | G01N 1/38 435/6.17 |
| 2013/0115649 A1 | * | 5/2013 | Shuster | G01N 33/5091 435/29 |
| 2013/0171622 A1 | * | 7/2013 | Luk | C12Q 1/708 435/5 |
| 2014/0193848 A1 | * | 7/2014 | Kaufman | B01L 3/508 422/558 |
| 2014/0296079 A1 | * | 10/2014 | Albitar | C12Q 1/6886 702/20 |
| 2016/0058713 A1 | * | 3/2016 | Singh | A61K 31/7048 514/474 |
| 2016/0083791 A1 | * | 3/2016 | Gillespie | C12Q 1/6886 506/9 |
| 2016/0317132 A1 | | 11/2016 | Markowitz et al. | |
| 2017/0285008 A1 | * | 10/2017 | Nolan | G16B 5/00 |
| 2019/0002837 A1 | * | 1/2019 | Wimmer | C12N 7/04 |
| 2019/0022096 A1 | * | 1/2019 | Willingham | A61K 39/39558 |
| 2019/0309372 A1 | | 10/2019 | Markowitz et al. | |
| 2022/0073994 A1 | | 3/2022 | Szyf et al. | |
| 2024/0417775 A1 | * | 12/2024 | Markowitz | C12Q 1/6806 |

FOREIGN PATENT DOCUMENTS

| | | | | |
|---|---|---|---|---|
| AU | 2016287037 B2 | * | 9/2017 | ........... A01N 1/0205 |
| CA | 2314695 A1 | * | 3/2001 | ........... C12Q 1/6806 |
| CA | 2667790 A1 | * | 6/2008 | ............... A01N 1/00 |

(Continued)

OTHER PUBLICATIONS

Alles et al. BMC Biology. 2017. 15:44. (Year: 2017).*
Ren et al. Scientific Reports. 2018. 8:7780. (Year: 2018).*
Chen et al. J Transl Med. 2018. 16:198. (Year: 2018).*
Enright et al. Biology of Reproduction. 2005. 72:944-948. (Year: 2005).*
Maatouk et al. Development. 2006. 133:3411-3418. (Year: 2006).*
Henning et al. Microorganisms. 2015. 3(1):1-16. (Year: 2015).*
Koide et al. Jpn J Surg. 1997. 27:99-106. (Year: 1997).*
Kap et al. PLoS One. 2011. 6(11):e27704. (Year: 2011).*
Noguchi et al. Pathology International. 1997. 47:685-691. (Year: 1997).*
Cox et al. Experimental and Molecular Pathology. 2006. 80: 183-191. (Year: 2006).*

(Continued)

*Primary Examiner* — Joseph G. Dauner
(74) *Attorney, Agent, or Firm* — Greenberg Traurig, LLP; Chinh H. Pham; Natalie Salem

(57) ABSTRACT

The disclosure provides methods for storage solutions for preserving DNA methylation patterns over a period of time. The disclosure also provides for methods of using methylated DNA stored in such storage solutions.

7 Claims, 14 Drawing Sheets
Specification includes a Sequence Listing.

(56) References Cited

FOREIGN PATENT DOCUMENTS

| | | | | |
|---|---|---|---|---|
| CA | 2741650 | A1 * | 6/2010 | ............ C12Q 1/6804 |
| CA | 3030719 | A1 * | 1/2018 | ............ A61K 45/06 |
| CA | 3043265 | A1 * | 5/2018 | ............ A61P 35/00 |
| CN | 101952460 | A | 1/2011 | |
| CN | 106222142 | A * | 12/2016 | ............ A01K 67/027 |
| CN | 102006882 | B * | 6/2017 | ............ A61P 25/28 |
| CN | 107410287 | A * | 12/2017 | |
| CN | 109757109 | A | 5/2019 | |
| CN | 110859177 | A * | 3/2020 | ............ A01N 1/021 |
| CN | 110859177 | A1 | 3/2020 | |
| DE | 160280 | A5 * | 5/1983 | ............ A61P 37/02 |
| EP | 0212403 | A2 * | 3/1987 | |
| EP | 0266077 | | * 5/1988 | |
| EP | 0344808 | | * 12/1989 | |
| EP | 0846761 | A1 * | 6/1998 | |
| EP | 2218792 | A1 | 8/2010 | |
| FR | 2600342 | | * 12/1987 | |
| FR | 2634211 | | * 1/1990 | |
| JP | 2004511209 | A * | 4/2004 | |
| WO | WO8504587 | | * 10/1985 | |
| WO | WO8706617 | | * 11/1987 | |
| WO | WO8905981 | | * 6/1989 | |
| WO | WO-9305177 | A1 * | 3/1993 | ............ C12Q 1/6827 |
| WO | WO-9523223 | A1 * | 8/1995 | ............ C07H 21/04 |
| WO | WO-9708345 | A1 * | 3/1997 | ............ C07H 21/00 |
| WO | WO-9931273 | A2 * | 6/1999 | ............ A01N 1/021 |
| WO | WO-0102599 | A2 * | 1/2001 | ............ C12Q 1/6841 |
| WO | WO-2004033622 | A2 * | 4/2004 | ............ A01N 1/00 |
| WO | WO-2004047747 | A2 * | 6/2004 | |
| WO | WO-2005040351 | A2 * | 5/2005 | |
| WO | WO-2005121373 | A2 * | 12/2005 | ............ C12Q 1/6813 |
| WO | WO-2006089163 | A2 * | 8/2006 | ............ C12Q 1/6886 |
| WO | WO-2007106425 | A2 * | 9/2007 | ....... G01N 33/57411 |
| WO | WO-2009011892 | A2 * | 1/2009 | ............ A61K 31/727 |
| WO | WO-2010102632 | A2 * | 9/2010 | ............ B01D 63/087 |
| WO | WO-2011146683 | A1 * | 11/2011 | ......... G01N 33/5091 |
| WO | WO-2013050950 | A2 * | 4/2013 | ............ B01D 61/14 |
| WO | WO-2014036040 | A2 * | 3/2014 | ............ G01N 33/50 |
| WO | WO-2014134570 | A1 * | 9/2014 | ....... C07K 14/70578 |
| WO | WO-2017002861 | A1 * | 1/2017 | ............ A01N 1/0205 |
| WO | WO-2017017283 | A1 * | 2/2017 | ............ G01N 1/30 |
| WO | WO-2017205560 | A1 * | 11/2017 | ......... A61K 39/3955 |
| WO | 2018009535 | A1 | 1/2018 | |
| WO | 2018083646 | A2 | 5/2018 | |
| WO | WO-2018098279 | A1 * | 5/2018 | ............ C07K 14/525 |
| WO | WO-2018170359 | A1 * | 9/2018 | ............ A61K 31/131 |
| WO | WO-2018183383 | A1 * | 10/2018 | ............ C12P 21/02 |
| WO | WO-2019016566 | A1 * | 1/2019 | ............ C07D 401/14 |
| WO | WO-2019028122 | A1 * | 2/2019 | ....... G01N 33/48707 |
| WO | WO-2019092718 | A1 * | 5/2019 | ............ A01K 61/10 |
| WO | 2019160059 | A1 | 8/2019 | |
| WO | WO-2020214778 | A1 * | 10/2020 | ............ C12Q 1/6886 |

OTHER PUBLICATIONS

Piskorz et al. Annals of Oncology. 2016. 27:532-539. (Year: 2016).*
Mathieson et al. Am J Clin Pathol. 2016. 146:25-40. (Year: 2016).*
Maraschin et al. Brazilian Dental Journal. 2017. 28(1):82-84. (Year: 2017).*
Yuan et al. Appl Immunohistochem Mol Morphol. 2017. 25(3):221-224. (Year: 2017).*
Srinivasan et al. American Journal of Pathology. 2002. 161(6):1961-1971. (Year: 2002).*
Vincek et al. Laboratory Investigation. 2003. 83(10):1427-1435. (Year: 2003).*
Hologic. Retrieved on Mar. 24, 2025 from the internet: https://www.precisionpath.us/wp-content/uploads/2018/10/THINPREP-PRECERVCYT-SOLUTION.pdf. (Year: 2025).*
Herranz-Jusdado et al., "Comparison of European eel sperm cryopreservation protocols with standardization as a target", Aquaculture, 2019, vol. 498, pp. 539-544, https://doi.org/10.1016/j.aquaculture.2018.09.006.
Altschul et al., "Basic Local Alignment Search Tool," Journal of Molecular Biology, Oct. 5, 1990, vol. 215, No. 3, pp. 403-410.
Altschul et al., "Gapped Blast and PSI-Blast: A New Generation of Protein Database Search Programs.," Nucleic Acids Research, Sep. 1, 1997, vol. 25, No. 17, pp. 3389-3402.
Beaulaurier et al., "Deciphering Bacterial Epigenomes Using Modern Sequencing Technologies," Nature Reviews. Genetics, Mar. 2019, vol. 20, No. 3, pp. 157-172.
Carrillo et al., "The Multiple Sequence Alignment Problem in Biology," SIAM Journal on Applied Mathematics, Oct. 1988, vol. 48, No. 5, pp. 1073-1082.
Devereux et al., "A Comprehensive Set of Sequence Analysis Programs for the VAX," Nucleic Acids Research, Jan. 11, 1984, vol. 12, No. 1 Pt 1, pp. 387-395.
Godhe et al., "PCR Amplification of Microalgal DNA for Sequencing and Species Identification: Studies on Fixatives and Algal Growth Stages," Harmful Algae, Dec. 2002, vol. 1, No. 4, pp. 375-382.
Gonzalgo et al., "Rapid Quantitation of Methylation Differences at Specific Sites Using Methylation-Sensitive Single Nucleotide Primer Extension (Ms-SNuPE)," Nucleic Acids Research, Jun. 1, 1997, vol. 25, No. 12, pp. 2529-2531.
Herman et al., "Methylation-Specific PCR: A Novel PCR Assay for Methylation Status of CpG Islands," Proceedings of the National Academy of Sciences of the United States of America, Sep. 3, 1996, vol. 93, No. 18, pp. 9821-9826.
International Search Report issued for International Application No. PCT /US2020/034830, mailed Aug. 14, 2020 (7 pages).
Kane et al., "Methylation of the HMLH1 Promoter Correlates with Lack of Expression of HMLH1 in Sporadic Colon Tumors and Mismatch Repair-Defective Human Tumor Cell Lines1," Cancer Research, Mar. 1, 1997, vol. 57, No. 5, pp. 808-811.
Moinova et al., Science translational medicine, 2018;10 (424), PMCID:PMC5789768.
"Motility Diagnostic Services | UC Davis Health", Health.ucdavis.edu/internalmedicine/gastro/esophmanometry.html, 2 pages, printed on Apr. 25, 2023. (Year: 2023).
Van Dam et al., "Comparative Evaluation of Fresh, Fixed, and Cryopreserved Solid Tumor Cells for Reliable Flow Cytometry of DNA and Tumor Associated Antigen," Cytometry, 1992, vol. 13, No. 7, pp. 722-729.
Velinov et al., "PCR-Based Methylation Testing for Prader-Willi or Angelman Syndromes Using Archived Fixed-Cell Suspensions," Genetic Testing, 2001, vol. 5, No. 2, pp. 153-155.
Xiong et al., "COBRA: A Sensitive and Quantitative DNA Methylation Assay," Nucleic Acids Research, Jun. 15, 1997, vol. 25, No. 12, pp. 2532-2534.
Zou et al., "Quantification of Methylated Markers with a Multiplex Methylation-Specific Technology," Clinical Chemistry, Feb. 2012, vol. 58, No. 2, pp. 375-383.
Li, P. et al., "DNA Integrity of Polyodon spathula cryopreserved sperm", J. Appl. Ichthyol., 2008, vol. 24, pp. 121-125.
Camacho-Sanchez et al., "Preservation of RNA and DNA from mammal samples under field conditions," Molecular Ecology Resources, Jul. 2013, vol. 13, No. 4, pp. 663-673.
Henning et al., "Identification of Multiple Bacteriocins in *Enterococcus* spp. Using an Enterococcus-Specific Bacteriocin PCR Array," Microorganisms, Feb. 4, 2015, vol. 3, pp. 1-16.
Kapoore et al., "Influence of Washing and Quenching in Profiling the Metabolome of Adherent Mammalian Cells: A Case Study with the Metastatic Breast Cancer Cell Line MDA-MB-231" Analyst, vol. 142, No. 11, pp. 2038-2049, May 5, 2017.
Staunstrup et al., "The Genome-Wide DNA Methylation Profile of Peripheral Blood is not Systematially Changed by Short-Time Storage at Room Temperature" Epigenomes, vol. 1, No. 23, pp. 1-11, 2017.
Extended European Search Report and Opinion in EP Patent Application 20 814 329.7 dated Sep. 22, 2023 (11 pages).
Josipovic et al., "Antagonistic and Synergistic Epigenetic Modulation Using Orthologous CRISPR/dCas9-based Modular System," Nucleic Acids Research, vol. 47, No. 18, pp. 9637-9657, 2019.

(56) References Cited

OTHER PUBLICATIONS

Marinus et al., "DNA Methylation," EcoSal Plus, vol. 6, No. 1, pp. 1-62, May 2014.

* cited by examiner

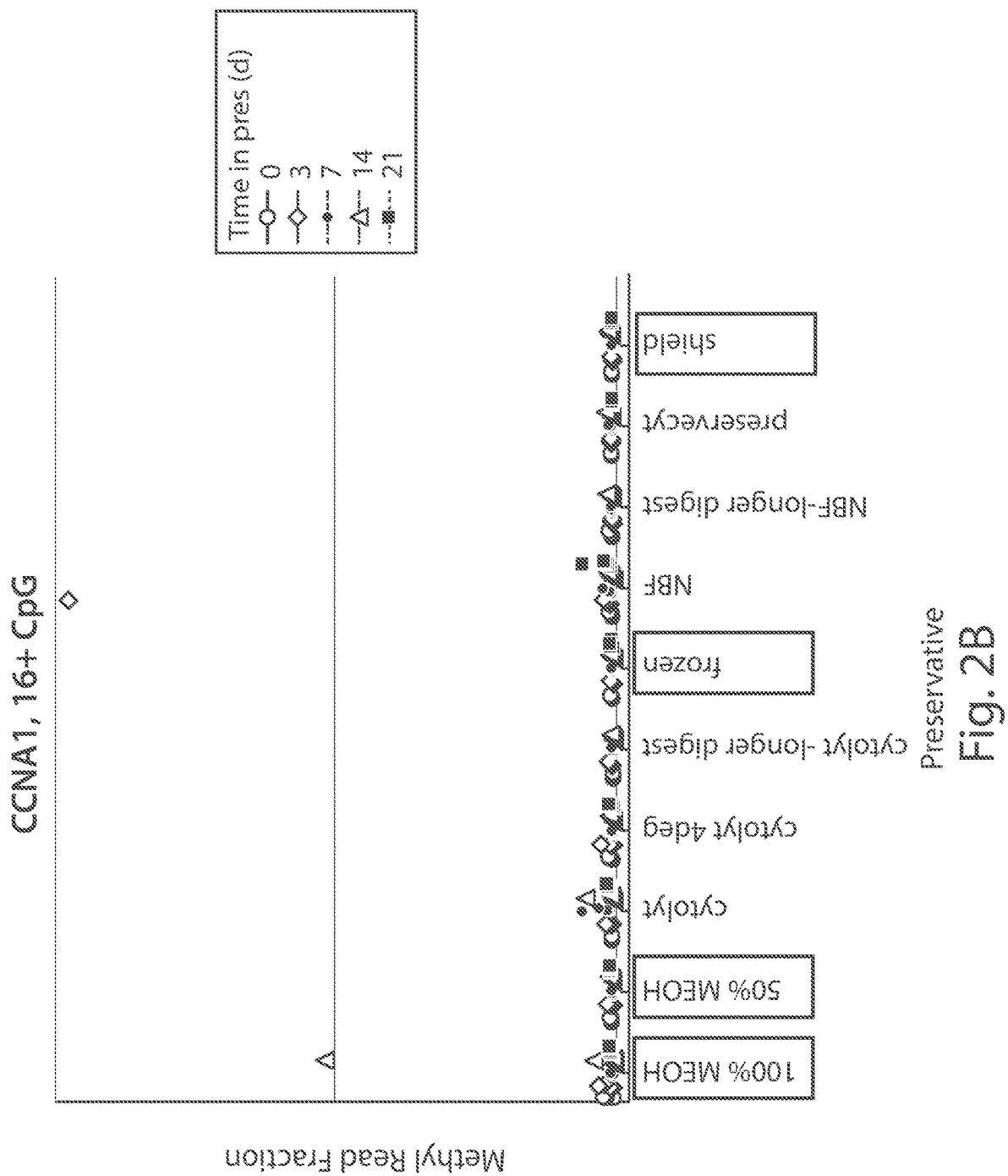

COMPOSITIONS AND METHODS FOR PRESERVING DNA METHYLATION

CROSS-REFERENCE TO RELATED APPLICATIONS

This application is a United States National Stage filing under 35 U.S.C. § 371 of International Application No. PCT/US2020/034830, filed on May 28, 2020 and claims the benefit of priority to U.S. Provisional Patent Application No. 62/853,392, filed May 28, 2019, which application is hereby incorporated by reference in their entirety. International Application No.PCT/US2020/034830 was published under PCT Article 21 (2) in English.

FUNDING

This invention was made with government support under Grant CA152756 awarded by the National Institutes of Health. The government has certain rights in the invention.

SEQUENCE LISTING

The instant application contains a Sequence Listing which has been submitted via EFS-Weband is hereby incorporated by reference in its entirety. Said ASCII copy, created on Nov. 23, 2021, is named 1848493-0002-099-301_SL.TXT and is 26,015 bytes in size.

BACKGROUND

Cytosine methylation is frequently referred to as being the "fifth base" in DNA of eukaryotic genomes. Altered patterns of DNA cytosine methylation are recognized as an accompaniment, a biomarker, and a sometimes causal element in multiple human disease states, including various metaplasias, neoplasias and cancers. However, while DNA polynucleotide sequences are stable at room temperature for extended periods of time, methylation patterns are more likely to deviate from original methylation patterns when stored at room temperature for an extended period of time. As such, there is a need for new storage conditions for preserving DNA methylation patterns for prolonged periods of time.

SUMMARY OF THE DISCLOSURE

In some embodiments, the disclosure provides for a composition comprising a biological sample comprising a methylated DNA sequence; and a storage solution comprising methanol; wherein methylation patterns of the methylated DNA sequence are preserved. In some embodiments, the methylation pattern is preserved for at least 2 weeks. In some embodiments, the methylation pattern is preserved at room temperature. In some embodiments, the methylation pattern of the biological sample in the storage solution is preserved by at least 60% in comparison to the methylation pattern in the biological sample prior to storage. In some embodiments, the methylation pattern of the biological sample in the storage solution is preserved by at least 65% in comparison to the methylation pattern in the biological sample prior to storage. In some embodiments, the methylation pattern of the biological sample in the storage solution is preserved by at least 70% in comparison to the methylation pattern in the biological sample prior to storage. In some embodiments, the methylation pattern of the biological sample in the storage solution is preserved by at least 75% in comparison to the methylation pattern in the biological sample prior to storage. In some embodiments, the methylation pattern of the biological sample in the storage solution is preserved by at least 80% in comparison to the methylation pattern in the biological sample prior to storage. In some embodiments, the methylation pattern of the biological sample in the storage solution is preserved by at least 85% in comparison to the methylation pattern in the biological sample prior to storage. In some embodiments, the methylation pattern of the biological sample in the storage solution is preserved by at least 90% in comparison to the methylation pattern in the biological sample prior to storage. In some embodiments, the methylation pattern of the biological sample in the storage solution is preserved by at least 95% in comparison to the methylation pattern in the biological sample prior to storage. In some embodiments, the sample is a human biological sample. In some embodiments, the biological sample is a sample from any of: gastrointestinal tract, aerodigestive tract, respiratory tract, genitourinary tract, or a body fluid. In certain such embodiments, the body fluid is any of: blood, urine, sputum, saliva, stool, bile, pancreatic juice, nasal secretions, tears, semen, vaginal secretions, cerebrospinal fluid, pleural fluid, peritoneal fluid, gastric juice, pericardial fluid, sweat, lymph, cyst fluid, pancreatic cyst fluid, synovial fluid, joint fluid, menstrual fluid, endometrial washing, breast aspirate, or amniotic fluid. In some embodiments, the biological sample is a sample from any of: esophagus, stomach, colon, small intestine, pancreas, liver, oral cavity, oropharynx, trachea, bronchial tree, lung, or breast. In some embodiments, the biological sample is an esophageal biological sample. In some embodiments, the storage solution comprises 100% methanol. In some embodiments, the storage solution comprises 10% to 100% methanol admixed with water. In some embodiments, the storage solution comprises 10% to 95% methanol admixed with water. In some embodiments, the storage solution comprises 10-90% methanol admixed with water. In some embodiments, the storage solution comprises 15-90% methanol admixed with water. In some embodiments, the storage solution comprises 20-90% methanol admixed with water. In some embodiments, the storage solution comprises 25-90% methanol admixed with water. In some embodiments, the storage solution comprises 30-90% methanol admixed with water. In some embodiments, the storage solution comprises 30-85% methanol admixed with water. In some embodiments, the storage solution comprises 30-80% methanol admixed with water. In some embodiments, the storage solution comprises 35-80% methanol admixed with water. In some embodiments, the storage solution comprises 35-75% methanol admixed with water. In some embodiments, the storage solution comprises 35-70% methanol admixed with water. In some embodiments, the storage solution comprises 40-70% methanol admixed with water. In some embodiments, the storage solution comprises 40-65% methanol admixed with water. In some embodiments, the storage solution comprises 40-60% methanol admixed with water. In some embodiments, the storage solution comprises 40-55% methanol admixed with water. In some embodiments, the storage solution comprises 45-55% methanol admixed with water. In some embodiments, the storage solution comprises 50% methanol admixed with water. In some embodiments, the storage solution consists essentially of 100% methanol. In some embodiments, the storage solution consists essentially of 10% to 100% methanol admixed with water. In some embodiments, the storage solution consists essentially of 10% to 95% methanol admixed with water. In some embodiments, the storage solution consists essentially of 10-90% methanol admixed with water. In some embodiments, the storage solution consists essentially of 15-90% methanol admixed with water. In some embodiments, the storage solution consists essentially of 20-90% methanol admixed with water. In some embodiments, the storage solution consists essentially of 25-90% methanol admixed with water. In some embodiments, the storage solution consists essentially of 30-90% methanol admixed with water. In some embodiments, the storage solution consists essentially of 30-85% methanol admixed with water. In some embodiments, the storage solution consists essentially of 30-80% methanol admixed with water. In some embodiments, the storage solution consists essentially of 35-80% methanol admixed with water. In some embodiments, the storage solution consists essentially of 35-75% methanol admixed with water. In some embodiments, the storage solution consists essentially of 35-70% methanol admixed with water. In some embodiments, the storage solution consists essentially of 40-70% methanol admixed with water. In some embodiments, the storage solution consists essentially of 40-65% methanol admixed with water. In some embodiments, the storage solution consists essentially of 40-60% methanol admixed with water. In some embodiments, the storage solution consists essentially of 40-55% methanol admixed with water. In some embodiments, the storage solution consists essentially of 45-55% methanol admixed with water. In some embodiments, the storage solution consists essentially of 50% methanol admixed with water. In some embodiments, the storage solution consists of 100% methanol. In some embodiments, the storage solution consists of 10% to 100% methanol admixed with water. In some embodiments, the storage solution consists of 10% to 95% methanol admixed with water. In some embodiments, the storage solution consists of 10-90% methanol admixed with water. In some embodiments, the storage solution consists of 15-90% methanol admixed with water. In some embodiments, the storage solution consists of 20-90% methanol admixed with water. In some embodiments, the storage solution consists of 25-90% methanol admixed with water. In some embodiments, the storage solution consists of 30-90% methanol admixed with water. In some embodiments, the storage solution consists of 30-85% methanol admixed with water. In some embodiments, the storage solution consists of 30-80% methanol admixed with water. In some embodiments, the storage solution consists of 35-80% methanol admixed with water. In some embodiments, the storage solution consists of 35-75% methanol admixed with water. In some embodiments, the storage solution consists of 35-70% methanol admixed with water. In some embodiments, the storage solution consists of 40-70% methanol admixed with water. In some embodiments, the storage solution consists of 40-65% methanol admixed with water. In some embodiments, the storage solution consists of 40-60% methanol admixed with water. In some embodiments, the storage solution consists of 40-55% methanol admixed with water. In some embodiments, the storage solution consists of 45-55% methanol admixed with water. In some embodiments, the storage solution consists of 50% methanol admixed with water. In some embodiments, the methanol is peroxide free or at a level less than or equal to 0.001%. In some embodiments, the water is purified by distillation, or ultrafiltration, or reverse osmosis. In some embodiments, the water is free of DNAse and/or RNAse activity. In some embodiments, the methylated DNA sequence comprises a polynucleotide sequence that is at least 60%, 65%, 70%, 75%, 80%, 85%, 90%, 91%, 92%, 93%, 94%, 95%, 96%, 97%, 98%, 99%, or 100% identical to any of the nucleotide sequences of vimentin, CCNA1, Up10, Up35-1, Up35-2, FERIL4, VAV3, DOCK10, ADCY1, BMP3, CD1D, ELMO1, ELOVL2, LRRC4, NDRG4, SFMBT2, ST8SIA1, TSPYL5, ZNF568, ZNF569, ZNF610, ZNF671, ZNF682, CDKN2A, DIO3, and HUNK genes, or any fragments and/or complements thereof. In some embodiments, the methylated DNA sequence comprises a polynucleotide sequence that is at least 60%, 65%, 70%, 75%, 80%, 85%, 90%, 91%, 92%, 93%, 94%, 95%, 96%, 97%, 98%, 99%, or 100% identical to any one of SEQ ID NOs: 1-45, or any fragments and/or complements thereof. In some embodiments, the methylated DNA patterns are preserved for at least 1 hour, 2 hours, 3 hours, 4 hours, 5 hours, 6 hours, 7 hours, 10 hours, 12 hours, 16 hours, 20 hours, 24 hours, 2 days, 3 days, 4 days, 5 days, 6 days, 7 days, 10 days, two weeks, 15 days, 16 days, 17 days, 18 days, 19 days, 20 days, 21 days, 22 days, 23 days, 24 days, 25 days, 26 days, 27 days, 28 days, 29 days, 30 days, 5 weeks, 6 weeks, 7 weeks, 8 weeks, 9 weeks, 10 weeks, 11 weeks, 12 weeks, 4 months, 5 months, 6 months, 7 months, 8 months, 9 months, 10 months, 11 months, 1 year, 18 months or 2 years in the composition when stored at room temperature (23° C.). In some embodiments, the methylated DNA patterns are preserved for at least 1 hour, 2 hours, 3 hours, 4 hours, 5 hours, 6 hours, 7 hours, 10 hours, 12 hours, 16 hours, 20 hours, 24 hours, 2 days, 3 days, 4 days, 5 days, 6 days, 7 days, 10 days, two weeks, 15 days, 16 days, 17 days, 18 days, 19 days, 20 days, 21 days, 22 days, 23 days, 24 days, 25 days, 26 days, 27 days, 28 days, 29 days, 30 days, 5 weeks, 6 weeks, 7 weeks, 8 weeks, 9 weeks, 10 weeks, 11 weeks, 12 weeks, 4 months, 5 months, 6 months, 7 months, 8 months, 9 months, 10 months, 11 months, 1 year, 18 months or 2 years in the composition when stored at 4° C. In some embodiments, the methylated DNA patterns are preserved for at least 1 hour, 2 hours, 3 hours, 4 hours, 5 hours, 6 hours, 7 hours, 10 hours, 12 hours, 16 hours, 20 hours, 24 hours, 2 days, 3 days, 4 days, 5 days, 6 days, 7 days, 10 days, two weeks, 17 days, 3 weeks, 25 days, 30 days, 5 weeks, 6 weeks, 7 weeks, 8 weeks, 9 weeks, 10 weeks, 11 weeks, 12 weeks, 4 months, 5 months, 6 months, 7 months, 8 months, 9 months, 10 months, 11 months, 1 year, 18 months or 2 years in the composition when stored at temperatures ranging between −30° C. to 50° C. In some embodiments, the methylated DNA patterns are preserved for at least 1 hour, 2 hours, 3 hours, 4 hours, 5 hours, 6 hours, 7 hours, 10 hours, 12 hours, 16 hours, 20 hours, 24 hours, 2 days, 3 days, 4 days, 5 days, 6 days, 7 days, 10 days, two weeks, 15 days, 16 days, 17 days, 18 days, 19 days, 20 days, 21 days, 22 days, 23 days, 24 days, 25 days, 26 days, 27 days, 28 days, 29 days, 30 days, 5 weeks, 6 weeks, 7 weeks, 8 weeks, 9 weeks, 10 weeks, 11 weeks, 12 weeks, 4 months, 5 months, 6 months, 7 months, 8 months, 9 months, 10 months, 11 months, 1 year, 18 months or 2 years in the composition when stored at temperatures ranging between −10° C. to 30° C.

In some embodiments, the disclosure provides for a method of preserving the methylation pattern of methylated DNA molecule in a biological sample, comprising treating the biological sample with a storage solution, wherein the storage solution comprises methanol. In some embodiments, the methylation pattern is preserved at room temperature. In some embodiments, the methylation pattern is preserved for at least two weeks. In some embodiments, the methylation pattern of the biological sample in the storage solution is preserved by at least 60% in comparison to the methylation pattern in the biological sample prior to storage. In some embodiments, the methylation pattern of the biological sample in the storage solution is preserved by at least 65% in comparison to the methylation pattern in the biological sample prior to storage. In some embodiments, the methylation pattern of the biological sample in the storage solution is preserved by at least 70% in comparison to the methylation pattern in the biological sample prior to storage. In some embodiments, the methylation pattern of the biological sample in the storage solution is preserved by at least 75% in comparison to the methylation pattern in the biological sample prior to storage. In some embodiments, the methylation pattern of the biological sample in the storage solution is preserved by at least 80% in comparison to the methylation pattern in the biological sample prior to storage. In some embodiments, the methylation pattern of the biological sample in the storage solution is preserved by at least 85% in comparison to the methylation pattern in the biological sample prior to storage. In some embodiments, the methylation pattern of the biological sample in the storage solution is preserved by at least 90% in comparison to the methylation pattern in the biological sample prior to storage. In some embodiments, the methylation pattern of the biological sample in the storage solution is preserved by at least 95% in comparison to the methylation pattern in the biological sample prior to storage. In some embodiments, the biological sample is stored in the storage solution. In some embodiments, the sample is from a human tissue or body fluid. In some embodiments, the sample is from any of: gastrointestinal tract, aerodigestive tract, respiratory tract, genitourinary tract, or a body fluid. In certain such embodiments, the body fluid is any of: blood, urine, sputum, saliva, stool, bile, pancreatic juice, nasal secretions, tears, semen, vaginal secretions, cerebrospinal fluid, pleural fluid, peritoneal fluid, gastric juice, pericardial fluid, sweat, lymph, cyst fluid, pancreatic cyst fluid, synovial fluid, joint fluid, menstrual fluid, endometrial washing, breast aspirate, or amniotic fluid. In some embodiments, the sample is from any of: esophagus, stomach, colon, small intestine, pancreas, liver, oral cavity, oropharynx, trachea, bronchial tree, lung, or breast. In some embodiments, the sample is an esophageal sample. In some embodiments, the storage solution comprises 100% methanol. In some embodiments, the storage solution comprises 10% to 100% methanol admixed with water. In some embodiments, the storage solution comprises 10% to 95% methanol admixed with water. In some embodiments, the storage solution comprises 10-90% methanol admixed with water. In some embodiments, the storage solution comprises 15-90% methanol admixed with water. In some embodiments, the storage solution comprises 20-90% methanol admixed with water. In some embodiments, the storage solution comprises 25-90% methanol admixed with water. In some embodiments, the storage solution comprises 30-90% methanol admixed with water. In some embodiments, the storage solution comprises 30-85% methanol admixed with water. In some embodiments, the storage solution comprises 30-80% methanol admixed with water. In some embodiments, the storage solution comprises 35-80% methanol admixed with water. In some embodiments, the storage solution comprises 35-75% methanol admixed with water. In some embodiments, the storage solution comprises 35-70% methanol admixed with water. In some embodiments, the storage solution comprises 40-70% methanol admixed with water. In some embodiments, the storage solution comprises 40-65% methanol admixed with water. In some embodiments, the storage solution comprises 40-60% methanol admixed with water. In some embodiments, the storage solution comprises 40-55% methanol admixed with water. In some embodiments, the storage solution comprises 45-55% methanol admixed with water. In some embodiments, the storage solution comprises 50% methanol admixed with water. In some embodiments, the storage solution consists essentially of 100% methanol. In some embodiments, the storage solution consists essentially of 10% to 100% methanol admixed with water. In some embodiments, the storage solution consists essentially of 10% to 95% methanol admixed with water. In some embodiments, the storage solution consists essentially of 10-90% methanol admixed with water. In some embodiments, the storage solution consists essentially of 15-90% methanol admixed with water. In some embodiments, the storage solution consists essentially of 20-90% methanol admixed with water. In some embodiments, the storage solution consists essentially of 25-90% methanol admixed with water. In some embodiments, the storage solution consists essentially of 30-90% methanol admixed with water. In some embodiments, the storage solution consists essentially of 30-85% methanol admixed with water. In some embodiments, the storage solution consists essentially of 30-80% methanol admixed with water. In some embodiments, the storage solution consists essentially of 35-80% methanol admixed with water. In some embodiments, the storage solution consists essentially of 35-75% methanol admixed with water. In some embodiments, the storage solution consists essentially of 35-70% methanol admixed with water. In some embodiments, the storage solution consists essentially of 40-70% methanol admixed with water. In some embodiments, the storage solution consists essentially of 40-65% methanol admixed with water. In some embodiments, the storage solution consists essentially of 40-60% methanol admixed with water. In some embodiments, the storage solution consists essentially of 40-55% methanol admixed with water. In some embodiments, the storage solution consists essentially of 45-55% methanol admixed with water. In some embodiments, the storage solution consists essentially of 50% methanol admixed with water. In some embodiments, the storage solution consists of 100% methanol. In some embodiments, the storage solution consists of 10% to 100% methanol admixed with water. In some embodiments, the storage solution consists of 10% to 95% methanol admixed with water. In some embodiments, the storage solution consists of 10-90% methanol admixed with water. In some embodiments, the storage solution consists of 15-90% methanol admixed with water. In some embodiments, the storage solution consists of 20-90% methanol admixed with water. In some embodiments, the storage solution consists of 25-90% methanol admixed with water. In some embodiments, the storage solution consists of 30-90% methanol admixed with water. In some embodiments, the storage solution consists of 30-85% methanol admixed with water. In some embodiments, the storage solution consists of 30-80% methanol admixed with water. In some embodiments, the storage solution consists of 35-80% methanol admixed with water. In some embodiments, the storage solution consists of 35-75% methanol admixed with water. In some embodiments, the storage solution consists of 35-70% methanol admixed with water. In some embodiments, the storage solution consists of 40-70% methanol admixed with water. In some embodiments, the storage solution consists of 40-65% methanol admixed with water. In some embodiments, the storage solution consists of 40-60% methanol admixed with water. In some embodiments, the storage solution consists of 40-55% methanol admixed with water. In some embodiments, the storage solution consists of 45-55% methanol admixed with water. In some embodiments, the storage solution consists of 50% methanol admixed with water. In some embodiments, the methanol is peroxide free or at a level less than or equal to 0.001%. In some embodiments, the water is purified by distillation, or ultrafiltration, or reverse osmosis. In some embodiments, the water is free of DNAse and/or RNAse activity. In some embodiments, the disclosure provides for a method of preserving the DNA methylation pattern of a biological sample in which the biological sample is treated with and/or stored in DNA/RNA Shield™. In some embodiments, the pattern of DNA methylation is assayed within a differentially methylated domain of the vimentin gene or a differentially methylated domain of the CCNA1 gene. In some embodiments, the differentially methylated domain of vimentin comprises a nucleotide sequence that is at least 60%, 65%, 70%, 75%, 80%, 85%, 90%, 91%, 92%, 93%, 94%, 95%, 96%, 97%, 98%, 99%, or 100% identical to any one of SEQ ID NOs: 1-5, or SEQ ID NO: 18 corresponding to chr10: 17,270,838-17,271,717, or complements and/or fragments thereof. In some embodiments, the differentially methylated domain of vimentin comprises a nucleotide sequence that is at least 60%, 65%, 70%, 75%, 80%, 85%, 90%, 91%, 92%, 93%, 94%, 95%, 96%, 97%, 98%, 99%, or 100% identical to any one of SEQ ID NOs: 1-5, a complement thereof, or a fragment thereof. In some embodiments, the differentially methylated domain of CCNA1 comprises a nucleotide sequence that is at least 60%, 65%, 70%, 75%, 80%, 85%, 90%, 91%, 92%, 93%, 94%, 95%, 96%, 97%, 98%, 99%, or 100% identical to SEQ ID NO: 6 or 7, a complement thereof, or a fragment thereof. In some embodiments, the pattern of DNA methylation is assayed within a differentially methylated domain of an Up10, Up35-1 and/or Up35-2 nucleotide sequence. In some embodiments, the differentially methylated domain of Up10 comprises a nucleotide sequence that is at least 60%, 65%, 70%, 75%, 80%, 85%, 90%, 91%, 92%, 93%, 94%, 95%, 96%, 97%, 98%, 99%, or 100% identical to any one of SEQ ID NOs: 8-11, a complement thereof, or a fragment thereof. In some embodiments, the differentially methylated domain of Up35-1 comprises a nucleotide sequence that is at least 60%, 65%, 70%, 75%, 80%, 85%, 90%, 91%, 92%, 93%, 94%, 95%, 96%, 97%, 98%, 99%, or 100% identical to any one of SEQ ID NOs: 12-15, a complement thereof, or a fragment thereof. In some embodiments, the differentially methylated domain of Up35-2 comprises a nucleotide sequence that is at least 60%, 65%, 70%, 75%, 80%, 85%, 90%, 91%, 92%, 93%, 94%, 95%, 96%, 97%, 98%, 99%, or 100% identical to any one of SEQ ID NOs: 12-13 and 16-17, a complement thereof, or a fragment thereof. In some embodiments, the nucleotide sequence, the complement, or the fragment is at least 20 nucleotides in length. In some embodiments, the pattern of DNA methylation is assayed within a differentially methylated domain associated with a DNA molecule comprising a nucleotide sequence that is at least 60%, 65%, 70%, 75%, 80%, 85%, 90%, 91%, 92%, 93%, 94%, 95%, 96%, 97%, 98%, 99%, or 100% identical to any of the nucleotide sequences of the vimentin, CCNA1, FERIL4, VAV3, DOCK10, ADCY1, BMP3, CD1D, ELMO1, ELOVL2, LRRC4, NDRG4, SFMBT2, ST8SIA1, TSPYL5, ZNF568, ZNF569, ZNF610, ZNF671, ZNF682, CDKN2A, DIO3, and/or HUNK genes, or any fragments and/or complements thereof. In some embodiments, the differentially methylated domains are associated with a DNA molecule comprising a nucleotide sequence that is at least 60%, 65%, 70%, 75%, 80%, 85%, 90%, 91%, 92%, 93%, 94%, 95%, 96%, 97%, 98%, 99%, or 100% identical to any of the nucleotide sequences specified by genomic coordinates:

| Gene name | Chromosome No. | DMR Start and End Position (hg19) | DMR2 | DMR3 | DMR4 |
|---|---|---|---|---|---|
| ADCY1 | 7 | 45613877-45614572 | | | |
| BMP3 | 4 | 81952348-81952402 | 81031173-81031262 | | |
| CD1D | 1 | 158150797-158151205 | | | |
| CDKN2A | 9 | 21974710-21974763 | 21975053-21975199 | | |
| DIO3 | 14 | 102026104-102026204 | | | |
| DOCK10 | 2 | 225907226-225907322 | | | |
| ELMO1 | 7 | 37487755-37488477 | | | |
| ELOVL2 | 6 | 11044395-11044834 | | | |
| FER1L4 | 20 | 34189488-34189693 | 34189488-34189693 | | |
| HUNK | 21 | 33246580-33246650 | | | |
| LRRC4 | 7 | 127671993-127672310 | | | |
| NDRG4 | 16 | 58497395-58497451 | | | |
| SFMBT2 | 10 | 7452885-7452956 | 7451771-7451869 | 7452029-7452452 | 7450242-7450831 |
| ST8SIA1 | 12 | 22487528-22487620 | | | |
| TSPYL5 | 8 | 98289858-98290220 | | | |
| VAV3 | 1 | 108507608-108507679 | | | |
| ZNF568 | 19 | 37407197-37407284 | 37407197-37407365 | | |
| ZNF569 | 19 | 37957760-37958046 | | | |
| ZNF610 | 19 | 52839503-52840013 | | | |
| ZNF671 | 19 | 58238810-58238955 | | | |
| ZNF682 | 19 | 20149796-20149923 | | | | the complements thereof, or the fragments thereof. In some embodiments, the differentially methylated domain of ADCY1 comprises a nucleotide sequence that is at least 60%, 65%, 70%, 75%, 80%, 85%, 90%, 91%, 92%, 93%, 94%, 95%, 96%, 97%, 98%, 99%, or 100% identical to SEQ ID NO: 19, a complement thereof, or a fragment thereof. In some embodiments, the differentially methylated domain of BMP3 comprises a nucleotide sequence that is at least 60%, 65%, 70%, 75%, 80%, 85%, 90%, 91%, 92%, 93%, 94%, 95%, 96%, 97%, 98%, 99%, or 100% identical to SEQ ID NO: 20 or 21, a complement thereof, or a fragment thereof. In some embodiments, the differentially methylated domain of CD1D comprises a nucleotide sequence that is at least 60%, 65%, 70%, 75%, 80%, 85%, 90%, 91%, 92%, 93%, 94%, 95%, 96%, 97%, 98%, 99%, or 100% identical to SEQ ID NO: 22, a complement thereof, or a fragment thereof. In some embodiments, the differentially methylated domain of CDKN2A comprises a nucleotide sequence that is at least 60%, 65%, 70%, 75%, 80%, 85%, 90%, 91%, 92%, 93%, 94%, 95%, 96%, 97%, 98%, 99%, or 100% identical to SEQ ID NO: 23 or 24, a complement thereof, or a fragment thereof. In some embodiments, the differentially methylated domain of DIO3 comprises a nucleotide sequence that is at least 60%, 65%, 70%, 75%, 80%, 85%, 90%, 91%, 92%, 93%, 94%, 95%, 96%, 97%, 98%, 99%, or 100% identical to SEQ ID NO: 25, a complement thereof, or a fragment thereof. In some embodiments, the differentially methylated domain of DOCK10 comprises a nucleotide sequence that is at least 60%, 65%, 70%, 75%, 80%, 85%, 90%, 91%, 92%, 93%, 94%, 95%, 96%, 97%, 98%, 99%, or 100% identical to SEQ ID NO: 26, a complement thereof, or a fragment thereof. In some embodiments, the differentially methylated domain of ELMO1 comprises a nucleotide sequence that is at least 60%, 65%, 70%, 75%, 80%, 85%, 90%, 91%, 92%, 93%, 94%, 95%, 96%, 97%, 98%, 99%, or 100% identical to SEQ ID NO: 27, a complement thereof, or a fragment thereof. In some embodiments, the differentially methylated domain of ELOV12 comprises a nucleotide sequence that is at least 60%, 65%, 70%, 75%, 80%, 85%, 90%, 91%, 92%, 93%, 94%, 95%, 96%, 97%, 98%, 99%, or 100% identical to SEQ ID NO: 28, a complement thereof, or a fragment thereof. In some embodiments, the differentially methylated domain of FER1L4 comprises a nucleotide sequence that is at least 60%, 65%, 70%, 75%, 80%, 85%, 90%, 91%, 92%, 93%, 94%, 95%, 96%, 97%, 98%, 99%, or 100% identical to SEQ ID NO: 29, a complement thereof, or a fragment thereof. In some embodiments, the differentially methylated domain of HUNK comprises a nucleotide sequence that is at least 60%, 65%, 70%, 75%, 80%, 85%, 90%, 91%, 92%, 93%, 94%, 95%, 96%, 97%, 98%, 99%, or 100% identical to SEQ ID NO: 30, a complement thereof, or a fragment thereof. In some embodiments, the differentially methylated domain of LRRC4 comprises a nucleotide sequence that is at least 60%, 65%, 70%, 75%, 80%, 85%, 90%, 91%, 92%, 93%, 94%, 95%, 96%, 97%, 98%, 99%, or 100% identical to SEQ ID NO: 31, a complement thereof, or a fragment thereof. In some embodiments, the differentially methylated domain of NDRG4 comprises a nucleotide sequence that is at least 60%, 65%, 70%, 75%, 80%, 85%, 90%, 91%, 92%, 93%, 94%, 95%, 96%, 97%, 98%, 99%, or 100% identical to SEQ ID NO: 32, a complement thereof, or a fragment thereof. In some embodiments, the differentially methylated domain of SFMBT2 comprises a nucleotide sequence that is at least 60%, 65%, 70%, 75%, 80%, 85%, 90%, 91%, 92%, 93%, 94%, 95%, 96%, 97%, 98%, 99%, or 100% identical to any one of SEQ ID NOs: 33, 34, 35 or 36, a complement thereof, or a fragment thereof. In some embodiments, the differentially methylated domain of ST8S1A1 comprises a nucleotide sequence that is at least 60%, 65%, 70%, 75%, 80%, 85%, 90%, 91%, 92%, 93%, 94%, 95%, 96%, 97%, 98%, 99%, or 100% identical to SEQ ID NO: 37, a complement thereof, or a fragment thereof. In some embodiments, the differentially methylated domain of TSPYL5 comprises a nucleotide sequence that is at least 60%, 65%, 70%, 75%, 80%, 85%, 90%, 91%, 92%, 93%, 94%, 95%, 96%, 97%, 98%, 99%, or 100% identical to SEQ ID NO: 38, a complement thereof, or a fragment thereof. In some embodiments, the differentially methylated domain of VAV3 comprises a nucleotide sequence that is at least 60%, 65%, 70%, 75%, 80%, 85%, 90%, 91%, 92%, 93%, 94%, 95%, 96%, 97%, 98%, 99%, or 100% identical to SEQ ID NO: 39, a complement thereof, or a fragment thereof. In some embodiments, the differentially methylated domain of ZNF568 comprises a nucleotide sequence that is at least 60%, 65%, 70%, 75%, 80%, 85%, 90%, 91%, 92%, 93%, 94%, 95%, 96%, 97%, 98%, 99%, or 100% identical to SEQ ID NO: 40 or 41, a complement thereof, or a fragment thereof. In some embodiments, the differentially methylated domain of ZNF569 comprises a nucleotide sequence that is at least 60%, 65%, 70%, 75%, 80%, 85%, 90%, 91%, 92%, 93%, 94%, 95%, 96%, 97%, 98%, 99%, or 100% identical to SEQ ID NO: 42, a complement thereof, or a fragment thereof. In some embodiments, the differentially methylated domain of ZNF610 comprises a nucleotide sequence that is at least 60%, 65%, 70%, 75%, 80%, 85%, 90%, 91%, 92%, 93%, 94%, 95%, 96%, 97%, 98%, 99%, or 100% identical to SEQ ID NO: 43, a complement thereof, or a fragment thereof. In some embodiments, the differentially methylated domain of ZNF671 comprises a nucleotide sequence that is at least 60%, 65%, 70%, 75%, 80%, 85%, 90%, 91%, 92%, 93%, 94%, 95%, 96%, 97%, 98%, 99%, or 100% identical to SEQ ID NO: 44, a complement thereof, or a fragment thereof. In some embodiments, the differentially methylated domain of ZNF682 comprises a nucleotide sequence that is at least 60%, 65%, 70%, 75%, 80%, 85%, 90%, 91%, 92%, 93%, 94%, 95%, 96%, 97%, 98%, 99%, or 100% identical to SEQ ID NO: 45, a complement thereof, or a fragment thereof. In some embodiments, such nucleotide sequence, complements, or such fragments are at least 20 nucleotides in length. In some embodiments, the pattern of DNA methylation is assayed by a step that includes treatment of the DNA with a bisulfite compound that converts cytosine bases to uracil. In some embodiments, the methylated DNA patterns are preserved for at least 1 hour, 2 hours, 3 hours, 4 hours, 5 hours, 6 hours, 7 hours, 10 hours, 12 hours, 16 hours, 20 hours, 24 hours, 2 days, 3 days, 4 days, 5 days, 6 days, 7 days, 10 days, two weeks, 15 days, 16 days, 17 days, 18 days, 19 days, 20 days, 21 days, 22 days, 23 days, 24 days, 25 days, 26 days, 27 days, 28 days, 29 days, 30 days, 5 weeks, 6 weeks, 7 weeks, 8 weeks, 9 weeks, 10 weeks, 11 weeks, 12 weeks, 4 months, 5 months, 6 months, 7 months, 8 months, 9 months, 10 months, 11 months, 1 year, 18 months or 2 years in the composition when stored at room temperature (23° C.). In some embodiments, the methylated DNA patterns are preserved for at least 1 hour, 2 hours, 3 hours, 4 hours, 5 hours, 6 hours, 7 hours, 10 hours, 12 hours, 16 hours, 20 hours, 24 hours, 2 days, 3 days, 4 days, 5 days, 6 days, 7 days, 10 days, two weeks, 15 days, 16 days, 17 days, 18 days, 19 days, 20 days, 21 days, 22 days, 23 days, 24 days, 25 days, 26 days, 27 days, 28 days, 29 days, 30 days, 5 weeks, 6 weeks, 7 weeks, 8 weeks, 9 weeks, 10 weeks, 11 weeks, 12 weeks, 4 months, 5 months, 6 months, 7 months, 8 months, 9 months, 10 months, 11 months, 1 year, 18 months or 2 years in the composition when stored at 4° C. In some embodiments, the methylated DNA patterns are preserved for at least 1 hour, 2 hours, 3 hours, 4 hours, 5 hours, 6 hours, 7 hours, 10 hours, 12 hours, 16 hours, 20 hours, 24 hours, 2 days, 3 days, 4 days, 5 days, 6 days, 7 days, 10 days, two weeks, 15 days, 16 days, 17 days, 18 days, 19 days, 20 days, 21 days, 22 days, 23 days, 24 days, 25 days, 26 days, 27 days, 28 days, 29 days, 30 days, 5 weeks, 6 weeks, 7 weeks, 8 weeks, 9 weeks, 10 weeks, 11 weeks, 12 weeks, 4 months, 5 months, 6 months, 7 months, 8 months, 9 months, 10 months, 11 months, 1 year, 18 months or 2 years in the composition at temperatures ranging between-30° C. to 50° C. In some embodiments, the methylated DNA patterns are preserved for at least 1 hour, 2 hours, 3 hours, 4 hours, 5 hours, 6 hours, 7 hours, 10 hours, 12 hours, 16 hours, 20 hours, 24 hours, 2 days, 3 days, 4 days, 5 days, 6 days, 7 days, 10 days, two weeks, 15 days, 16 days, 17 days, 18 days, 19 days, 20 days, 21 days, 22 days, 23 days, 24 days, 25 days, 26 days, 27 days, 28 days, 29 days, 30 days, 5 weeks, 6 weeks, 7 weeks, 8 weeks, 9 weeks, 10 weeks, 11 weeks, 12 weeks, 4 months, 5 months, 6 months, 7 months, 8 months, 9 months, 10 months, 11 months, 1 year, 18 months or 2 years in the composition at temperatures ranging between-20° C. to 50° C. In some embodiments, the methylated DNA patterns are preserved for at least 1 hour, 2 hours, 3 hours, 4 hours, 5 hours, 6 hours, 7 hours, 10 hours, 12 hours, 16 hours, 20 hours, 24 hours, 2 days, 3 days, 4 days, 5 days, 6 days, 7 days, 10 days, two weeks, 15 days, 16 days, 17 days, 18 days, 19 days, 20 days, 21 days, 22 days, 23 days, 24 days, 25 days, 26 days, 27 days, 28 days, 29 days, 30 days, 5 weeks, 6 weeks, 7 weeks, 8 weeks, 9 weeks, 10 weeks, 11 weeks, 12 weeks, 4 months, 5 months, 6 months, 7 months, 8 months, 9 months, 10 months, 11 months, 1 year, 18 months or 2 years in the composition at temperatures ranging between −10° C. to 30° C.

BRIEF DESCRIPTION OF THE FIGURES

FIGS. 2A and 2B: Time Course Study of Liquid Medium Effect on Assay of DNA Methylation. The preservative conditions are indicated on the x-axis, while the methyl read fraction is indicated on the y-axis. "VIM" corresponds to vimentin. "4deg" means storage at 4° C. "NBF" means neutral buffered formalin.

"NBF" means neutral buffered formalin. A biological replicate of each of the mixtures was independently prepared, and the pelleted cells were processed by flash freezing (denoted "Frozen (Exp0)").

Figure 4A:
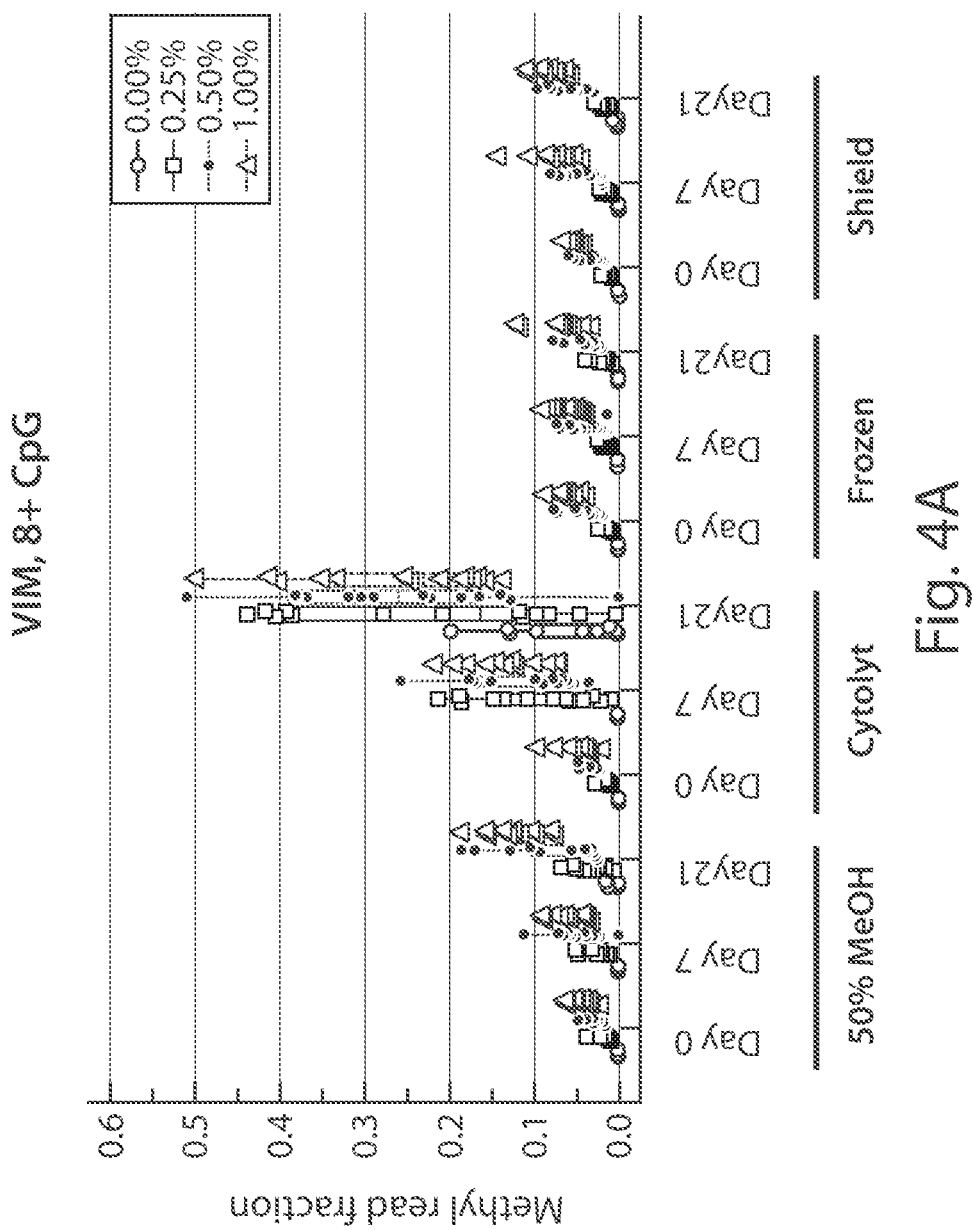
Figure 4B:
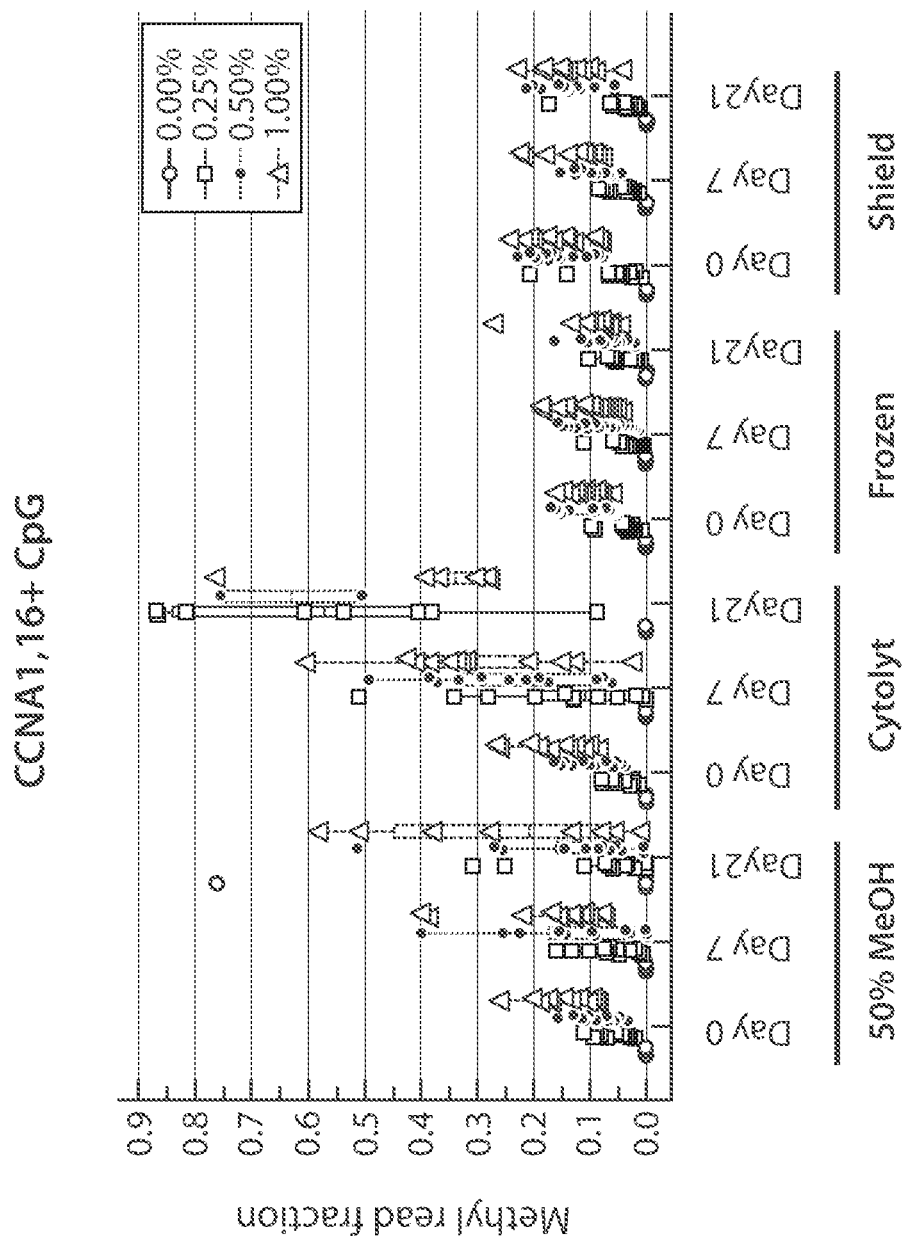

FIGS. 4A and 4B: DNA Methylation Tested in Cells Incubated Across Time in Different Buffers. The preservative conditions and time are indicated on the x-axis, while the methyl read fraction is indicated on the y-axis. "VIM" corresponds to vimentin.

Figure 5A:
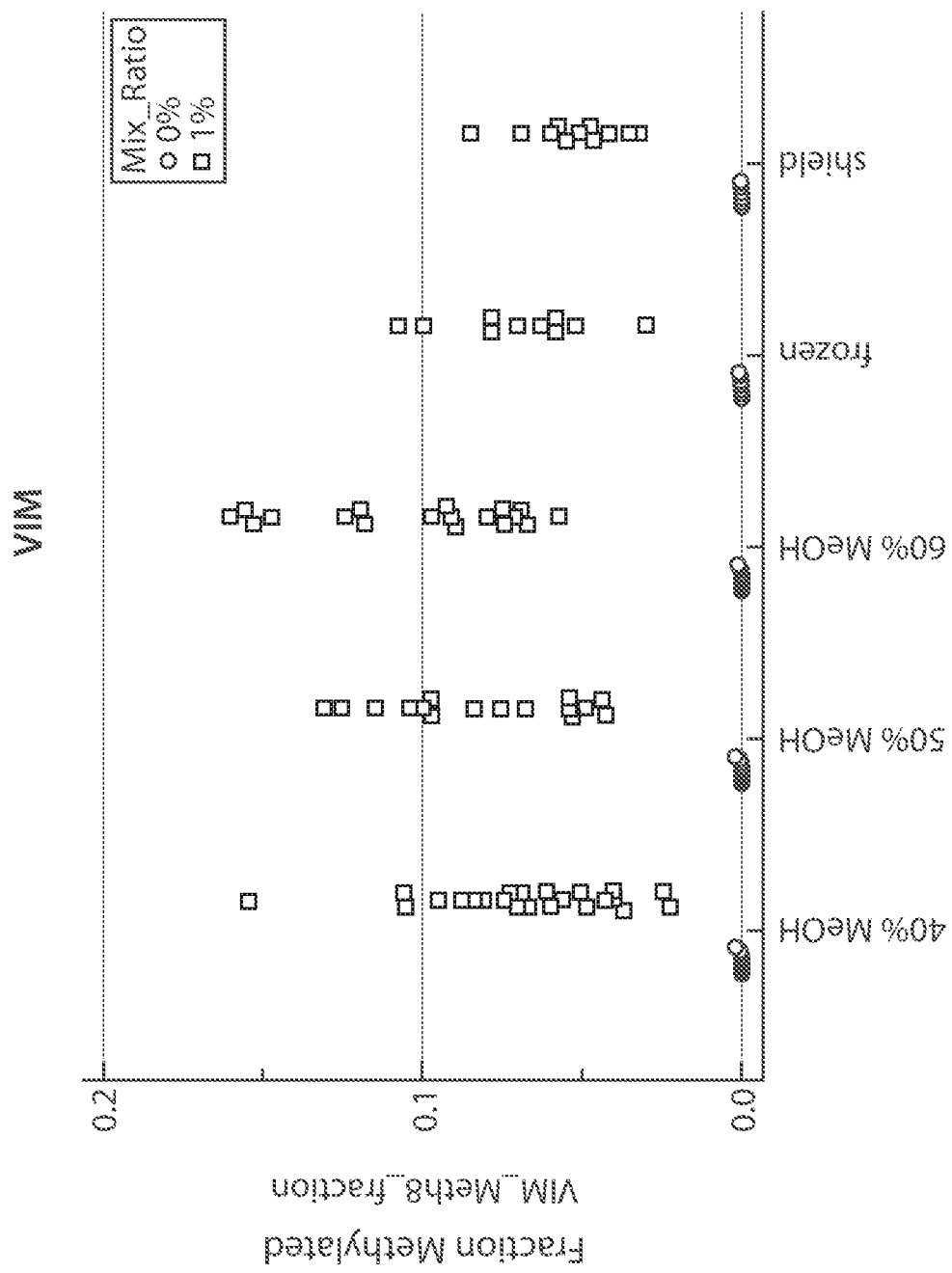
Figure 5B:
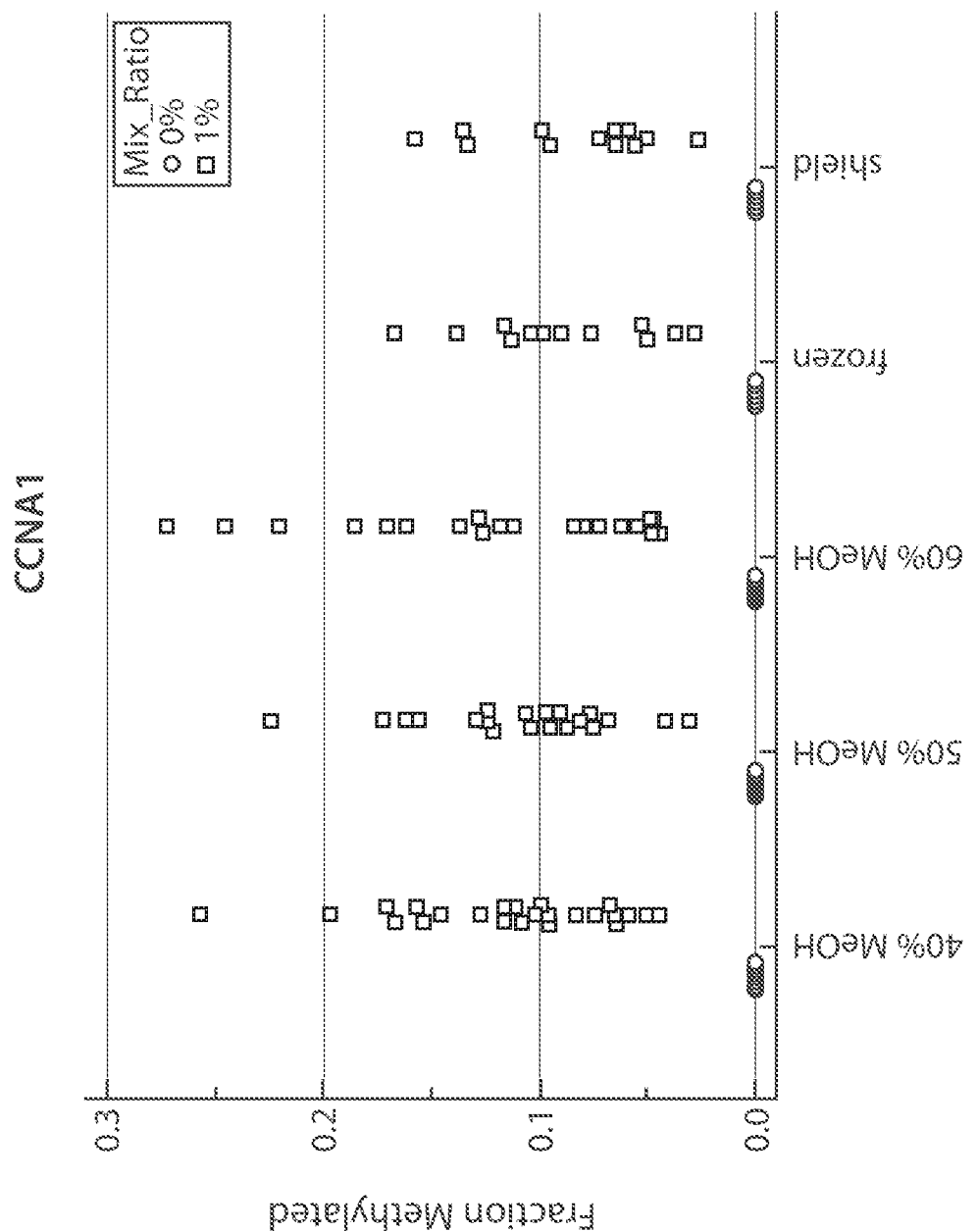

FIGS. 5A and 5B: DNA Methylation Tested on Day 0 in Cells Incubated in Different Buffers. The preservative conditions and time are indicated on the x-axis, while the methyl read fraction is indicated on the y-axis. "VIM" corresponds to vimentin.

Figure 6A:
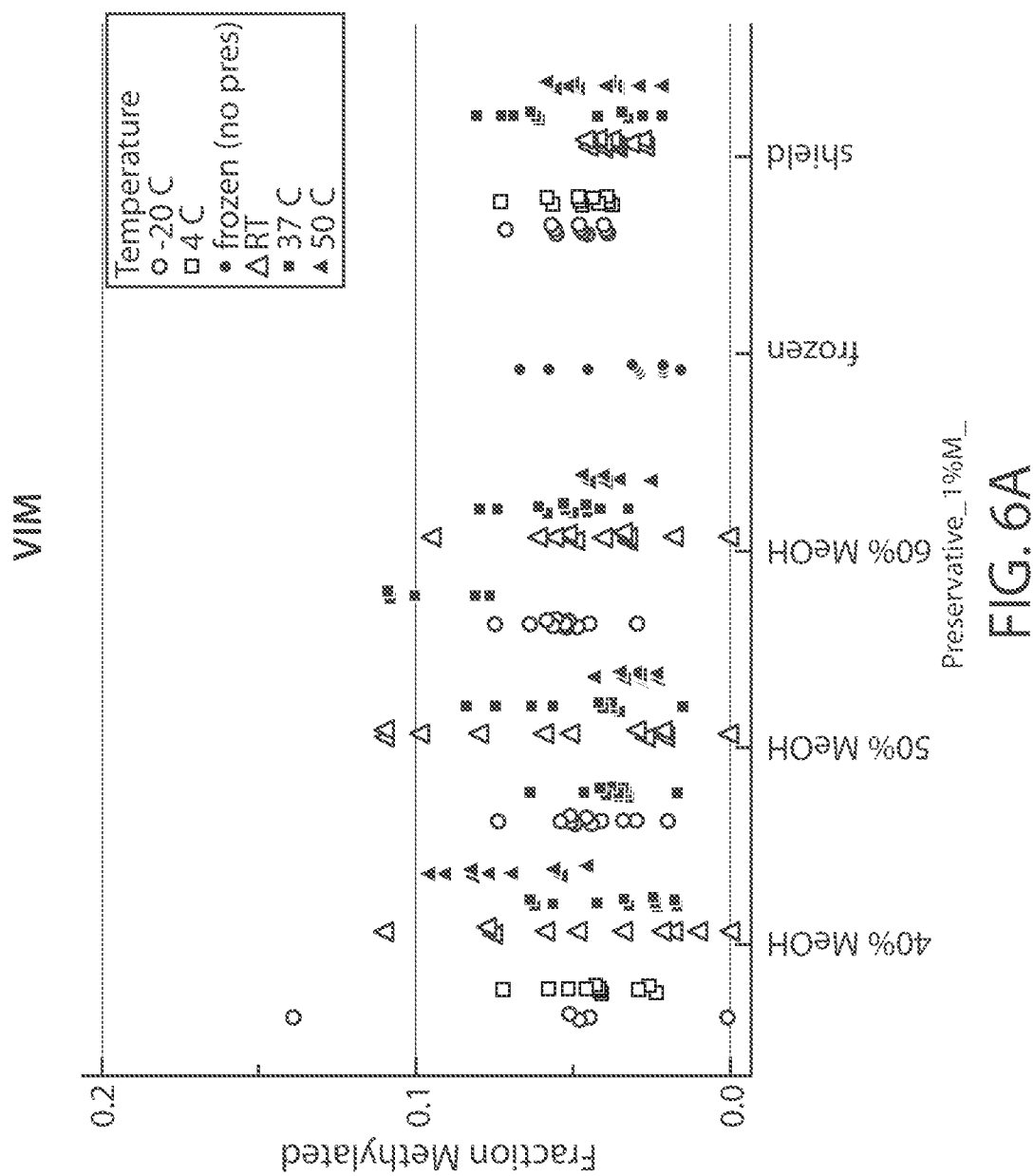
Figure 6B:
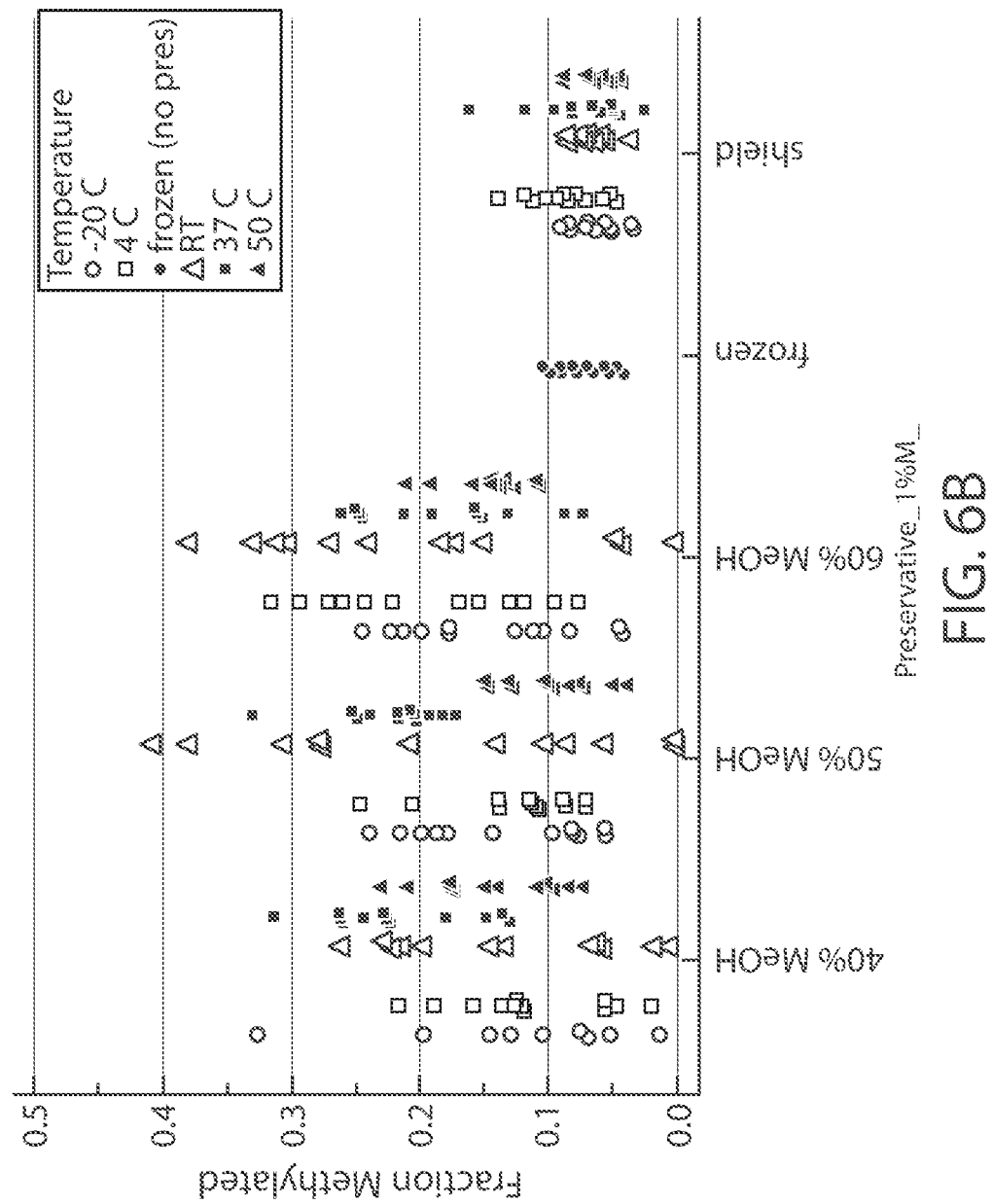

FIGS. 6A and 6B: Day 21 Samples Testing 1% Methylated Cells In Buffers of Different Percent Methanol and at Different Temperatures. The preservative conditions and time are indicated on the x-axis, while the methyl read fraction is indicated on the y-axis. "VIM" corresponds to vimentin.

Figure 7A:
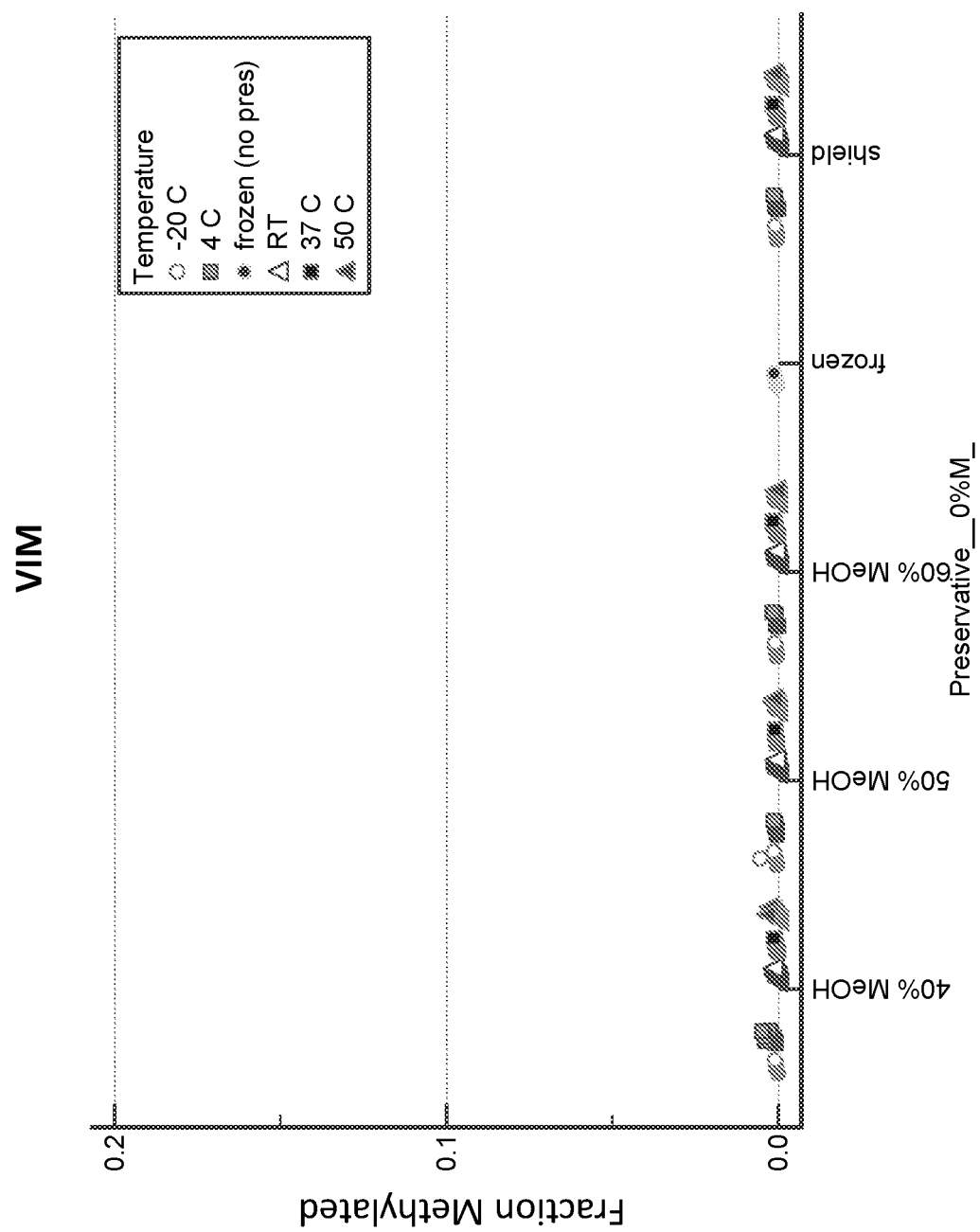
Figure 7B:
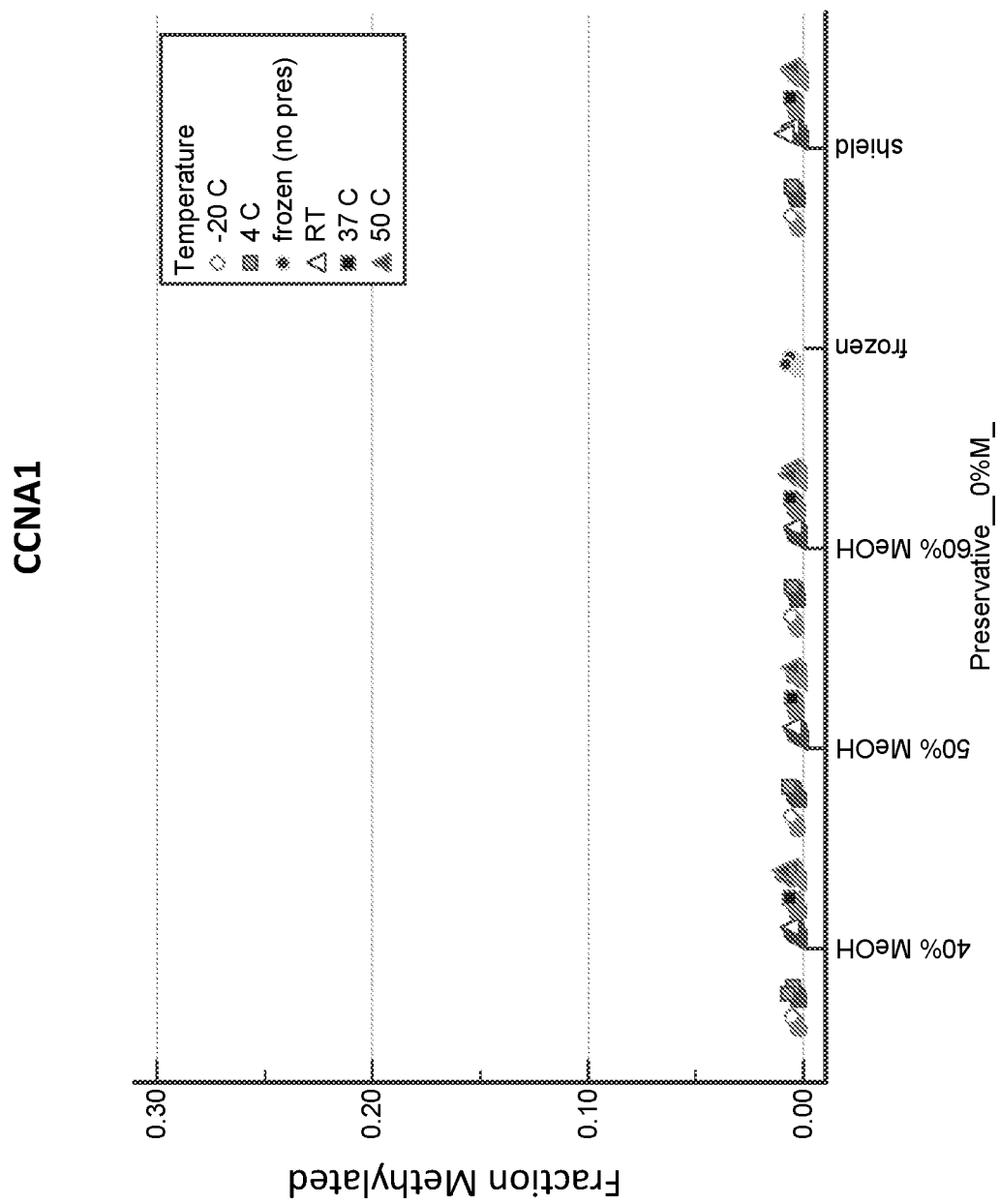

FIGS. 7A and 7B: Day 21 Samples Testing Unmethylated Cells In Buffers of Different Percent Methanol and at Different Temperatures. The preservative conditions and time are indicated on the x-axis, while the methyl read fraction is indicated on the y-axis. "VIM" corresponds to vimentin.

DETAILED DESCRIPTION OF THE INVENTION

In general, neoplasias may develop through one of at least three different pathways, termed chromosomal instability, microsatellite instability, and the CpG island methylator phenotype (CIMP). Although there is some overlap, these pathways tend to present somewhat different biological behavior. By understanding the pathway of tumor or metaplasia development, the target genes involved, and the mechanisms underlying the genetic instability, it is possible to implement strategies to detect and treat the different types of neoplasias or metaplasias.

Certain target genes may be silenced or inactivated by the differential methylation of CpG islands in the 5' flanking or promoter regions of the target gene. CpG islands are clusters of cytosine-guanosine residues in a DNA sequence, which are prominently represented in the 5'-flanking region or promoter region of about half the genes in our genome. This disclosure is based at least in part on the recognition that certain storage solutions surprisingly preserve DNA methylation patterns in a sample as compared to other solutions.

A. Definitions

For convenience, certain terms employed in the specification, examples, and appended claims are collected here. Unless defined otherwise, all technical and scientific terms used herein have the same meaning as commonly understood by one of ordinary skill in the art to which this invention belongs.

Although methods and materials similar or equivalent to those described herein can be used in the practice or testing of the present invention, suitable methods and materials are described below. The materials, methods and examples are illustrative only, and are not intended to be limiting. All publications, patents and other documents mentioned herein are incorporated by reference in their entirety.

Each embodiment of the invention described herein may be taken alone or in combination with one or more other embodiments of the invention.

Throughout this specification, the word "comprise" or variations such as "comprises" or "comprising" will be understood to imply the inclusion of a stated integer or groups of integers but not the exclusion of any other integer or group of integers.

The articles "a" and "an" are used herein to refer to one or to more than one (i.e., to at least one) of the grammatical object of the article. By way of example, "an element" means one element or more than one element.

The term "about" or "approximately" means within an acceptable error range for the particular value as determined by one of ordinary skill in the art, which will depend in part on how the value is measured or determined, i.e., the limitations of the measurement system. For example, "about" can mean within one or more than one standard deviation, per the practice in the art. Alternatively, "about" can mean a range of up to 20%, up to 15%, up to 10%, up to 5%, or up to 1% above or below a given value.

The terms "adenoma" is used herein to describe any precancerous neoplasia or benign tumor of epithelial tissue, for example, a precancerous neoplasia of the gastrointestinal tract, pancreas, and/or the bladder.

The term "blood-derived fraction" herein refers to a component or components of whole blood. Whole blood comprises a liquid portion (i.e., plasma) and a solid portion (i.e., blood cells). The liquid and solid portions of blood are each comprised of multiple components; e.g., different proteins in plasma or different cell types in the solid portion. One of these components or a mixture of any of these components is a blood-derived fraction as long as such fraction is missing one or more components found in whole blood.

The term "esophagus" is intended to encompass the upper portion of the digestive system spanning from the back of the oral cavity, passing downwards through the rear part of the mediastinum, through the diaphragm and into the stomach.

The term "esophageal cancer" is used herein to refer to any cancerous neoplasia of the esophagus.

"Barrett's esophagus" as used herein refers to an abnormal change (metaplasia) in the cells of the lower portion of the esophagus. Barrett's is characterized by the finding of intestinal metaplasia in the esophagus.

A "brushing" of the esophagus, as referred to herein, may be obtained using any of the means known in the art. In some embodiments, a brushing is obtained by contacting the esophagus with a brush, a cytology brush, a sponge, a balloon, or with any other device or substance that contacts the esophagus and obtains an esophageal sample.

"Cells," "host cells" or "recombinant host cells" are terms used interchangeably herein. It is understood that such terms refer not only to the particular subject cell but to the progeny or potential progeny of such a cell. Because certain modifications may occur in succeeding generations due to either mutation or environmental influences, such progeny may not, in fact, be identical to the parent cell, but are still included within the scope of the term as used herein.

The terms "compound", "test compound," "agent", and "molecule" are used herein interchangeably and are meant to include, but are not limited to, peptides, nucleic acids, carbohydrates, small organic molecules, natural product extract libraries, and any other molecules (including, but not limited to, chemicals, metals, and organometallic compounds).

The term "compound-converted DNA" herein refers to DNA that has been treated or reacted with a chemical compound that converts unmethylated C bases in DNA to a different nucleotide base. For example, one such compound is sodium bisulfite, which converts unmethylated C to U. If DNA that contains conversion-sensitive cytosine is treated with sodium bisulfite, the compound-converted DNA will contain U in place of C. If the DNA which is treated with sodium bisulfite contains only methylcytosine, the compound-converted DNA will not contain uracil in place of the methylcytosine.

The term "de-methylating agent" as used herein refers to agents that restore activity and/or gene expression of target genes silenced by methylation upon treatment with the agent. Examples of such agents include without limitation 5-azacytidine and 5-aza-2'-deoxycytidine.

The term "detection" is used herein to refer to any process of observing a marker, or a change in a marker (such as for example the change in the methylation state of the marker), in a biological sample, whether or not the marker or the change in the marker is actually detected. In some embodiments, the act of probing a sample for a marker or a change in the marker, is a "detection" even if the marker is determined to be not present or below the level of sensitivity. Detection may be a quantitative, semi-quantitative or non-quantitative observation.

The term "differentially methylated nucleotide sequence" or a "differentially methylated domain" refers to a region of a genomic loci/target gene that is found to be methylated in cancer tissues or cell lines, but not methylated in the normal tissues or cell lines, or refers to a region of a genomic loci/target gene that is found to be less methylated in cancer tissues or cell lines, than in the normal tissues or cell lines.

The term "neoplasia" as used herein refers to an abnormal growth of tissue. As used herein, the term "neoplasia" may be used to refer to cancerous and non-cancerous tumors, as well as to Barrett's esophagus (which may also be referred to herein as a metaplasia) and Barrett's esophagus with dysplasia. In some embodiments, the Barrett's esophagus with dysplasia is Barrett's esophagus with high grade dysplasia. In some embodiments, the Barrett's esophagus with dysplasia is Barrett's esophagus with low grade dysplasia. In some embodiments, the neoplasia is a cancer (e.g., esophageal adenocarcinoma).

"Gastrointestinal neoplasia" refers to neoplasia of the upper and lower gastrointestinal tract. As commonly understood in the art, the upper gastrointestinal tract includes the esophagus, stomach, and duodenum; the lower gastrointestinal tract includes the remainder of the small intestine and all of the large intestine.

The terms "healthy", "normal," and "non-neoplastic" are used interchangeably herein to refer to a subject or particular cell or tissue that is devoid (at least to the limit of detection) of a disease condition, such as a neoplasia.

"Homology" or "identity" or "similarity" refers to sequence similarity between two peptides or between two nucleic acid molecules. Homology and identity can each be determined by comparing a position in each sequence which may be aligned for purposes of comparison. When an equivalent position in the compared sequences is occupied by the same base or amino acid, then the molecules are identical at that position; when the equivalent site occupied by the same or a similar amino acid residue (e.g., similar in steric and/or electronic nature), then the molecules can be referred to as homologous (similar) at that position. Expression as a percentage of homology/similarity or identity refers to a function of the number of identical or similar amino acids at positions shared by the compared sequences. A sequence which is "unrelated or "non-homologous" shares, in some embodiments, less than 40% identity, and in particular embodiments, less than 25% identity with a sequence of the present invention. In comparing two sequences, the absence of residues (amino acids or nucleic acids) or presence of extra residues also decreases the identity and homology/similarity.

The term "homology" describes a mathematically based comparison of sequence similarities which is used to identify genes or proteins with similar functions or motifs. The nucleic acid and protein sequences of the present invention may be used as a "query sequence" to perform a search against public databases to, for example, identify other family members, related sequences or homologs. Such searches can be performed using the NBLAST and XBLAST programs (version 2.0) of Altschul, et al. (1990) *J Mol. Biol.* 215:403-10. BLAST nucleotide searches can be performed with the NBLAST program, score=100, wordlength=12 to obtain nucleotide sequences homologous to nucleic acid molecules of the invention. BLAST protein searches can be performed with the XBLAST program, score=50, wordlength=3 to obtain amino acid sequences homologous to protein molecules of the invention. To obtain gapped alignments for comparison purposes, Gapped BLAST can be utilized as described in Altschul et al., (1997) Nucleic Acids Res. 25 (17): 3389-3402. When utilizing BLAST and Gapped BLAST programs, the default parameters of the respective programs (e.g., XBLAST and BLAST) can be used. See www.ncbi.nlm.nih.gov.

As used herein, "identity" means the percentage of identical nucleotide or amino acid residues at corresponding positions in two or more sequences when the sequences are aligned to maximize sequence matching, i.e., taking into account gaps and insertions. Identity can be readily calculated by known methods, including but not limited to those described in (*Computational Molecular Biology*, Lesk, A. M., ed., Oxford University Press, New York, 1988; *Biocomputing*: Informatics and Genome Projects, Smith, D. W., ed., Academic Press, New York, 1993; *Computer Analysis of Sequence Data*, Part I, Griffin, A. M., and Griffin, H. G., eds., Humana Press, New Jersey, 1994; *Sequence Analysis in Molecular Biology*, von Heinje, G., Academic Press, 1987; and *Sequence Analysis Primer*, Gribskov, M. and Devereux, J., eds., M Stockton Press, New York, 1991; and Carillo, H., and Lipman, D., SIAM J. Applied Math., 48:1073, 1988). Methods to determine identity are designed to give the largest match between the sequences tested.

Moreover, methods to determine identity are codified in publicly available computer programs. Computer program methods to determine identity between two sequences include, but are not limited to, the GCG program package (Devereux, J., et al., *Nucleic Acids Research* 12 (1): 387 (1984)), BLASTP, BLASTN, and FASTA (Altschul, S. F. et al., *J. Molec. Biol.* 215:403-410 (1990) and Altschul et al. *Nuc. Acids Res.* 25:3389-3402 (1997)). The BLAST X program is publicly available from NCBI and other sources (*BLAST Manual*, Altschul, S., et al., NCBI NLM NIH Bethesda, Md. 20894; Altschul, S., et al., *J. Mol. Biol.* 215:403-410 (1990)). The well-known Smith Waterman algorithm may also be used to determine identity.

The term "including" is used herein to mean, and is used interchangeably with, the phrase "including but not limited to."

The term "isolated" as used herein with respect to nucleic acids, such as DNA or RNA, refers to molecules in a form which does not occur in nature. Moreover, an "isolated nucleic acid" is meant to include nucleic acid fragments which are not naturally occurring as fragments and would not be found in the natural state.

The term "methylation-specific PCR" ("MSP") herein refers to a polymerase chain reaction in which amplification of the compound-converted template sequence is performed. Two sets of primers are designed for use in MSP. Each set of primers comprises a forward primer and a reverse primer. In some embodiments, one set of primers, called methylation-specific primers, will amplify the compound-converted template sequence if C bases in CpG dinucleotides within the DNA are methylated. In some embodiments, another set of primers, called unmethylation-specific primers or primers for unmethylated sequences and the like, will amplify the compound-converted template sequences if C bases in CpG dinucleotides within the DNA are not methylated.

As used herein, the term "nucleic acid" refers to polynucleotides such as deoxyribonucleic acid (DNA), and, where appropriate, ribonucleic acid (RNA). The term should also be understood to include, as equivalents, analogs of either RNA or DNA made from nucleotide analogs, and, as applicable to the embodiment being described, single-stranded (such as sense or antisense) and double-stranded polynucleotides.

"Operably linked" when describing the relationship between two DNA regions simply means that they are functionally related to each other. For example, a promoter or other transcriptional regulatory sequence is operably linked to a coding sequence if it controls the transcription of the coding sequence.

The term "or" is used herein to mean, and is used interchangeably with, the term "and/or", unless context clearly indicates otherwise.

The terms "proteins" and "polypeptides" are used interchangeably herein.

A "sample" includes any material that is obtained or prepared for detection of a molecular marker or a change in a molecular marker such as, for example, the methylation state, or any material that is contacted with a detection reagent or detection device for the purpose of detecting a molecular marker or a change in the molecular marker.

As used herein, "obtaining a sample" includes directly retrieving a sample from a subject to be assayed, or directly retrieving a sample from a subject to be stored (e.g., in any of the storage solutions described herein) and assayed at a later time. Alternatively, a sample may be obtained via a second party. That is, a sample may be obtained via, e.g., shipment, from another individual who has retrieved the sample, or otherwise obtained the sample.

A "storage solution" is any solution that preserves methylation patterns in a DNA molecule over a period of time. A storage solution may also be referred to herein as a "preservative."

A "subject" is any organism of interest, generally a mammalian subject, such as a mouse, and in particular embodiments, a human subject.

As used herein, the term "specifically hybridizes" refers to the ability of a nucleic acid probe/primer of the invention to hybridize to at least 12, 15, 20, 25, 30, 35, 40, 45, 50 or 100 consecutive nucleotides of a target sequence, or a sequence complementary thereto, or naturally occurring mutants thereof, such that it has, in some embodiments, less than 15%, less than 10%, or less than 5% background hybridization to a cellular nucleic acid (e.g., mRNA or genomic DNA) other than the target gene. A variety of hybridization conditions may be used to detect specific hybridization, and the stringency is determined primarily by the wash stage of the hybridization assay. Generally high temperatures and low salt concentrations give high stringency, while low temperatures and high salt concentrations give low stringency. Low stringency hybridization is achieved by washing in, for example, about 2.0×SSC at 50° C., and high stringency is achieved with about 0.2×SSC at 50° C. Further descriptions of stringency are provided herein.

As applied to polypeptides, the term "substantial sequence identity" means that two peptide sequences, when optimally aligned such as by the programs GAP or BESTFIT using default gap, share at least 90 percent sequence identity, in some embodiments, at least 95 percent sequence identity, or at least 99 percent sequence identity or more. In some embodiments, residue positions which are not identical differ by conservative amino acid substitutions. For example, the substitution of amino acids having similar chemical properties such as charge or polarity is not likely to affect the properties of a protein. Examples include glutamine for asparagine or glutamic acid for aspartic acid.

The term "Up10" as used herein refers to a nucleotide sequence comprising a sequence at least 80%, 85%, 90%, 91%, 92%, 93%, 94%, 95%, 96%, 97%, 98%, 99% or 100% identity to the sequence of SEQ ID NO: 8, or fragments or reverse complements thereof. The term "Up10" as used herein also refers to a nucleotide sequence comprising a sequence at least 80%, 85%, 90%, 91%, 92%, 93%, 94%, 95%, 96%, 97%, 98%, 99% or 100% identity to the sequence of SEQ ID NO: 9, or fragments or reverse complements thereof. The term "Up10" as used herein also refers to a nucleotide sequence comprising a sequence at least 80%, 85%, 90%, 91%, 92%, 93%, 94%, 95%, 96%, 97%, 98%, 99% or 100% identity to the sequence of SEQ ID NO: 10, or fragments or reverse complements thereof. The term "Up10" as used herein also refers to a nucleotide sequence comprising a sequence at least 80%, 85%, 90%, 91%, 92%, 93%, 94%, 95%, 96%, 97%, 98%, 99% or 100% identity to the sequence of SEQ ID NO: 11, or fragments or reverse complements thereof.

The term "Up35-1" as used herein refers to a nucleotide sequence comprising a sequence at least 80%, 85%, 90%, 91%, 92%, 93%, 94%, 95%, 96%, 97%, 98%, 99% or 100% identity to the sequence of SEQ ID NO: 12, or fragments or reverse complements thereof. The term "Up35-1" as used herein also refers to a nucleotide sequence comprising a sequence at least 80%, 85%, 90%, 91%, 92%, 93%, 94%, 95%, 96%, 97%, 98%, 99% or 100% identity to the sequence of SEQ ID NO: 13, or fragments or reverse complements thereof. The term "Up35-1" as used herein also refers to a nucleotide sequence comprising a sequence at least 80%, 85%, 90%, 91%, 92%, 93%, 94%, 95%, 96%, 97%, 98%, 99% or 100% identity to the sequence of SEQ ID NO: 14, or fragments or reverse complements thereof. The term "Up35-1" as used herein also refers to a nucleotide sequence comprising a sequence at least 80%, 85%, 90%, 91%, 92%, 93%, 94%, 95%, 96%, 97%, 98%, 99% or 100% identity to the sequence of SEQ ID NO: 15, or fragments or reverse complements thereof.

The term "Up35-2" as used herein refers to a nucleotide sequence comprising a sequence at least 80%, 85%, 90%, 91%, 92%, 93%, 94%, 95%, 96%, 97%, 98%, 99% or 100% identity to the sequence of SEQ ID NO: 12, or fragments or reverse complements thereof. The term "Up35-2" as used herein also refers to a nucleotide sequence comprising a sequence at least 80%, 85%, 90%, 91%, 92%, 93%, 94%, 95%, 96%, 97%, 98%, 99% or 100% identity to the sequence of SEQ ID NO: 13, or fragments or reverse complements thereof. The term "Up35-2" as used herein also refers to a nucleotide sequence comprising a sequence at least 80%, 85%, 90%, 91%, 92%, 93%, 94%, 95%, 96%, 97%, 98%, 99% or 100% identity to the sequence of SEQ ID NO: 16, or fragments or reverse complements thereof. The term "Up35-2" as used herein also refers to a nucleotide sequence comprising a sequence at least 80%, 85%, 90%, 91%, 92%, 93%, 94%, 95%, 96%, 97%, 98%, 99% or 100% identity to the sequence of SEQ ID NO: 17, or fragments or reverse complements thereof.

B. Storage Solutions

In some embodiments, the disclosure provides for a storage solution for preserving DNA methylation patterns in cellular samples.

In some embodiments, the solution comprises an organic solvent. In some embodiments, the organic solvent is any one of or combination of methanol, ethanol, isopropanol, or chloroform. In some embodiments, the storage solution comprises methanol. In some embodiments, the storage solution comprises ethanol. In some embodiments, the storage solution comprises isopropanol. In some embodiments, the storage solution comprises chloroform. In some embodiments, the storage solution is diluted with water. In some embodiments, the storage solution comprises any of the organic solvents disclosed herein and water. In some embodiments, the storage solution comprises at least 30%, 35%, 40%, 45%, 50%, 55%, 60%, 65%, 70%, 75%, 80%, 85%, 90%, 95%, or 97% of an organic solvent. In some embodiments, the storage solution comprises less than 70%, 65%, 60%, 55%, 50%, 45%, 40%, 35%, 30%, 25%, 20%, 15%, 10%, 5% or 3% water. In some embodiments, the storage solution comprises 95% of an organic solvent and 5% water. In some embodiments, the storage solution comprises about 90% of an organic solvent and about 10% water. In some embodiments, the storage solution comprises about 85% of an organic solvent and about 15% water. In some embodiments, the storage solution comprises about 80% of an organic solvent and about 20% water. In some embodiments, the storage solution comprises about 75% of an organic solvent and about 25% water. In some embodiments, the storage solution comprises about 70% of an organic solvent and 30% water. In some embodiments, the storage solution comprises about 65% of an organic solvent and about 35% water. In some embodiments, the storage solution comprises about 60% of an organic solvent and about 40% water. In some embodiments, the storage solution comprises about 55% of an organic solvent and about 45% water. In some embodiments, the storage solution comprises about 50% of an organic solvent and about 50% water. In some embodiments, the storage solution comprises about 45% of an organic solvent and about 55% water. In some embodiments, the storage solution comprises about 40% of an organic solvent and about 60% water. In some embodiments, the storage solution comprises about 35% of an organic solvent and about 65% water. In some embodiments, the storage solution comprises about 30% of an organic solvent and about 70% water. In some embodiments, the storage solution comprises about 25% of an organic solvent and about 75% water. In some embodiments, the storage solution comprises about 20% of an organic solvent and about 80% water. In some embodiments, the storage solution comprises about 15% of an organic solvent and about 85% water. In some embodiments, the storage solution comprises about 10% of an organic solvent and about 90% water. In some embodiments, the storage solution consists essentially of 95% of an organic solvent and 5% water. In some embodiments, the storage solution consists essentially of about 90% of an organic solvent and about 10% water. In some embodiments, the storage solution consists essentially of about 85% of an organic solvent and about 15% water. In some embodiments, the storage solution consists essentially of about 80% of an organic solvent and about 20% water. In some embodiments, the storage solution consists essentially of about 75% of an organic solvent and about 25% water. In some embodiments, the storage solution consists essentially of about 70% of an organic solvent and 30% water. In some embodiments, the storage solution consists essentially of about 65% of an organic solvent and about 35% water. In some embodiments, the storage solution consists essentially of about 60% of an organic solvent and about 40% water. In some embodiments, the storage solution consists essentially of about 55% of an organic solvent and about 45% water. In some embodiments, the storage solution consists essentially of about 50% of an organic solvent and about 50% water. In some embodiments, the storage solution consists essentially of about 45% of an organic solvent and about 55% water. In some embodiments, the storage solution consists essentially of about 40% of an organic solvent and about 60% water. In some embodiments, the storage solution consists essentially of about 35% of an organic solvent and about 65% water. In some embodiments, the storage solution consists essentially of about 30% of an organic solvent and about 70% water. In some embodiments, the storage solution consists essentially of about 25% of an organic solvent and about 75% water. In some embodiments, the storage solution consists essentially of about 20% of an organic solvent and about 80% water. In some embodiments, the storage solution consists essentially of about 15% of an organic solvent and about 85% water. In some embodiments, the storage solution consists essentially of about 10% of an organic solvent and about 90% water. In some embodiments, the storage solution consists of 95% of an organic solvent and 5% water. In some embodiments, the storage solution consists of about 90% of an organic solvent and about 10% water. In some embodiments, the storage solution consists of about 85% of an organic solvent and about 15% water. In some embodiments, the storage solution consists of about 80% of an organic solvent and about 20% water. In some embodiments, the storage solution consists of about 75% of an organic solvent and about 25% water. In some embodiments, the storage solution consists of about 70% of an organic solvent and 30% water. In some embodiments, the storage solution consists of about 65% of an organic solvent and about 35% water. In some embodiments, the storage solution consists of about 60% of an organic solvent and about 40% water. In some embodiments, the storage solution consists of about 55% of an organic solvent and about 45% water. In some embodiments, the storage solution consists of about 50% of an organic solvent and about 50% water. In some embodiments, the storage solution consists of about 45% of an organic solvent and about 55% water. In some embodiments, the storage solution consists of about 40% of an organic solvent and about 60% water. In some embodiments, the storage solution consists of about 35% of an organic solvent and about 65% water. In some embodiments, the storage solution consists of about 30% of an organic solvent and about 70% water. In some embodiments, the storage solution consists of about 25% of an organic solvent and about 75% water. In some embodiments, the storage solution consists of about 20% of an organic solvent and about 80% water. In some embodiments, the storage solution consists of about 15% of an organic solvent and about 85% water. In some embodiments, the storage solution consists of about 10% of an organic solvent and about 90% water. In some embodiments, the storage solution comprises 10-90% of an organic solvent. In some embodiments, the storage solution comprises 20-80% of an organic solvent. In some embodiments, the storage solution comprises 25-75% of an organic solvent. In some embodiments, the storage solution comprises 30-70% of an organic solvent. In some embodiments, the storage solution comprises 35-65% of an organic solvent. In some embodiments, the storage solution comprises 40-60% of an organic solvent. In some embodiments, the storage solution comprises 45-55% of an organic solvent.

In some embodiments, the storage solution comprises methanol. In some embodiments, the storage solution is a methanol-based buffer. In some embodiments, the storage solution comprises 100% methanol. In some embodiments, the methanol is peroxide-free. In some embodiments, the methanol is Peroxide-Free/Sequencing methanol (Fisher BioReagents). In some embodiments, the methanol is ultra-pure methanol. In some embodiments, the storage solution comprises a mixture of methanol and another liquid. In some embodiments, the other liquid is water. In some embodiments, the storage solution comprises at least 30%, 35%, 40%, 45%, 50%, 55%, 60%, 65%, 70%, 75%, 80%, 85%, 90%, 95%, or 97% methanol. In some embodiments, the storage solution comprises less than 70%, 65%, 60%, 55%, 50%, 45%, 40%, 35%, 30%, 25%, 20%, 15%, 10%, 5% or 3% water. In some embodiments, the storage solution comprises 95% methanol and 5% water. In some embodiments, the storage solution comprises about 90% methanol and about 10% water. In some embodiments, the storage solution comprises about 85% methanol and about 15% water. In some embodiments, the storage solution comprises about 80% methanol and about 20% water. In some embodiments, the storage solution comprises about 75% methanol and about 25% water. In some embodiments, the storage solution comprises about 70% methanol and 30% water. In some embodiments, the storage solution comprises about 65% methanol and about 35% water. In some embodiments, the storage solution comprises about 60% methanol and about 40% water. In some embodiments, the storage solution comprises about 55% methanol and about 45% water. In some embodiments, the storage solution comprises about 50% methanol and about 50% water. In some embodiments, the storage solution comprises about 45% methanol and about 55% water. In some embodiments, the storage solution comprises about 40% methanol and about 60% water. In some embodiments, the storage solution comprises about 35% methanol and about 65% water. In some embodiments, the storage solution comprises about 30% methanol and about 70% water. In some embodiments, the storage solution comprises about 25% methanol and about 75% water. In some embodiments, the storage solution comprises about 20% methanol and about 80% water. In some embodiments, the storage solution comprises about 15% methanol and about 85% water. In some embodiments, the storage solution comprises about 10% methanol and about 90% water. In some embodiments, the storage solution consists essentially of 95% methanol and 5% water. In some embodiments, the storage solution consists essentially of about 90% methanol and about 10% water. In some embodiments, the storage solution consists essentially of about 85% methanol and about 15% water. In some embodiments, the storage solution consists essentially of about 80% methanol and about 20% water. In some embodiments, the storage solution consists essentially of about 75% methanol and about 25% water. In some embodiments, the storage solution consists essentially of about 70% methanol and 30% water. In some embodiments, the storage solution consists essentially of about 65% methanol and about 35% water. In some embodiments, the storage solution consists essentially of about 60% methanol and about 40% water. In some embodiments, the storage solution consists essentially of about 55% methanol and about 45% water. In some embodiments, the storage solution consists essentially of about 50% methanol and about 50% water. In some embodiments, the storage solution consists essentially of about 45% methanol and about 55% water. In some embodiments, the storage solution consists essentially of about 40% methanol and about 60% water. In some embodiments, the storage solution consists essentially of about 35% methanol and about 65% water. In some embodiments, the storage solution consists essentially of about 30% methanol and about 70% water. In some embodiments, the storage solution consists essentially of about 25% methanol and about 75% water. In some embodiments, the storage solution consists essentially of about 20% methanol and about 80% water. In some embodiments, the storage solution consists essentially of about 15% methanol and about 85% water. In some embodiments, the storage solution consists essentially of about 10% methanol and about 90% water. In some embodiments, the storage solution consists of 95% methanol and 5% water. In some embodiments, the storage solution consists of about 90% methanol and about 10% water. In some embodiments, the storage solution consists of about 85% methanol and about 15% water. In some embodiments, the storage solution consists of about 80% methanol and about 20% water. In some embodiments, the storage solution consists of about 75% methanol and about 25% water. In some embodiments, the storage solution consists of about 70% methanol and 30% water. In some embodiments, the storage solution consists of about 65% methanol and about 35% water. In some embodiments, the storage solution consists of about 60% methanol and about 40% water. In some embodiments, the storage solution consists of about 55% methanol and about 45% water. In some embodiments, the storage solution consists of about 50% methanol and about 50% water. In some embodiments, the storage solution consists of about 45% methanol and about 55% water. In some embodiments, the storage solution consists of about 40% methanol and about 60% water. In some embodiments, the storage solution consists of about 35% methanol and about 65% water. In some embodiments, the storage solution consists of about 30% methanol and about 70% water. In some embodiments, the storage solution consists of about 25% methanol and about 75% water. In some embodiments, the storage solution consists of about 20% methanol and about 80% water. In some embodiments, the storage solution consists of about 15% methanol and about 85% water. In some embodiments, the storage solution consists of about 10% methanol and about 90% water. In some embodiments, the storage solution comprises 10-90% of methanol. In some embodiments, the storage solution comprises 20-80% of methanol. In some embodiments, the storage solution comprises 25-75% of methanol. In some embodiments, the storage solution comprises 30-70% of methanol. In some embodiments, the storage solution comprises 35-65% of methanol. In some embodiments, the storage solution comprises 40-60% of methanol. In some embodiments, the storage solution comprises 45-55% of methanol. In some embodiments, the water is purified by distillation. In some embodiments, the water is purified by ultrafiltration. In some embodiments, the water is purified by reverse osmosis. In some embodiments, the water is free of DNase and/or DNase activity. In some embodiments, the water is free of RNase and/or RNase activity. In some embodiments, the water is UltraPure™ DNase/RNase-Free Distilled Water (ThermoFischer Invitrogen).

In some embodiments, the storage solution comprises DNA/RNA Shield™ (Zymo Research). In some embodiments, the storage solution comprises 10%, 20%, 30%, 40%, 50%, 60%, 70%, 80%, 90% or 100% DNA/RNA Shield™

In some embodiments, the storage solution comprises a detergent. In some embodiments, the storage solution comprises a chaotropic agent. In some embodiments, the chaotropic agent comprises urea. In some embodiments, the chaotropic agent is guanidine.

In some embodiments, the storage solution is free of metal ions (e.g., calcium, iron, magnesium, or zinc). In some embodiments, the storage solution is free of calcium. In some embodiments, the storage solution is free of magnesium. In some embodiments, the storage solution is free of zinc. In some embodiments, the storage solution is free of iron.

In some embodiments, the storage solution is at a neutral pH. In some embodiments, the storage solution is not at an acidic pH. In some embodiments, the storage solution is at a pH of between 5-9. In some embodiments the storage solution has a pH greater than 5.5. In some embodiments the storage solution is at pH between 6-9. In some embodiments, the storage solution is at a pH of between 6-8. In some embodiments, the storage solution is at a pH of between 6.2 and 7.8. In some embodiments, the storage solution is at a pH of between 6.5 and 7.5. In some embodiments, the storage solution is at a pH of between 6.8 and 7.2. In some embodiments, the pH is 7.0. In some embodiments, the storage solution is at a physiological pH.

In some embodiments, the storage solution is peroxide free. In some embodiments, the storage solution comprises less than 0.1%, 0.05%, 0.01%, 0.005% or 0.001% peroxide.

In some embodiments, any of the storage solutions disclosed herein is capable of preserving methylation patterns in a target DNA sequence/target gene in a biological sample for at least 1 hour, 2 hours, 3 hours, 4 hours, 5 hours, 6 hours, 7 hours, 10 hours, 12 hours, 16 hours, 20 hours, 24 hours, 2 days, 3 days, 4 days, 5 days, 6 days, 7 days, 10 days, two weeks, 15 days, 16 days, 17 days, 18 days, 19 days, 20 days, 21 days, 22 days, 23 days, 24 days, 25 days, 26 days, 27 days, 28 days, 29 days, 30 days, 5 weeks, 6 weeks, 7 weeks, 8 weeks, 9 weeks, 10 weeks, 11 weeks, 12 weeks, 4 months, 5 months, 6 months, 7 months, 8 months, 9 months, 10 months, 11 months, 1 year, 18 months or 2 years at room temperature (23° C.). In some embodiments, any of the storage solutions disclosed herein is capable of preserving DNA methylation patterns in a target DNA sequence/target gene in a biological sample for at least 1 hour, 2 hours, 3 hours, 4 hours, 5 hours, 6 hours, 7 hours, 10 hours, 12 hours, 16 hours, 20 hours, 24 hours, 2 days, 3 days, 4 days, 5 days, 6 days, 7 days, 10 days, two weeks, 15 days, 16 days, 17 days, 18 days, 19 days, 20 days, 21 days, 22 days, 23 days, 24 days, 25 days, 26 days, 27 days, 28 days, 29 days, 30 days, 5 weeks, 6 weeks, 7 weeks, 8 weeks, 9 weeks, 10 weeks, 11 weeks, 12 weeks, 4 months, 5 months, 6 months, 7 months, 8 months, 9 months, 10 months, 11 months, 1 year, 18 months or 2 years at 4° C. In some embodiments, any of the storage solutions disclosed herein is capable of preserving DNA methylation patterns in a target DNA sequence/target gene in a biological sample for at least 1 hour, 2 hours, 3 hours, 4 hours, 5 hours, 6 hours, 7 hours, 10 hours, 12 hours, 16 hours, 20 hours, 24 hours, 2 days, 3 days, 4 days, 5 days, 6 days, 7 days, 10 days, two weeks, 15 days, 16 days, 17 days, 18 days, 19 days, 20 days, 21 days, 22 days, 23 days, 24 days, 25 days, 26 days, 27 days, 28 days, 29 days, 30 days, 5 weeks, 6 weeks, 7 weeks, 8 weeks, 9 weeks, 10 weeks, 11 weeks, 12 weeks, 4 months, 5 months, 6 months, 7 months, 8 months, 9 months, 10 months, 11 months, 1 year, 18 months or 2 years at −10° C.

In some embodiments, any of the storage solutions disclosed herein preserves DNA methylation patterns in a target DNA sequence/target gene in a biological sample obtained from a subject. In some embodiments, methylation patterns are preserved in the target DNA sequence/target gene of at least 75%, 80%, 85%, 90%, 95% or 100% of the copies of the target DNA sequence/target gene in a biological sample have the same or nearly the same methylation pattern after a period of time (e.g., 21 days) in any of the storage solutions described herein as compared to the methylation patterns associated with a reference target DNA sequence (e.g., a reference differentially methylated domain). In some embodiments, a target DNA sequence/target gene stored in a storage solution for a period of time is considered to have nearly the same methylation pattern of a reference target DNA molecule if the target sequence in a DNA molecule that has been stored in a storage solution for a period of time (e.g., 21 days) has a methylation pattern that is at least 75%, 80%, 85%, 90%, 95%, or 100% the same as the methylation pattern of a reference target DNA sequence (e.g., a reference differentially methylated domain). In some embodiments, the reference target DNA molecule or reference target DNA sequence is a DNA molecule/sequence for which the methylation pattern has been previously determined for a reference cell (e.g., a healthy control cell). In some embodiments, the reference target DNA molecule or reference target DNA sequence is a DNA molecule/sequence for which the methylation pattern is determined in a sample after isolation of the sample from a subject. In some embodiments, the methylation pattern of the reference target DNA sequence is determined prior to storage of the reference target DNA sequence for more than 1 hour, 2 hours, 4 hours, 6 hours, 12 hours, 18 hours, or 1 day following obtaining the sample comprising the reference target DNA sequence from a subject. In preferred embodiments, the reference target DNA sequence/molecule is from the same cell type (e.g., an esophageal neoplastic cell) as the cell type from which the stored target DNA sequence/molecule is compared.

In some embodiments, the methylation pattern of a differentially methylated domain in a DNA molecule stored in a storage solution is considered to be preserved if at least 70%, 75%, 80%, 85%, 90%, 95%, or 100% of the CpGs known to be methylated in a reference differentially methylated domain of a reference DNA molecule are methylated in the differentially methylated domain of the stored DNA molecule after a period of time (e.g., 21 days). In some embodiments, at least 50%, 60%, 70%, 80%, 90%, or 100% of the DNA molecules in a sample stored in any of the storage solutions disclosed herein for a period of time (e.g., 21 days) have a preserved methylation pattern.

C. Target Genes

In some embodiments, any of the storage solutions described herein may be used to preserve the methylation patterns of any of the target genes disclosed herein. As used herein, the term "target gene" includes all non-coding and coding regions associated with a particular gene, as well as complements and/or fragments thereof. For example, the term "target gene" comprises regulatory sequences upstream of the coding sequence for any particular gene. In some embodiments, a target gene comprises promoters, repressors, enhancers, silencers, introns, and exons of a particular gene of interest (e.g., vimentin or CCNA1). In particular embodiments, the target gene comprises the 5' flanking or promoter regions of the target gene, as CpG islands are prominently represented in the 5'-flanking region or promoter region of about half the genes in our genome. In some embodiments, the methylation patterns of a target gene are only determined for a fragment of a particular gene of interest, e.g., for a portion of the 5' flanking or promoter regions of the target gene. In particular embodiments, the term "target gene" refers to a differentially methylated domain of a gene.

In some embodiments, the target gene is any one or more of vimentin, CCNA1, FER1L4, VAV3, DOCK10, ADCY1, BMP3, CD1D, ELMO1, ELOVL2, LRRC4, NDRG4, SFMBT2, ST8SIA1, TSPYL5, ZNF568, ZNF569, ZNF610, ZNF671, ZNF682, CDKN2A, DIO3, HUNK, Up35-1, Up35-2 or Up10, or a fragment and/or complement thereof. In some embodiments, the target gene may be a gene in which differential methylation may be used for distinguishing or detecting a tissue metaplasia or neoplasia, as for example, but not limited to, a metaplasia or neoplasia of the esophagus. Examples of differentially methylated domains (DMR) of other genomic loci are represented in Table 1:

TABLE 1

| Gene name | Chromosome No. | DMR Start and End Position (hg19) | DMR2 | DMR3 | DMR4 |
|---|---|---|---|---|---|
| ADCY1 | 7 | 45613877-45614572 | | | |
| BMP3 | 4 | 81952348-81952402 | 81031173-81031262 | | |
| CD1D | 1 | 158150797-158151205 | | | |
| CDKN2A | 9 | 21974710-21974763 | 21975053-21975199 | | |
| DIO3 | 14 | 102026104-102026204 | | | |
| DOCK10 | 2 | 225907226-225907322 | | | |
| ELMO1 | 7 | 37487755-37488477 | | | |
| ELOVL2 | 6 | 11044395-11044834 | | | |
| FER1L4 | 20 | 34189488-34189693 | 34189488-34189693 | | |
| HUNK | 21 | 33246580-33246650 | | | |
| LRRC4 | 7 | 127671993-127672310 | | | |
| NDRG4 | 16 | 58497395-58497451 | | | |
| SFMBT2 | 10 | 7452885-7452956 | 7451771-7451869 | 7452029-7452452 | 7450242-7450831 |
| ST8SIA1 | 12 | 22487528-22487620 | | | |
| TSPYL5 | 8 | 98289858-98290220 | | | |
| VAV3 | 1 | 108507608-108507679 | | | |
| ZNF568 | 19 | 37407197-37407284 | 37407197-37407365 | | |
| ZNF569 | 19 | 37957760-37958046 | | | |
| ZNF610 | 19 | 52839503-52840013 | | | |
| ZNF671 | 19 | 58238810-58238955 | | | |
| ZNF682 | 19 | 20149796-20149923 | | | |

In some embodiments, a target gene comprises a nucleotide sequence that is at least 60%, 65%, 70%, 75%, 80%, 85%, 90%, 91%, 92%, 93%, 94%, 95%, 96%, 97%, 98%, 99%, or 100% identical to any of the nucleotide sequences disclosed in Table 1, or any fragments and/or complements thereof.

In some embodiments, the target gene comprises at least a portion of a vimentin gene. In some embodiments, the target gene comprises a nucleotide sequence that is at least 60%, 65%, 70%, 75%, 80%, 85%, 90%, 91%, 92%, 93%, 94%, 95%, 96%, 97%, 98%, 99%, or 100% identical to the nucleotide sequence of SEQ ID NO: 1, or a fragment and/or complement thereof. In some embodiments, the target gene comprises a nucleotide sequence that is at least 60%, 65%, 70%, 75%, 80%, 85%, 90%, 91%, 92%, 93%, 94%, 95%, 96%, 97%, 98%, 99%, or 100% identical to the nucleotide sequence of SEQ ID NO: 2, or a fragment and/or complement thereof. In some embodiments, the target gene comprises a nucleotide sequence that is at least 60%, 65%, 70%, 75%, 80%, 85%, 90%, 91%, 92%, 93%, 94%, 95%, 96%, 97%, 98%, 99%, or 100% identical to the nucleotide sequence of SEQ ID NO: 3, or a fragment or a fragment and/or complement thereof. In some embodiments, the target gene comprises a nucleotide sequence that is at least 60%, 65%, 70%, 75%, 80%, 85%, 90%, 91%, 92%, 93%, 94%, 95%, 96%, 97%, 98%, 99%, or 100% identical to the nucleotide sequence of SEQ ID NO: 4, or a fragment and/or complement thereof. In some embodiments, the target gene comprises a nucleotide sequence that is at least 60%, 65%, 70%, 75%, 80%, 85%, 90%, 91%, 92%, 93%, 94%, 95%, 96%, 97%, 98%, 99%, or 100% identical to the nucleotide sequence of SEQ ID NO: 5, or a fragment and/or complement thereof. In some embodiments, the target gene comprises a nucleotide sequence that is at least 60%, 65%, 70%, 75%, 80%, 85%, 90%, 91%, 92%, 93%, 94%, 95%, 96%, 97%, 98%, 99%, or 100% identical to the nucleotide sequence of SEQ ID NO: 18, or a fragment and/or complement thereof. In some embodiments, the target gene comprises the nucleotide sequence of any one of the vimentin nucleotide sequences disclosed in U.S. Pat. No. 9,580,754 (which patent is incorporated herein by reference in its entirety), or a fragment and/or complement thereof.

In some embodiments, the target gene comprises a vimentin nucleotide sequence that is at least 60%, 65%, 70%, 75%, 80%, 85%, 90%, 91%, 92%, 93%, 94%, 95%, 96%, 97%, 98%, 99%, or 100% identical to the nucleotide sequence corresponding to Hg19 coordinates: chr10: 17,270,838-17,271,347, or any fragments and/or complements thereof. In some embodiments, the target gene comprises a vimentin nucleotide sequence that is at least 60%, 65%, 70%, 75%, 80%, 85%, 90%, 91%, 92%, 93%, 94%, 95%, 96%, 97%, 98%, 99%, or 100% identical to the nucleotide sequence corresponding to Hg19 coordinates: chr10: 17,270,838-17, 271,717, or any fragments and/or complements thereof.

In some embodiments, the target gene comprises a vimentin nucleotide sequence that is at least 60%, 65%, 70%, 75%, 80%, 85%, 90%, 91%, 92%, 93%, 94%, 95%, 96%, 97%, 98%, 99%, or 100% identical to the nucleotide sequence corresponding to Hg19 coordinates: chr10: 17271442-17271547, or any fragments and/or complements thereof. In some embodiments, the target gene comprises a vimentin nucleotide sequence that is at least 60%, 65%, 70%, 75%, 80%, 85%, 90%, 91%, 92%, 93%, 94%, 95%, 96%, 97%, 98%, 99%, or 100% identical to the nucleotide sequence of SEQ ID NO: 5, or any fragments and/or complements thereof.

In some embodiments, the target gene comprises a CCNA1 nucleotide sequence that is at least 60%, 65%, 70%, 75%, 80%, 85%, 90%, 91%, 92%, 93%, 94%, 95%, 96%, 97%, 98%, 99%, or 100% identical to the nucleotide sequence corresponding to Hg19 coordinates chr13: 37005805-37006194, or a fragment and/or complement thereof. In some embodiments, the target gene comprises a CCNA1 nucleotide sequence that is at least 60%, 65%, 70%, 75%, 80%, 85%, 90%, 91%, 92%, 93%, 94%, 95%, 96%, 97%, 98%, 99%, or 100% identical to the nucleotide sequence corresponding to Hg19 coordinates chr13: 37005856-37006031, or a fragment and/or complement thereof. In some embodiments, the target gene comprises a CCNA1 nucleotide sequence that is at least 60%, 65%, 70%, 75%, 80%, 85%, 90%, 91%, 92%, 93%, 94%, 95%, 96%, 97%, 98%, 99%, or 100% identical to the nucleotide sequence of SEQ ID NO: 6, or a fragment and/or complement thereof. In some embodiments, the target gene comprises a CCNA1 nucleotide sequence that is at least 60%, 65%, 70%, 75%, 80%, 85%, 90%, 91%, 92%, 93%, 94%, 95%, 96%, 97%, 98%, 99%, or 100% identical to the nucleotide sequence of SEQ ID NO: 7, or a fragment and/or complement thereof.

In some embodiments, the target gene comprises an Up10 nucleotide sequence that is at least 60%, 65%, 70%, 75%, 80%, 85%, 90%, 91%, 92%, 93%, 94%, 95%, 96%, 97%, 98%, 99%, or 100% identical to the nucleotide sequence of SEQ ID NO: 8, or a fragment and/or complement thereof. In some embodiments, the target gene comprises an Up10 nucleotide sequence that is at least 60%, 65%, 70%, 75%, 80%, 85%, 90%, 91%, 92%, 93%, 94%, 95%, 96%, 97%, 98%, 99%, or 100% identical to the nucleotide sequence of SEQ ID NO: 9, or a fragment and/or complement thereof. In some embodiments, the target gene comprises an Up10 nucleotide sequence that is at least 60%, 65%, 70%, 75%, 80%, 85%, 90%, 91%, 92%, 93%, 94%, 95%, 96%, 97%, 98%, 99%, or 100% identical to the nucleotide sequence of SEQ ID NO: 10, or a fragment and/or complement thereof. In some embodiments, the target gene comprises an Up10 nucleotide sequence that is at least 60%, 65%, 70%, 75%, 80%, 85%, 90%, 91%, 92%, 93%, 94%, 95%, 96%, 97%, 98%, 99%, or 100% identical to the nucleotide sequence of SEQ ID NO: 11, or a fragment and/or complement thereof.

In some embodiments, the target gene comprises an Up35-1 nucleotide sequence that is at least 60%, 65%, 70%, 75%, 80%, 85%, 90%, 91%, 92%, 93%, 94%, 95%, 96%, 97%, 98%, 99%, or 100% identical to the nucleotide sequence of SEQ ID NO: 12, or a fragment and/or complement thereof. In some embodiments, the target gene comprises an Up35-1 nucleotide sequence that is at least 60%, 65%, 70%, 75%, 80%, 85%, 90%, 91%, 92%, 93%, 94%, 95%, 96%, 97%, 98%, 99%, or 100% identical to the nucleotide sequence of SEQ ID NO: 13, or a fragment and/or complement thereof. In some embodiments, the target gene comprises an Up35-1 nucleotide sequence that is at least 60%, 65%, 70%, 75%, 80%, 85%, 90%, 91%, 92%, 93%, 94%, 95%, 96%, 97%, 98%, 99%, or 100% identical to the nucleotide sequence of SEQ ID NO: 14, or a fragment and/or complement thereof. In some embodiments, the target gene comprises an Up35-1 nucleotide sequence that is at least 60%, 65%, 70%, 75%, 80%, 85%, 90%, 91%, 92%, 93%, 94%, 95%, 96%, 97%, 98%, 99%, or 100% identical to the nucleotide sequence of SEQ ID NO: 15, or a fragment and/or complement thereof.

In some embodiments, the target gene comprises an Up35-2 nucleotide sequence that is at least 60%, 65%, 70%, 75%, 80%, 85%, 90%, 91%, 92%, 93%, 94%, 95%, 96%, 97%, 98%, 99%, or 100% identical to the nucleotide sequence of SEQ ID NO: 12, or a fragment and/or complement thereof. In some embodiments, the target gene comprises an Up35-2 nucleotide sequence that is at least 60%, 65%, 70%, 75%, 80%, 85%, 90%, 91%, 92%, 93%, 94%, 95%, 96%, 97%, 98%, 99%, or 100% identical to the nucleotide sequence of SEQ ID NO: 13, or a fragment and/or complement thereof. In some embodiments, the target gene comprises an Up35-2 nucleotide sequence that is at least 60%, 65%, 70%, 75%, 80%, 85%, 90%, 91%, 92%, 93%, 94%, 95%, 96%, 97%, 98%, 99%, or 100% identical to the nucleotide sequence of SEQ ID NO: 16, or a fragment and/or complement thereof. In some embodiments, the target gene comprises an Up35-2 nucleotide sequence that is at least 60%, 65%, 70%, 75%, 80%, 85%, 90%, 91%, 92%, 93%, 94%, 95%, 96%, 97%, 98%, 99%, or 100% identical to the nucleotide sequence of SEQ ID NO: 17, or a fragment and/or complement thereof.

In some embodiments, the target gene comprises an ADCY1 nucleotide sequence that is at least 60%, 65%, 70%, 75%, 80%, 85%, 90%, 91%, 92%, 93%, 94%, 95%, 96%, 97%, 98%, 99%, or 100% identical to the nucleotide sequence of SEQ ID NO: 19, or a fragment and/or complement thereof.

In some embodiments, the target gene comprises a BMP3 nucleotide sequence that is at least 60%, 65%, 70%, 75%, 80%, 85%, 90%, 91%, 92%, 93%, 94%, 95%, 96%, 97%, 98%, 99%, or 100% identical to the nucleotide sequence of SEQ ID NO: 20, or a fragment and/or complement thereof. In some embodiments, the target gene comprises a BMP3 nucleotide sequence that is at least 60%, 65%, 70%, 75%, 80%, 85%, 90%, 91%, 92%, 93%, 94%, 95%, 96%, 97%, 98%, 99%, or 100% identical to the nucleotide sequence of SEQ ID NO: 21, or a fragment and/or complement thereof.

In some embodiments, the target gene comprises a CD1D nucleotide sequence that is at least 60%, 65%, 70%, 75%, 80%, 85%, 90%, 91%, 92%, 93%, 94%, 95%, 96%, 97%, 98%, 99%, or 100% identical to the nucleotide sequence of SEQ ID NO: 22, or a fragment and/or complement thereof.

In some embodiments, the target gene comprises a CDKN2A nucleotide sequence that is at least 60%, 65%, 70%, 75%, 80%, 85%, 90%, 91%, 92%, 93%, 94%, 95%, 96%, 97%, 98%, 99%, or 100% identical to the nucleotide sequence of SEQ ID NO: 23, or a fragment and/or complement thereof. In some embodiments, the target gene comprises a CDKN2A nucleotide sequence that is at least 60%, 65%, 70%, 75%, 80%, 85%, 90%, 91%, 92%, 93%, 94%, 95%, 96%, 97%, 98%, 99%, or 100% identical to the nucleotide sequence of SEQ ID NO: 24, or a fragment and/or complement thereof.

In some embodiments, the target gene comprises a DIO3 nucleotide sequence that is at least 60%, 65%, 70%, 75%, 80%, 85%, 90%, 91%, 92%, 93%, 94%, 95%, 96%, 97%, 98%, 99%, or 100% identical to the nucleotide sequence of SEQ ID NO: 25, or a fragment and/or complement thereof.

In some embodiments, the target gene comprises a DOCK10 nucleotide sequence that is at least 60%, 65%, 70%, 75%, 80%, 85%, 90%, 91%, 92%, 93%, 94%, 95%, 96%, 97%, 98%, 99%, or 100% identical to the nucleotide sequence of SEQ ID NO: 26, or a fragment and/or complement thereof.

In some embodiments, the target gene comprises a ELMO1 nucleotide sequence that is at least 60%, 65%, 70%, 75%, 80%, 85%, 90%, 91%, 92%, 93%, 94%, 95%, 96%, 97%, 98%, 99%, or 100% identical to the nucleotide sequence of SEQ ID NO: 27, or a fragment and/or complement thereof.

In some embodiments, the target gene comprises a ELOVL2 nucleotide sequence that is at least 60%, 65%, 70%, 75%, 80%, 85%, 90%, 91%, 92%, 93%, 94%, 95%, 96%, 97%, 98%, 99%, or 100% identical to the nucleotide sequence of SEQ ID NO: 28, or a fragment and/or complement thereof.

In some embodiments, the target gene comprises a FER1L4 nucleotide sequence that is at least 60%, 65%, 70%, 75%, 80%, 85%, 90%, 91%, 92%, 93%, 94%, 95%, 96%, 97%, 98%, 99%, or 100% identical to the nucleotide sequence of SEQ ID NO: 29, or a fragment and/or complement thereof.

In some embodiments, the target gene comprises a HUNK nucleotide sequence that is at least 60%, 65%, 70%, 75%, 80%, 85%, 90%, 91%, 92%, 93%, 94%, 95%, 96%, 97%, 98%, 99%, or 100% identical to the nucleotide sequence of SEQ ID NO: 30, or a fragment and/or complement thereof.

In some embodiments, the target gene comprises a LRRC4 nucleotide sequence that is at least 60%, 65%, 70%, 75%, 80%, 85%, 90%, 91%, 92%, 93%, 94%, 95%, 96%, 97%, 98%, 99%, or 100% identical to the nucleotide sequence of SEQ ID NO: 31, or a fragment and/or complement thereof.

In some embodiments, the target gene comprises a NDRG4 nucleotide sequence that is at least 60%, 65%, 70%, 75%, 80%, 85%, 90%, 91%, 92%, 93%, 94%, 95%, 96%, 97%, 98%, 99%, or 100% identical to the nucleotide sequence of SEQ ID NO: 32, or a fragment and/or complement thereof.

In some embodiments, the target gene comprises a SFMBT2 nucleotide sequence that is at least 60%, 65%, 70%, 75%, 80%, 85%, 90%, 91%, 92%, 93%, 94%, 95%, 96%, 97%, 98%, 99%, or 100% identical to the nucleotide sequence of SEQ ID NO: 33, or a fragment and/or complement thereof. In some embodiments, the target gene comprises a SFMBT2 nucleotide sequence that is at least 60%, 65%, 70%, 75%, 80%, 85%, 90%, 91%, 92%, 93%, 94%, 95%, 96%, 97%, 98%, 99%, or 100% identical to the nucleotide sequence of SEQ ID NO: 34, or a fragment and/or complement thereof. In some embodiments, the target gene comprises a SFMBT2 nucleotide sequence that is at least 60%, 65%, 70%, 75%, 80%, 85%, 90%, 91%, 92%, 93%, 94%, 95%, 96%, 97%, 98%, 99%, or 100% identical to the nucleotide sequence of SEQ ID NO: 35, or a fragment and/or complement thereof. In some embodiments, the target gene comprises a SFMBT2 nucleotide sequence that is at least 60%, 65%, 70%, 75%, 80%, 85%, 90%, 91%, 92%, 93%, 94%, 95%, 96%, 97%, 98%, 99%, or 100% identical to the nucleotide sequence of SEQ ID NO: 36, or a fragment and/or complement thereof.

In some embodiments, the target gene comprises a ST8S1A1 nucleotide sequence that is at least 60%, 65%, 70%, 75%, 80%, 85%, 90%, 91%, 92%, 93%, 94%, 95%, 96%, 97%, 98%, 99%, or 100% identical to the nucleotide sequence of SEQ ID NO: 37, or a fragment and/or complement thereof.

In some embodiments, the target gene comprises a TSPYL5 nucleotide sequence that is at least 60%, 65%, 70%, 75%, 80%, 85%, 90%, 91%, 92%, 93%, 94%, 95%, 96%, 97%, 98%, 99%, or 100% identical to the nucleotide sequence of SEQ ID NO: 38, or a fragment and/or complement thereof.

In some embodiments, the target gene comprises a VAV3 nucleotide sequence that is at least 60%, 65%, 70%, 75%, 80%, 85%, 90%, 91%, 92%, 93%, 94%, 95%, 96%, 97%, 98%, 99%, or 100% identical to the nucleotide sequence of SEQ ID NO: 39, or a fragment and/or complement thereof.

In some embodiments, the target gene comprises a ZNF568 nucleotide sequence that is at least 60%, 65%, 70%, 75%, 80%, 85%, 90%, 91%, 92%, 93%, 94%, 95%, 96%, 97%, 98%, 99%, or 100% identical to the nucleotide sequence of SEQ ID NO: 40, or a fragment and/or complement thereof. In some embodiments, the target gene comprises a ZNF568 nucleotide sequence that is at least 60%, 65%, 70%, 75%, 80%, 85%, 90%, 91%, 92%, 93%, 94%, 95%, 96%, 97%, 98%, 99%, or 100% identical to the nucleotide sequence of SEQ ID NO: 41, or a fragment and/or complement thereof.

In some embodiments, the target gene comprises a ZNF569 nucleotide sequence that is at least 60%, 65%, 70%, 75%, 80%, 85%, 90%, 91%, 92%, 93%, 94%, 95%, 96%, 97%, 98%, 99%, or 100% identical to the nucleotide sequence of SEQ ID NO: 42, or a fragment and/or complement thereof.

In some embodiments, the target gene comprises a ZNF610 nucleotide sequence that is at least 60%, 65%, 70%, 75%, 80%, 85%, 90%, 91%, 92%, 93%, 94%, 95%, 96%, 97%, 98%, 99%, or 100% identical to the nucleotide sequence of SEQ ID NO: 43, or a fragment and/or complement thereof.

In some embodiments, the target gene comprises a ZNF671 nucleotide sequence that is at least 60%, 65%, 70%, 75%, 80%, 85%, 90%, 91%, 92%, 93%, 94%, 95%, 96%, 97%, 98%, 99%, or 100% identical to the nucleotide sequence of SEQ ID NO: 44, or a fragment and/or complement thereof.

In some embodiments, the target gene comprises a ZNF682 nucleotide sequence that is at least 60%, 65%, 70%, 75%, 80%, 85%, 90%, 91%, 92%, 93%, 94%, 95%, 96%, 97%, 98%, 99%, or 100% identical to the nucleotide sequence of SEQ ID NO: 45, or a fragment and/or complement thereof.

In some embodiments, any of the target gene fragments disclosed herein is at least 10, 20, 30, 40, 50, 60, 70, 80, 90, 100, 200, 250, 300, 350, 400, 450, 500, 550, 600, 700, 800, 900, or 1000 nucleotides in length. In particular embodiments, the fragment is at least 20 nucleotides in length. In some embodiments, any of the target gene fragments disclosed herein is between 10-1000, between 10-500, between 10-250, between 10-200, between 10-150, between 10-100, between 10-50, between 10-25, between 10-20, between 25-50, between 50-75, between 25-100, between 50-100, between 50-150, between 100-200, between 50-250, or between 100-250 nucleotides in length.

D. Biological Samples

In some embodiments, any of the storage solutions described herein is for use in storing any of the biological samples disclosed herein. Samples may be essentially any biological material of interest, e.g., a collection of cells taken from a subject. For example, a sample may be a bodily fluid sample from a subject, a tissue sample from a subject, a solid or semi-solid sample from a subject, a primary cell culture or tissue culture of materials derived from a subject, cells from a cell line, or medium or other extracellular material from a cell or tissue culture, or a xenograft (meaning a sample of a cancer from a first subject, e.g., a human, that has been cultured in a second subject, e.g., an immunocompromised mouse). The term "sample" as used herein is intended to encompass both a biological material obtained directly from a subject (which may be described as the primary sample) as well as any manipulated forms or portions of a primary sample. A sample may also be obtained by contacting a biological material with an exogenous liquid, resulting in the production of a lavage liquid containing some portion of the contacted biological material. Furthermore, the term "sample" is intended to encompass the primary sample after it has been mixed with one or more additive, such as preservatives, chelators, anti-clotting factors, etc. In some embodiments, a sample is obtained by means of a cytology brushing and/or a balloon. In some embodiments, the sample is obtained from a subject's gastroesophageal junction.

In certain embodiments, a bodily fluid sample is a blood sample. In this case, the term "sample" is intended to encompass not only the blood as obtained directly from the patient but also fractions of the blood, such as plasma, serum, cell fractions (e.g., platelets, erythrocytes, and lymphocytes), protein preparations, nucleic acid preparations, etc. In some embodiments, the bodily fluid may be derived from the stomach, for example, gastric secretions, acid reflux, or vomit. In other embodiments, the bodily fluid may be a fluid secreted by the pancreas or bladder. In other embodiments, the body fluid may be saliva, spit, or an esophageal washing. In certain embodiments, a tissue sample is a biopsy taken from the mucosa of the gastrointestinal tract. In other embodiments, a tissue sample is the brushings from, e.g., the esophagus of a subject.

In some embodiments, the biological sample is a sample from any of: gastrointestinal tract, aerodigestive tract, respiratory tract, genitourinary tract, or a body fluid. In certain such embodiments, the body fluid is any of: blood, urine, sputum, saliva, stool, bile, pancreatic juice, nasal secretions, tears, semen, vaginal secretions, cerebrospinal fluid, pleural fluid, peritoneal fluid, gastric juice, pericardial fluid, sweat, lymph, cyst fluid, pancreatic cyst fluid, synovial fluid, joint fluid, menstrual fluid, endometrial washing, breast aspirate, or amniotic fluid. In some embodiments, the biological sample is a sample from any of: esophagus, stomach, colon, small intestine, pancreas, liver, oral cavity, oropharynx, trachea, bronchial tree, lung, or breast.

In some embodiments, the biological sample is at least a portion of a cell, tissue, or organ from a subject. In some embodiments, the sample is a tissue sample from the gastrointestinal tract. In some embodiments, the sample is a tissue sample from the upper gastrointestinal tract. In some embodiments, the sample is a tissue from the lower gastrointestinal tract. In some embodiments, the sample is a cell or tissue sample from the esophagus. In some embodiments, the sample is a cell or tissue sample from the stomach. In some embodiments, the sample is a cell or tissue sample from the intestine. In some embodiments, the sample is a cell or tissue sample from the colon.

In some embodiments, the sample comprises cells of any one or more of the following cell types: urinary bladder, pancreatic epithelial, pancreatic alpha, pancreatic beta, pancreatic endothelial, bone marrow lymphoblast, bone marrow B lymphoblast, bone marrow macrophage, bone marrow erythroblast, bone marrow dendritic, bone marrow adipocyte, bone marrow osteocyte, bone marrow chondrocyte, promyeloblast, bone marrow megakaryoblast, bladder, brain B lymphocyte, brain glial, neuron, brain astrocyte, neuroectoderm, brain macrophage, brain microglia, brain epithelial, cardiomyocyte, cortical neuron, brain fibroblast, breast epithelial, colon epithelial, colon B lymphocyte, esophagus epithelial, mammary epithelial, mammary myoepithelial, mammary fibroblast, colon enterocyte, cervix epithelial, ovary epithelial, ovary fibroblast, breast duct epithelial, tongue epithelial, tonsil dendritic, tonsil B lymphocyte, peripheral blood lymphoblast, peripheral blood T lymphoblast, peripheral blood cutaneous T lymphocyte, peripheral blood natural killer, peripheral blood B lymphoblast, peripheral blood monocyte, peripheral blood myeloblast, peripheral blood monoblast, peripheral blood promyeloblast, peripheral blood macrophage, peripheral blood basophil, liver endothelial, liver mast, liver epithelial, liver B lymphocyte, spleen endothelial, spleen epithelial, spleen B lymphocyte, liver hepatocyte, liver Alexander, liver fibroblast, lung epithelial, bronchus epithelial, lung fibroblast, lung B lymphocyte, lung Schwann, lung squamous, lung macrophage, lung osteoblast, neuroendocrine, lung alveolar, stomach epithelial, and stomach fibroblast.

In some embodiments, the sample comprises one or more neoplastic cells. In some embodiments, the sample comprises one or more metaplastic cells. In some embodiments, the sample comprises one or more cancer cells. In some embodiments, the sample comprises one or more cancer cells, wherein the cancer cells are associated with any one or more of the following cancers: Acute Lymphoblastic Leukemia (ALL), Acute Myeloid Leukemia (AML), Adrenocortical Carcinoma Childhood Adrenocortical Carcinoma, AIDS-Related Cancers Kaposi Sarcoma (Soft Tissue Sarcoma), AIDS-Related Lymphoma (Lymphoma), Primary CNS Lymphoma (Lymphoma), Anal Cancer, Appendix Cancer, Gastrointestinal Carcinoid Tumors, Astrocytomas, brain cancer, Atypical Teratoid/Rhabdoid Tumor, skin cancer, Basal Cell Carcinoma, Bile Duct Cancer, Bladder Cancer Childhood Bladder Cancer, Bone Cancer, Ewing Sarcoma and Osteosarcoma and Malignant Fibrous Histiocytoma, Brain Tumors, Breast Cancer, Bronchial Tumors, Burkitt Lymphoma, Non-Hodgkin Lymphoma, Carcinoid Tumor, cardiac cancer, Primary CNS Lymphoma, Cervical Cancer, Cholangiocarcinoma, Bile Duct Cancer, Chordoma, Chronic Lymphocytic Leukemia (CLL), Chronic Myelogenous Leukemia (CML), Chronic Myeloproliferative Neoplasms, colon cancer, Colorectal Cancer, Craniopharyngioma, Cutaneous T-Cell Lymphoma, Ductal Carcinoma In Situ (DCIS), Endometrial Cancer, Uterine Cancer, Ependymoma, Esophageal cancer, Esthesioneuroblastoma, Head and Neck Cancer, Ewing Sarcoma, Bone Cancer, Extracranial Germ Cell Tumor, Extragonadal Germ Cell Tumor, Eye Cancer Childhood Intraocular Melanoma, Intraocular Melanoma, Retinoblastoma, Fallopian Tube Cancer, Fibrous Histiocytoma of Bone, Malignant, and Osteosarcoma, Gallbladder Cancer, Gastric Cancer, Gastrointestinal Carcinoid Tumor, Ovarian Cancer, Testicular Cancer, Gestational Trophoblastic Disease, Hairy Cell Leukemia, Head and Neck Cancer, Heart Tumors, Liver Cancer, Hodgkin Lymphoma, Hypopharyngeal Cancer, Intraocular Melanoma, Islet Cell Tumors, Pancreatic Neuroendocrine Tumors, Kaposi Sarcoma, Soft Tissue Sarcoma, Renal Cancer, Langerhans Cell Histiocytosis, Laryngeal Cancer, Leukemia, Lip and Oral Cavity Cancer, Lung Cancer (Non-Small Cell and Small Cell), Lymphoma, Male Breast Cancer, Malignant Fibrous Histiocytoma of Bone and Osteosarcoma. Melanoma, Skin Cancer, Merkel Cell Carcinoma, Mesothelioma, Metastatic Cancer, Metastatic Squamous Neck Cancer with Occult Primary, Midline Tract Carcinoma With NUT Gene Changes, Mouth Cancer, Multiple Endocrine Neoplasia Syndromes, Multiple Myeloma/Plasma Cell Neoplasms, Mycosis Fungoides, Myelodysplastic Syndromes, Myelodysplastic/Myeloproliferative Neoplasms, Myelogenous Leukemia, Chronic (CML), Myeloid Leukemia, Acute (AML), Myeloproliferative Neoplasms, Nasal Cavity and Paranasal Sinus Cancer, Nasopharyngeal Cancer, Neuroblastoma, Non-Hodgkin Lymphoma, Non-Small Cell Lung Cancer, Oral Cancer, Lip and Oral Cavity Cancer and Oropharyngeal Cancer, Osteosarcoma and Malignant Fibrous Histiocytoma of Bone, Ovarian Cancer, Pancreatic Cancer, Papillomatosis, Paraganglioma, Paranasal Sinus and Nasal Cavity Cancer, Parathyroid Cancer, Penile Cancer, Pharyngeal Cancer, Pheochromocytoma, Pituitary Tumor, Plasma Cell Neoplasm/Multiple Myeloma, Pleuropulmonary Blastoma, Pregnancy and Breast Cancer, Primary Central Nervous System (CNS) Lymphoma, Primary Peritoneal Cancer, Prostate Cancer, Rectal Cancer, Retinoblastoma, Rhabdomyosarcoma, Salivary Gland Cancer, Sarcoma Childhood Rhabdomyosarcoma, Childhood Vascular Tumors, Ewing Sarcoma, Kaposi Sarcoma, Osteosarcoma, Soft Tissue Sarcoma, Uterine Sarcoma, Sezary Syndrome, Small Cell Lung Cancer, Small Intestine Cancer, Soft Tissue Sarcoma, Squamous Cell Carcinoma of the Skin, Squamous Neck Cancer with Occult Primary, Stomach Cancer, T-Cell Lymphoma, Testicular Cancer, Throat Cancer, Nasopharyngeal Cancer, Oropharyngeal Cancer, Hypopharyngeal Cancer, Thymoma and Thymic Carcinoma, Thyroid Cancer, Transitional Cell Cancer of the Renal Pelvis and Ureter, Urethral Cancer, Uterine Cancer, Endometrial Cancer, Uterine Sarcoma, Vaginal Cancer, Vulvar Cancer, and/or Wilms Tumor. In particular embodiments, the sample comprises one or more esophageal cancer cells. In some embodiments, the sample comprises one or more colon cancer cells. In some embodiments, the sample comprises one or more Barrett's esophagus cells.

In some embodiments, the sample comprises cells and/or tissue from a subject suspected of having any of the neoplasias disclosed herein (e.g., esophageal adenocarcinoma), any of the cancers disclosed herein, or any of the metaplasias disclosed herein (e.g., Barrett's esophagus). Alternatively, a subject may be undergoing routine screening and may not necessarily be suspected of having such metaplasia or neoplasia.

A subject is in some embodiments a human subject. In other embodiments, a subject is a non-human animal.

In certain embodiments, it may be possible to detect a biomarker described herein (e.g., DNA methylation or protein expression level) directly in an organism without obtaining a separate portion of biological material. In such instances, the term "sample" is intended to encompass that portion of biological material that is contacted with a reagent or device involved in the detection process.

In certain embodiments, DNA comprising a target gene of interest is obtained from a bodily fluid sample. Examples of bodily fluids are blood, saliva, spit or an esophageal washing. Other body fluids can also be used. Because they can be easily obtained from a subject and can be used to screen for multiple diseases, blood or blood-derived fractions may be especially useful. Blood-derived fractions can comprise blood, serum, plasma, or other fractions. For example, a cellular fraction can be prepared as a "buffy coat" (i.e., leukocyte-enriched blood portion) by centrifuging 5 ml of whole blood for 10 min at 800 times gravity at room temperature. Red blood cells sediment most rapidly and are present as the bottom-most fraction in the centrifuge tube. The buffy coat is present as a thin creamy white colored layer on top of the red blood cells. The plasma portion of the blood forms a layer above the buffy coat. Fractions from blood can also be isolated in a variety of other ways. One method is by taking a fraction or fractions from a gradient used in centrifugation to enrich for a specific size or density of cells.

In some embodiments, DNA is isolated from samples. In some embodiments, the term "biological sample" or "sample" is used to refer to DNA isolated from a cell sample or tissue sample or bodily fluid sample or stool sample from a subject. Procedures for isolation of DNA from such samples are well known to those skilled in the art. Commonly, such DNA isolation procedures comprise lysis of any cells present in the samples using detergents, for example. After cell lysis, proteins are commonly removed from the DNA using various proteases. RNA is removed using RNase. The DNA is then commonly extracted with phenol, precipitated in alcohol and dissolved in an aqueous solution.

E. Methods of Use

In some embodiments, the disclosure provides for a method of preserving DNA methylation patterns in any of the target genes disclosed herein (or fragments thereof) in any of the biological samples disclosed herein. In some embodiments, the method comprises administering any of the biological samples disclosed herein to any of the storage solutions described herein. In some embodiments, the method comprises mixing any of the biological samples disclosed herein with any of the storage solutions described herein. In some embodiments, the method comprises treating any of the biological samples disclosed herein with any of the storage solutions described herein. In some embodiments, the method comprises storing any of the biological samples disclosed herein in any of the storage solutions described herein. In some embodiments, the method comprises storing the sample in the storage solution for at least 1 hour, 2 hours, 3 hours, 4 hours, 5 hours, 6 hours, 7 hours, 10 hours, 12 hours, 16 hours, 20 hours, 24 hours, 2 days, 3 days, 4 days, 5 days, 6 days, 7 days, 10 days, two weeks, 15 days, 16 days, 17 days, 18 days, 19 days, 20 days, 21 days, 22 days, 23 days, 24 days, 25 days, 26 days, 27 days, 28 days, 29 days, 30 days, 5 weeks, 6 weeks, 7 weeks, 8 weeks, 9 weeks, 10 weeks, 11 weeks, 12 weeks, 4 months, 5 months, 6 months, 7 months, 8 months, 9 months, 10 months, 11 months, 1 year, 18 months or 2 years. In some embodiments, the method comprises storing the sample in the storage solution at a temperature ranging from −30° C. to 50° C. In some embodiments, the method comprises storing the sample in the storage solution at a temperature ranging from −20° C. to 40° C. In some embodiments, the method comprises storing the sample in the storage solution at a temperature ranging from −10° C. to 30° C. In some embodiments, the method comprises storing the sample in the storage solution at a temperature ranging from 0° C. to 25° C. In some embodiments, the method comprises storing the sample in the storage solution at a temperature ranging from 4° C. to 25° C. In some embodiments, the method comprises storing the sample in the storage solution at a temperature ranging from −10° C. to 10° C. In some embodiments, the method comprises storing the sample in the storage solution at a temperature ranging from 15° C. to 25° C. In some embodiments, the method comprises storing the sample in the storage solution at room temperature. In some embodiments, the method comprises storing the sample in the storage solution for at least 1 hour, 2 hours, 3 hours, 4 hours, 5 hours, 6 hours, 7 hours, 10 hours, 12 hours, 16 hours, 20 hours, 24 hours, 2 days, 3 days, 4 days, 5 days, 6 days, 7 days, 10 days, two weeks, 15 days, 16 days, 17 days, 18 days, 19 days, 20 days, 21 days, 22 days, 23 days, 24 days, 25 days, 26 days, 27 days, 28 days, 29 days, 30 days, 5 weeks, 6 weeks, 7 weeks, 8 weeks, 9 weeks, 10 weeks, 11 weeks, 12 weeks, 4 months, 5 months, 6 months, 7 months, 8 months, 9 months, 10 months, 11 months, 1 year, 18 months or 2 years at 23° C. In some embodiments, the method comprises storing the sample in the storage solution for at least 1 hour, 2 hours, 3 hours, 4 hours, 5 hours, 6 hours, 7 hours, 10 hours, 12 hours, 16 hours, 20 hours, 24 hours, 2 days, 3 days, 4 days, 5 days, 6 days, 7 days, 10 days, two weeks, 15 days, 16 days, 17 days, 18 days, 19 days, 20 days, 21 days, 22 days, 23 days, 24 days, 25 days, 26 days, 27 days, 28 days, 29 days, 30 days, 5 weeks, 6 weeks, 7 weeks, 8 weeks, 9 weeks, 10 weeks, 11 weeks, 12 weeks, 4 months, 5 months, 6 months, 7 months, 8 months, 9 months, 10 months, 11 months, 1 year, 18 months or 2 years at 40° C. In some embodiments, the method comprises storing the sample in the storage solution for at least 1 hour, 2 hours, 3 hours, 4 hours, 5 hours, 6 hours, 7 hours, 10 hours, 12 hours, 16 hours, 20 hours, 24 hours, 2 days, 3 days, 4 days, 5 days, 6 days, 7 days, 10 days, two weeks, 15 days, 16 days, 17 days, 18 days, 19 days, 20 days, 21 days, 22 days, 23 days, 24 days, 25 days, 26 days, 27 days, 28 days, 29 days, 30 days, 5 weeks, 6 weeks, 7 weeks, 8 weeks, 9 weeks, 10 weeks, 11 weeks, 12 weeks, 4 months, 5 months, 6 months, 7 months, 8 months, 9 months, 10 months, 11 months, 1 year, 18 months or 2 years at 50° C. In some embodiments, the method comprises storing the sample in the storage solution for at least 1 hour, 2 hours, 3 hours, 4 hours, 5 hours, 6 hours, 7 hours, 10 hours, 12 hours, 16 hours, 20 hours, 24 hours, 2 days, 3 days, 4 days, 5 days, 6 days, 7 days, 10 days, two weeks, 15 days, 16 days, 17 days, 18 days, 19 days, 20 days, 21 days, 22 days, 23 days, 24 days, 25 days, 26 days, 27 days, 28 days, 29 days, 30 days, 5 weeks, 6 weeks, 7 weeks, 8 weeks, 9 weeks, 10 weeks, 11 weeks, 12 weeks, 4 months, 5 months, 6 months, 7 months, 8 months, 9 months, 10 months, 11 months, 1 year, 18 months or 2 years at 4° C. In some embodiments, the method comprises storing the sample in the storage solution for at least 1 hour, 2 hours, 3 hours, 4 hours, 5 hours, 6 hours, 7 hours, 10 hours, 12 hours, 16 hours, 20 hours, 24 hours, 2 days, 3 days, 4 days, 5 days, 6 days, 7 days, 10 days, two weeks, 15 days, 16 days, 17 days, 18 days, 19 days, 20 days, 21 days, 22 days, 23 days, 24 days, 25 days, 26 days, 27 days, 28 days, 29 days, 30 days, 5 weeks, 6 weeks, 7 weeks, 8 weeks, 9 weeks, 10 weeks, 11 weeks, 12 weeks, 4 months, 5 months, 6 months, 7 months, 8 months, 9 months, 10 months, 11 months, 1 year, 18 months or 2 years at −10° C. In some embodiments, the method comprises storing the sample in the storage solution for at least 1 hour, 2 hours, 3 hours, 4 hours, 5 hours, 6 hours, 7 hours, 10 hours, 12 hours, 16 hours, 20 hours, 24 hours, 2 days, 3 days, 4 days, 5 days, 6 days, 7 days, 10 days, two weeks, 15 days, 16 days, 17 days, 18 days, 19 days, 20 days, 21 days, 22 days, 23 days, 24 days, 25 days, 26 days, 27 days, 28 days, 29 days, 30 days, 5 weeks, 6 weeks, 7 weeks, 8 weeks, 9 weeks, 10 weeks, 11 weeks, 12 weeks, 4 months, 5 months, 6 months, 7 months, 8 months, 9 months, 10 months, 11 months, 1 year, 18 months or 2 years at −30° C. In some embodiments, the method comprises storing the sample in the storage solution for at least 1 hour, 2 hours, 3 hours, 4 hours, 5 hours, 6 hours, 7 hours, 10 hours, 12 hours, 16 hours, 20 hours, 24 hours, 2 days, 3 days, 4 days, 5 days, 6 days, 7 days, 10 days, two weeks, 15 days, 16 days, 17 days, 18 days, 19 days, 20 days, 21 days, 22 days, 23 days, 24 days, 25 days, 26 days, 27 days, 28 days, 29 days, 30 days, 5 weeks, 6 weeks, 7 weeks, 8 weeks, 9 weeks, 10 weeks, 11 weeks, 12 weeks, 4 months, 5 months, 6 months, 7 months, 8 months, 9 months, 10 months, 11 months, 1 year, 18 months or 2 years at a temperature ranging between −30° C. to 50° C.

In some embodiments, the storage sample is stored in a container. In some embodiments, the container is a vial. In some embodiments, the container is made of glass. In some embodiments, the container is made of plastic. In some embodiments, the container is made of polypropylene. In some embodiments, the container is made of polystyrene. In some embodiments, the container is capable of holding a volume of at least 5 ml, 10 ml, 15 ml, 20 ml, 25 ml, 30 ml, 35 ml, 40 ml, 50 ml, 75 ml or 100 ml. In some embodiments, the container is a centrifuge vial. In some embodiments, if the sample is collected by means of a balloon (e.g., if obtaining an esophageal sample), the centrifuge vial is capable of completely covering the balloon and sample when added to the vial. In some embodiments, if the sample is collected by means of a balloon (e.g., if obtaining an esophageal sample), the centrifuge vial is capable of completely covering the balloon when 60%-70% full and the sample when added to the vial. In particular embodiments, the centrifuge vial is free-standing 30 ml polypropylene tube (see, e.g., Evergreen Scientific).

In some embodiments, the disclosure provides for a kit comprising any of the containers disclosed herein and any of the storage solutions disclosed herein. In some embodiments, the kit further comprises instructions for using the container and storage solution. In some embodiments, the kit further comprises an instrument for obtaining a sample from a subject (e.g., a balloon). In particular embodiments, the kit comprises a storage solution comprising 50:50 methanol:

water. In further embodiments, the kit comprises a storage solution comprising 50:50 methanol:water, and the kit further comprises a container that is a 30 ml polypropylene centrifuge vial.

In some embodiments, once any of the samples disclosed herein has been added to any of the containers disclosed herein comprising any of the storage solutions disclosed herein, the container is then placed in a package. In some embodiments, the package is an envelope or a box. In some embodiments, the box is a cardboard box. In some embodiments, the package comprises a mailing label. In some embodiments, the box is shipped to another location for analysis of the sample.

In some embodiments, any of the samples stored in any of the storage solutions described herein may be used in any of the methods disclosed herein. In some embodiments, the sample comprising methylated DNA may be used in an assay for detecting differentially methylated nucleotide sequences. In certain embodiments, the application provides assays for detecting differentially methylated nucleotide sequences (e.g., vimentin and/or CCNA1). Thus, in some embodiments, a differentially methylated nucleotide sequence, in its methylated state, can serve as a target for detection using various methods described herein and the methods that are well within the purview of the skilled artisan in view of the teachings of this application.

In certain aspects, such methods for detecting methylated nucleotide sequences (e.g., vimentin and/or CCNA1) are based on treatment of genomic DNA with a chemical compound which converts non-methylated C, but not methylated C (i.e., 5 mC), to a different nucleotide base. One such compound is sodium bisulfite (also referred to simply as "bisulfite" herein), which converts C, but not 5 mC, to U. Methods for bisulfite treatment of DNA are known in the art (Herman, et al., 1996, Proc Natl Acad Sci USA, 93:9821-6; Herman and Baylin, 1998, Current Protocols in Human Genetics, N. E. A. Dracopoli, ed., John Wiley & Sons, 2:10.6.1-10.6.10; U.S. Pat. No. 5,786,146). To illustrate, when a DNA molecule that contains unmethylated C nucleotides is treated with sodium bisulfite to become a compound-converted DNA, the sequence of that DNA is changed (C→U). Detection of the U in the converted nucleotide sequence is indicative of an unmethylated C.

The different nucleotide base (e.g., U) present in compound-converted nucleotide sequences can subsequently be detected in a variety of ways. In a particular embodiment, the disclosure provides a method of detecting U in compound-converted DNA sequences by using "methylation sensitive PCR" (MSP) (see, e.g., Herman, et al., 1996, Proc. Natl. Acad. Sci. USA, 93:9821-9826; U.S. Pat. Nos. 6,265,171; 6,017,704; 6,200,756). In MSP, one set of primers (i.e., comprising a forward and a reverse primer) amplifies the compound-converted template sequence if C bases in CpG dinucleotides within the DNA are methylated. This set of primers is called "methylation-specific primers." Another set of primers amplifies the compound-converted template sequence if C bases in CpG dinucleotides within the 5' flanking sequence are not methylated. This set of primers is called "unmethylation-specific primers."

In MSP, the reactions use the compound-converted DNA from a sample in a subject. In assays for methylated DNA, methylation-specific primers are used. In the case where C within CpG dinucleotides of the target sequence of the DNA are methylated, the methylation-specific primers will amplify the compound-converted template sequence in the presence of a polymerase and an MSP product will be produced. If C within CpG dinucleotides of the target sequence of the DNA is not methylated, the methylation-specific primers will not amplify the compound-converted template sequence in the presence of a polymerase and an MSP product will not be produced. In some embodiments, any of the bisulfite converted methylated sequences disclosed herein is used as a marker for a particular indication.

In some embodiments, it is also useful to run a control reaction for the detection of unmethylated DNA. The reaction uses the compound-converted DNA from a sample in a subject and unmethylation-specific primers are used. In the case where C within CpG dinucleotides of the target sequence of the DNA are unmethylated, the unmethylation specific primers will amplify the compound-converted template sequence in the presence of a polymerase and an MSP product will be produced. If C within CpG dinucleotides of the target sequence of the DNA is methylated, the unmethylation-specific primers will not amplify the compound-converted template sequence in the presence of a polymerase and an MSP product will not be produced. Note that a biologic sample will often contain a mixture of both neoplastic cells that give rise to a signal with methylation specific primers, and normal cellular elements that give rise to a signal with unmethylation-specific primers. The unmethylation specific signal is often of use as a control reaction, but does not in this instance imply the absence of neoplasia as indicated by the positive signal derived from reactions using the methylation specific primers.

Primers for a MSP reaction are derived from the compound-converted template sequence. Herein, "derived from" means that the sequences of the primers are chosen such that the primers amplify the compound-converted template sequence in a MSP reaction. Each primer comprises a single-stranded DNA fragment which is at least 8 nucleotides in length. In some embodiments, the primers are less than 50 nucleotides in length, or in some embodiments, from 15 to 35 nucleotides in length. Because the compound-converted template sequence can be either the Watson strand or the Crick strand of the double-stranded DNA that is treated with sodium bisulfite, the sequences of the primers is dependent upon whether the Watson or Crick compound-converted template sequence is chosen to be amplified in the MSP. Either the Watson or Crick strand can be chosen to be amplified.

The compound-converted template sequence, and therefore the product of the MSP reaction, is, in some embodiments, between 20 to 3000 nucleotides in length. In other embodiments, the product of the MSP reaction is between 20 to 200 nucleotides in length. In other embodiments, the product of the MSP reaction is between 20 to 100 nucleotides in length. In other embodiments, the product of the MSP reaction is between 30 to 200 nucleotides in length. In other embodiments, the product of the MSP reaction is between 50 to 1000 nucleotides in length. In other embodiments, the product of the MSP reaction is between 50 to 100 nucleotides in length. In other embodiments, the product of the MSP reaction is between 50 to 200 nucleotides in length. In other embodiments, the product of the MSP reaction is between 50 to 500 nucleotides in length. In other embodiments, the product of the MSP reaction is between 80-150 nucleotides in length. In some embodiments, the product of the MSP reaction is at least 20, 30, 40, 50, 60, 70, 80, 90, 100, 110, 120, 130, 140, 150, 160, 170, 180, 190, 200, 210, 220, 230, 240 or 250 nucleotides in length. In some embodiments, the methylation-specific primers result in an MSP product of a different length than the MSP product produced by the unmethylation-specific primers.

A variety of methods can be used to determine if an MSP product has been produced in a reaction assay. One way to determine if an MSP product has been produced in the reaction is to analyze a portion of the reaction by agarose gel electrophoresis. For example, a horizontal agarose gel of from 0.6 to 2.0% agarose is made and a portion of the MSP reaction mixture is electrophoresed through the agarose gel. After electrophoresis, the agarose gel is stained with ethidium bromide. MSP products are visible when the gel is viewed during illumination with ultraviolet light. By comparison to standardized size markers, it is determined if the MSP product is of the correct expected size.

Other methods can be used to determine whether a product is made in an MSP reaction. One such method is called "real-time PCR." Real-time PCR utilizes a thermal cycler (i.e., an instrument that provides the temperature changes necessary for the PCR reaction to occur) that incorporates a fluorimeter (i.e. an instrument that measures fluorescence). The real-time PCR reaction mixture also contains a reagent whose incorporation into a product can be quantified and whose quantification is indicative of copy number of that sequence in the template. One such reagent is a fluorescent dye, called SYBR Green I (Molecular Probes, Inc.; Eugene, Oregon) that preferentially binds double-stranded DNA and whose fluorescence is greatly enhanced by binding of double-stranded DNA. When a PCR reaction is performed in the presence of SYBR Green I, resulting DNA products bind SYBR Green I and fluorescence. The fluorescence is detected and quantified by the fluorimeter. Such technique is particularly useful for quantification of the amount of the product in the PCR reaction. Additionally, the product from the PCR reaction may be quantitated in "real-time PCR" by the use of a variety of probes that hybridize to the product including TaqMan probes and molecular beacons. Quantitation may be on an absolute basis, or may be relative to a constitutively methylated DNA standard, or may be relative to an unmethylated DNA standard. In one instance the ratio of methylated derived product to unmethylated derived product may be constructed.

Methods for detecting methylation of the DNA according to the present disclosure are not limited to MSP, and may cover any assay for detecting DNA methylation. Another example method of detecting methylation of the DNA is by using "methylation-sensitive" restriction endonucleases. Such methods comprise treating the genomic DNA isolated from a subject with a methylation-sensitive restriction endonuclease and then using the restriction endonuclease-treated DNA as a template in a PCR reaction. Herein, methylation-sensitive restriction endonucleases recognize and cleave a specific sequence within the DNA if C bases within the recognition sequence are not methylated. If C bases within the recognition sequence of the restriction endonuclease are methylated, the DNA will not be cleaved. Examples of such methylation-sensitive restriction endonucleases include, but are not limited to HpaII, SmaI, SacII, EagI, BstUI, and BssHII. In this technique, a recognition sequence for a methylation-sensitive restriction endonuclease is located within the template DNA, at a position between the forward and reverse primers used for the PCR reaction. In the case that a C base within the methylation-sensitive restriction endonuclease recognition sequence is not methylated, the endonuclease will cleave the DNA template and a PCR product will not be formed when the DNA is used as a template in the PCR reaction. In the case that a C base within the methylation-sensitive restriction endonuclease recognition sequence is methylated, the endonuclease will not cleave the DNA template and a PCR product will be formed when the DNA is used as a template in the PCR reaction. Therefore, methylation of C bases can be determined by the absence or presence of a PCR product (Kane, et al., 1997, Cancer Res, 57:808-11). In particular embodiments, no sodium bisulfite is used in this technique.

Yet another exemplary method of detecting methylation of the DNA is called the modified MSP, which method utilizes primers that are designed and chosen such that products of the MSP reaction are susceptible to digestion by restriction endonucleases, depending upon whether the compound-converted template sequence contains CpG dinucleotides or UpG dinucleotides.

Yet other methods for detecting methylation of the DNA include the MS-SnuPE methods. This method uses compound-converted DNA as a template in a primer extension reaction wherein the primers used produce a product, dependent upon whether the compound-converted template contains CpG dinucleotides or UpG dinucleotides (see e.g., Gonzalgo, et al., 1997, Nucleic Acids Res., 25:2529-31).

Another exemplary method of detecting methylation of the DNA is called COBRA (i.e., combined bisulfite restriction analysis). This method has been routinely used for DNA methylation detection and is well known in the art (see, e.g., Xiong, et al., 1997, Nucleic Acids Res, 25:2532-4). In this technique, methylation-sensitive restriction endonucleases recognize and cleave a specific sequence within the DNA if C bases within the recognition sequence are methylated. If C bases within the recognition sequence of the restriction endonuclease are not methylated, the DNA will not be cleaved. In some embodiments, the method utilizes methylation-sensitive restriction endonucleases.

Another exemplary method of detecting methylation of DNA requires hybridization of a compound converted DNA to arrays that include probes that hybridize to sequences derived from a methylated template.

Another exemplary method of detecting methylation of DNA includes precipitation of methylated DNA with antibodies that bind methylated DNA or with other proteins that bind methylated DNA, and then detection of DNA sequences in the precipitate. The detection of DNA could be done by PCR based methods, by hybridization to arrays, or by other methods known to those skilled in the art.

Another exemplary method of detecting methylation of DNA is by Quantitative allele-specific real-time target and signal amplification (QuARTS) as performed on bisulfite converted DNA (see e.g., Zou et al., 2012, Clin. Chem., 58:375-83).

Another exemplary method of detecting methylation of DNA is by single molecule, real-time sequencing (SMRT) and nanopore-based sequencing of DNA that can directly detect DNA bases that are modified by methylation (see e.g., Beaulerier et al., Nat Rev Genet, 2019, 20:157-172). SMRT may in some instances be performed on instrumentation manufactured by Pacific Biosciences (PacBio) (see e.g. https://www.pacb.com/smrt-science/smrt-sequencing/epigenetics/).

Another exemplary method of detecting methylated DNA is bisulfite sequencing that involves amplification of a target region of bisulfite converted DNA using methylation indifferent PCR primers that amplify converted DNAs derived from both methylated and unmethylated templates. The methylation indifferent primers are often designed to be both methylation indifferent and bisulfite specific, i.e. to amplify only bisulfite converted target DNAs and not to amplify non-converted target sequences. In some embodiments, the amplified DNAs then may be characterized by Next Generation Sequencing methods that allow each cytosine base in the original template to be assessed within each DNA sequence read for the presence of methylation (retention of cytosine) or the absence of methylation (conversion to thymidine). The percent of methylation at each cytosine base in the original template can then be calculated by the percent of DNA reads in which the cytosine is preserved as cytosine versus is converted to thymidine. Similarly, the percent of methylation across a region of interest can be assessed by determining a rule for assessing the region as methylated or unmethylated in an individual DNA read (i.e. determining a cutoff for methylation in the region that will categorize the region as "methylated"), and then determining the percent of DNA reads in which the region qualifies as methylated.

In certain embodiments, the disclosure provides methods that involve directly sequencing the product resulting from an MSP reaction to determine if the compound-converted template sequence contains CpG dinucleotides or UpG dinucleotides. Molecular biology techniques such as directly sequencing a PCR product are well known in the art.

In some embodiments, methylation of DNA may be measured as a percentage of total DNA. High levels of methylation may be 1-100% methylation, for example, 1%, 10%, 20%, 30%, 40%, 50%, 60%, 70%, 80%, 90%, or 100% methylation. Low levels of methylation may be 0%-0.99% methylation, for example, 0%, 0.1%, 0.5%, 0.6%, 0.7%, 0.8%, 0.9%. At least some normal tissues, for example, normal esophagus samples, may not have any detectable methylation.

In some embodiments, the methylated DNA stored in any of the storage solutions disclosed herein may encode a polypeptide that, for example, may function as a tumor suppressor gene. Accordingly, the application further provides methods for detecting such polypeptides in the samples. In some embodiments, the disclosure provides detection methods by assaying such polypeptides so as to determine whether a patient has or does not have a disease condition. Further, such a disease condition may be characterized by decreased levels of such polypeptides. In certain embodiments, the disclosure provides methods for determining whether a patient is or is not likely to have cancer by detecting such polypeptides. In further embodiments, the disclosure provides methods for determining whether the patient is having a relapse or determining whether a patient's cancer is responding to treatment.

Optionally, such methods involve obtaining a quantitative measure of the protein in the sample. In view of this specification, one of skill in the art will recognize a wide range of techniques that may be employed to detect and optionally quantitate the presence of a protein. In some embodiments, a protein is detected with an antibody. In many embodiments, an antibody-based detection assay involves bringing the sample and the antibody into contact so that the antibody has an opportunity to bind to proteins having the corresponding epitope. In many embodiments, an antibody-based detection assay also typically involves a system for detecting the presence of antibody-epitope complexes, thereby achieving a detection of the presence of the proteins having the corresponding epitope. Antibodies may be used in a variety of detection techniques, including enzyme-linked immunosorbent assays (ELISAs), immunoprecipitations, Western blots. Antibody-independent techniques for identifying a protein may also be employed. For example, mass spectroscopy, particularly coupled with liquid chromatography, permits detection and quantification of large numbers of proteins in a sample. Two-dimensional gel electrophoresis may also be used to identify proteins, and may be coupled with mass spectroscopy or other detection techniques, such as N-terminal protein sequencing. RNA aptamers with specific binding for the protein of interest may also be generated and used as a detection reagent. Samples should generally be prepared in a manner that is consistent with the detection system to be employed. For example, a sample to be used in a protein detection system should generally be prepared in the absence of proteases. Likewise, a sample to be used in a nucleic acid detection system should generally be prepared in the absence of nucleases. In many instances, a sample for use in an antibody-based detection system will not be subjected to substantial preparatory steps. For example, urine may be used directly, as may saliva and blood, although blood will, in certain embodiments, be separated into fractions such as plasma and serum.

In certain embodiments, a method of the disclosure comprises detecting in any of the samples stored in any of the storage solutions disclosed herein the presence of an expressed nucleic acid, such as an mRNA. Optionally, the method involves obtaining a quantitative measure of the expressed nucleic acid in the sample. In view of this specification, one of skill in the art will recognize a wide range of techniques that may be employed to detect and optionally quantitate the presence of a nucleic acid. Nucleic acid detection systems generally involve preparing a purified nucleic acid fraction of a sample, and subjecting the sample to a direct detection assay or an amplification process followed by a detection assay. Amplification may be achieved, for example, by polymerase chain reaction (PCR), reverse transcriptase (RT) and coupled RT-PCR. Detection of a nucleic acid is generally accomplished by probing the purified nucleic acid fraction with a probe that hybridizes to the nucleic acid of interest, and in many instances, detection involves an amplification as well. Northern blots, dot blots, microarrays, quantitative PCR, and quantitative RT-PCR are all well-known methods for detecting a nucleic acid in a sample.

In certain embodiments, the disclosure provides nucleic acid probes that bind specifically to any of the nucleic acids from any of the samples stored in any of the storage samples disclosed herein. In some embodiments, the disclosure provides nucleic acid probes that bind specifically to a nucleic acid amplified from DNA (which may be optionally pre-treated with a reagent such as bisulfite) from any of the samples stored in any of the storage samples disclosed herein. Such probes may be labeled with, for example, a fluorescent moiety, a radionuclide, an enzyme or an affinity tag such as a biotin moiety. For example, the TaqMan® system employs nucleic acid probes that are labeled in such a way that the fluorescent signal is quenched when the probe is free in solution and bright when the probe is incorporated into a larger nucleic acid.

Immunoscintigraphy using monoclonal antibodies directed at the methylated DNA (e.g., methylated DNA stored in any of the storage solutions described herein), or an amplicon of the methylated DNA (or an amplicon of pre-treated DNA, e.g., with bisulfite), may be used to detect and/or diagnose a cancer. For example, monoclonal antibodies against the methylated target gene (or a bisulfite converted amplicon thereof) labeled with $^{99}$Technetium, $^{111}$Indium, $^{125}$Iodine—may be effectively used for such imaging. As will be evident to the skilled artisan, the amount of radioisotope to be administered is dependent upon the radioisotope. Those having ordinary skill in the art can readily formulate the amount of the imaging agent to be administered based upon the specific activity and energy of a given radionuclide used as the active moiety. Typically 0.1-100 millicuries per dose of imaging agent, 1-10 millicuries, or often 2-5 millicuries are administered. Thus, compositions according to the present invention useful as imaging agents comprising a targeting moiety conjugated to a radioactive moiety comprise 0.1-100 millicuries, in some embodiments 1-10 millicuries, in some embodiments 2-5 millicuries, in some embodiments 1-5 millicuries.

In some embodiments, the disclosure provides for a device useful for detecting the methylation status of any of the target genes, or fragments or complements thereof, disclosed herein. In some embodiments, the disclosure provides for a kit comprising components useful for detecting the methylation status of the target gene, or fragments, or complements thereof, disclosed herein. In some embodiments, the kit comprises a swallowable balloon for collecting an esophageal sample from the subject. In some embodiments, the kit comprises any of the swallowable balloon devices disclosed in published US application 2016/317132, which is incorporated herein in its entirety. In some embodiments, the disclosure provides for a kit comprising primers for amplifying any of the target genes described herein, and instructions for performing any of the methods disclosed herein. In some embodiments, the kit further comprises bisulfite. In some embodiments, the kit further comprises an object suitable for collecting a sample from a subject (e.g., a brush and or balloon). In some embodiments, the disclosure provides for a kit comprising any of the therapeutic agents disclosed herein and instructions for performing any of the therapeutic methods disclosed herein.

A variety of assay formats may be used and, in light of the present disclosure, those not expressly described herein will nevertheless be considered to be within the purview of ordinary skill in the art. Assay formats can approximate such conditions as protein expression level, methylation status of nucleotide sequences, tumor suppressing activity, and may be generated in many different forms. In many embodiments, the disclosure provides assays including both cell-free systems and cell-based assays which utilize intact cells.

In some embodiments, the disclosure provides for a method of diagnosing a subject as having a neoplasia (e.g., esophageal cancer) or a metaplasia (e.g., Barrett's Esophagus) by determining whether a target gene in a sample from the subject is more methylated than a reference target gene. In some embodiments, the subject is determined to have a neoplasia or a metaplasia if the target gene is at least 20%, 30%, 40%, 50%, 60%, 70%, 80%, 90% or 100% more methylated as compared a reference target gene. In some embodiments, the reference target gene is from a healthy control subject.

In some embodiments, the disclosure provides a method for selecting a subject to undergo a treatment or a diagnostic procedure, such as an endoscopy. In some embodiments the disclosure provides a method for selecting a subject to undergo an endoscopy by identifying the subject as at increased risk for harboring an esophageal metaplasia (e.g., Barrett's esophagus) or neoplasia (e.g., esophageal cancer).

In addition to diagnosis, assaying of a marker in a sample from a subject not known to have a metaplasia or neoplasia (e.g., of the upper gastrointestinal tract) can be prognostic for the subject (i.e., indicating the probable course of the disease). To illustrate, subjects having a predisposition to develop a metaplasia or neoplasia of the upper gastrointestinal tract may possess methylated nucleotide sequences. Assaying of methylated target genes (e.g., vimentin and/or CCNA1) in a sample from subjects can also be used to select a particular therapy or therapies which are particularly effective against, e.g., a neoplasia or metaplasia of the upper gastrointestinal tract in the subject, or to exclude therapies that are not likely to be effective.

Assaying of methylated target genes (e.g., vimentin and/or CCNA1) in samples from subjects that are known to have, or to have had, a cancer is also useful. For example, the present methods can be used to identify whether therapy is effective or not for certain subjects. One or more samples are taken from the same subject prior to and following therapy and stored in any of the storage solutions disclosed herein, and assayed for methylation patterns of the target gene. A finding that a target gene is methylated in the sample taken prior to therapy and absent (or at a lower level) after therapy may indicate that the therapy is effective and need not be altered. In those cases where the target gene is methylated in the sample taken before therapy and in the sample taken after therapy, it may be desirable to alter the therapy to increase the likelihood that the cancer will be reduced in the subject. Thus, the present method may obviate the need to perform more invasive procedures which are used to determine a patient's response to therapy.

Cancers frequently recur following therapy in patients with advanced cancers. In this and other instances, the assays of the invention are useful for monitoring over time the status of a cancer associated with silencing of genes located in any of the target genes disclosed herein. In some embodiments, for subjects in whom a cancer is progressing, there can be no DNA methylation in some or all samples when the first sample is taken and then appear in one or more samples when the second sample is taken. In some embodiments, for subjects in which cancer is regressing, DNA methylation may be present in one or a number of samples when the first sample is taken and then be absent in some or all of these samples when the second sample is taken.

Exemplification

The invention now being generally described, it will be more readily understood by reference to the following examples, which are included merely for purposes of illustration of certain aspects and embodiments of the present invention, and are not intended to limit the invention.

Example 1

The properties of different liquid medium for preserving DNA methylation patterns were interrogated as assayed by bisulfite sequencing across two genomic regions that have been demonstrated to display differential methylation in Barrett's esophagus and Barrett's related neoplasias, and that respectively map to the Vimentin and CCNA1 genomic regions (Moinova et al., Science translational medicine, 2018; 10 (424), PMCID: PMC5789768). The percent DNA methylation was assessed as the percent of individual DNA sequence reads that demonstrated cytosine methylation at $\geq 8$ of 10 CpG sites within the vimentin differentially methylated region or that demonstrated cytosine methylation at $\geq 16$ of 21 CpG sites within the CCNA1 differentially methylated region, as described in Moinova et al. To enable this study, mixtures of cells were prepared from two cancer cell lines previously characterized that are either fully methylated (H1975) or unmethylated (SKGT4) for aberrant methylation at these two genomic loci.

A master mixture of 1% cells from the fully methylated cell line and 99% cells from the unmethylated cell line were pelleted and different duplicate aliquots were processed by:

a) addition of 100% methanol at room temperature (denoted "100% MeOH"). A peroxide-free methanol solution was selected for use (Fisher, Cat #BP1105-4, with peroxide less than or equal to 0.001%);
b) addition of a 50% methanol and 50% water mixture at room temperature (denoted "50% MeOH"). A peroxide-free methanol solution was selected for use (Fisher, Cat #BP1105-4, with peroxide less than or equal to 0.001%) as was an UltraPure DNase/RNase free distilled water (Invitrogen, Cat #10977-015);
c) addition at room temperature of a commercial cell sample preservative, CytoLyt®, that is composed of methanol, water, and salts of magnesium, sodium, potassium, acetate, and chloride (denoted "cytolyt");
d) addition of a commercial cell sample preservative CytoLyt® refrigerated to 4 degrees Centigrade (denoted "cytolyt 4deg");
e) flash freezing (denoted "frozen");
f) addition of neutral buffered formalin (denoted "NBF");
g) addition at room temperature of a commercial cell sample preservative, PreservCyt®, that is composed of methanol, water, EDTA disodium salt, and glacial acetic acid (denoted "preservecyt"); or
h) addition at room temperature of DNA/RNA Shield™, a DNA/RNA stabilization solution produced commercially by Zymo Research (denoted "shield").

Figure 1A:
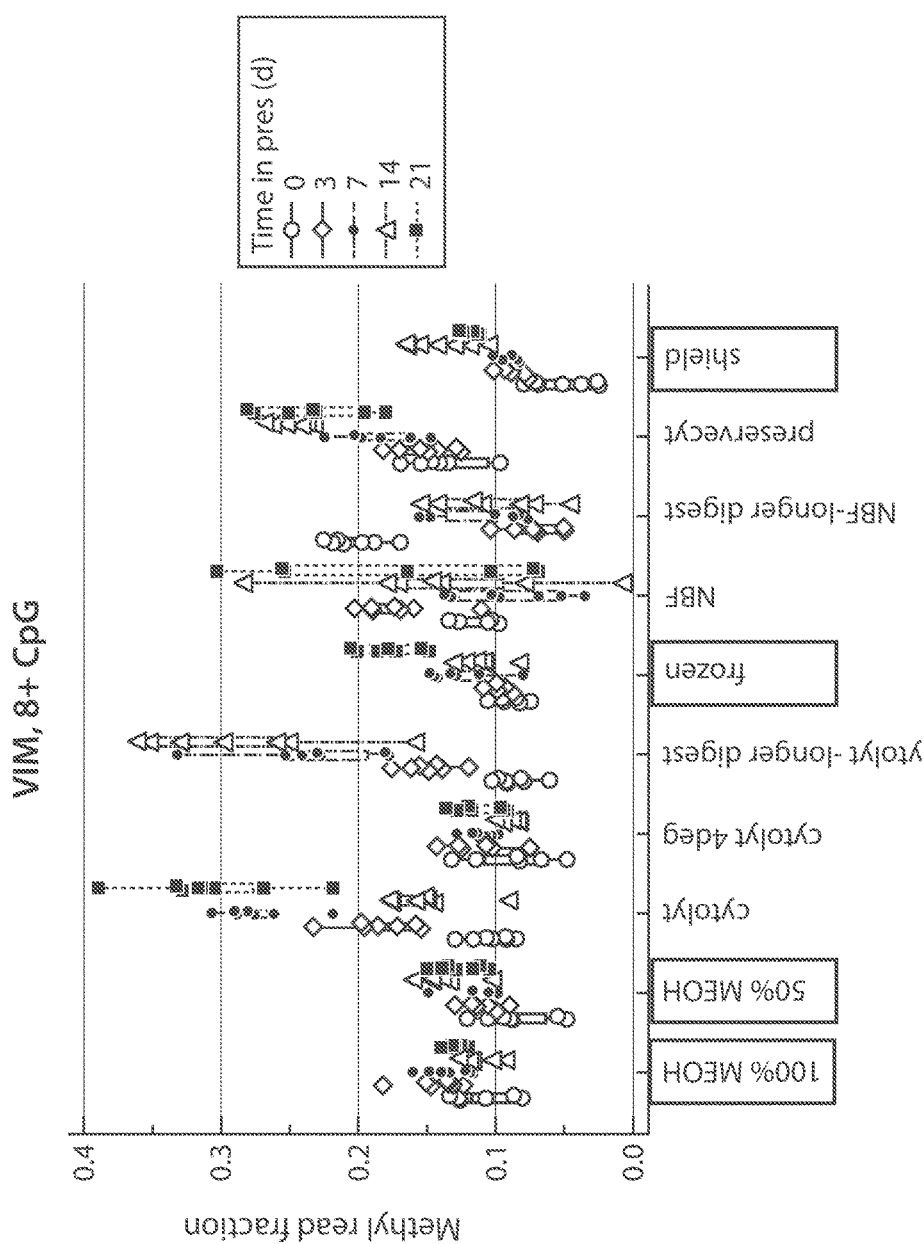
FIGS. 1A and 1B: Time Course Study of Liquid Medium Effect on Assay of DNA Methylation. The preservative conditions are indicated on the x-axis, while the methyl read fraction is indicated on the y-axis. "VIM" corresponds to vimentin. "4deg" means storage at 4° C. "NBF" means neutral buffered formalin. Note: 0 time point for "shield" made on different day than other preservative conditions.
Figure 1B:
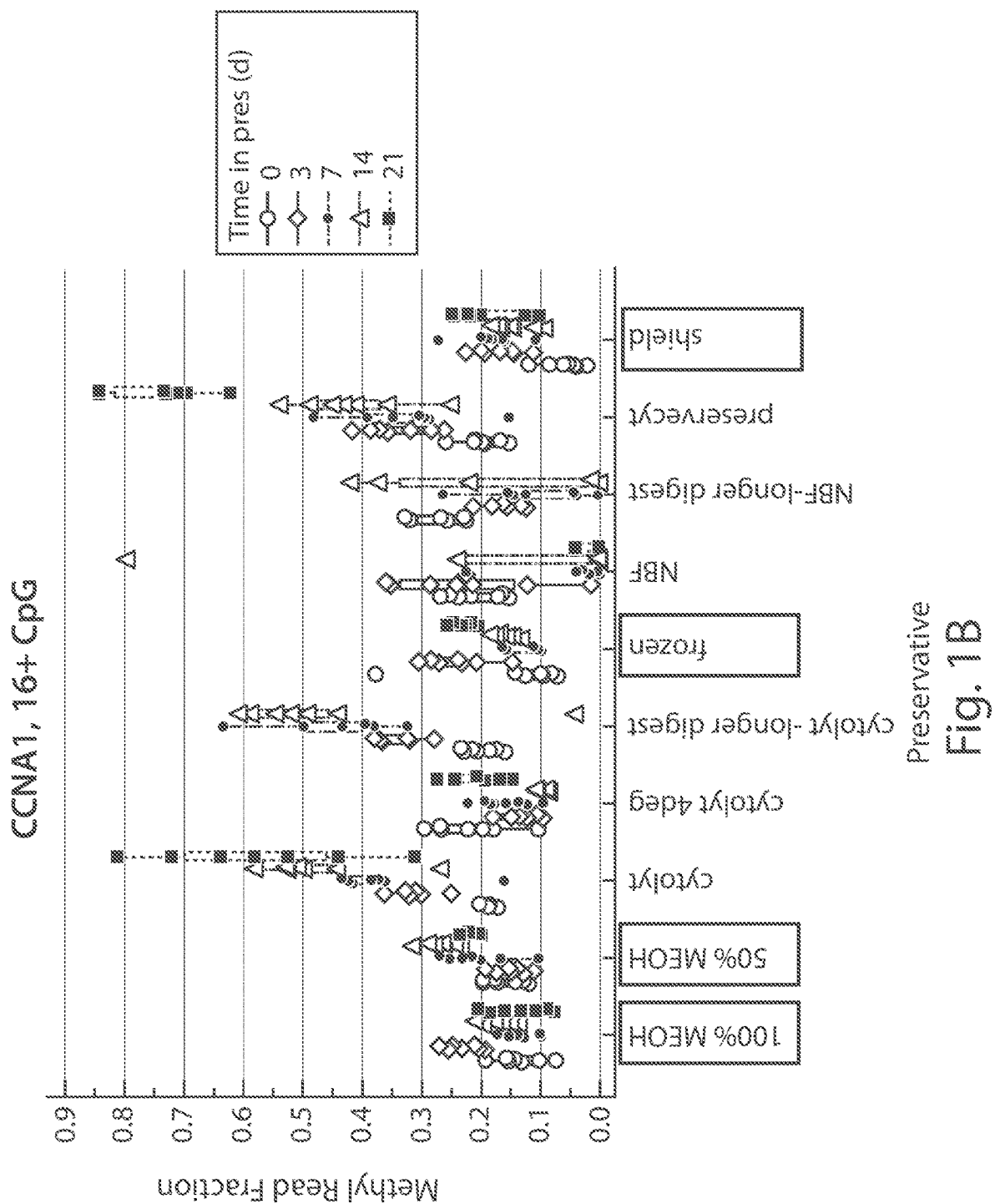

Prior to DNA extraction, cells were maintained under the conditions a)-h) above for periods of time that included: 0 time, 3 days, 7 days, 14 days and 21 days (as indicated in FIGS. 1A and 1B by symbols respectively denoted 0, 3, 7, 14, 21). Extracted DNA from the cell mixtures was then assayed for cytosine methylation within the vimentin differentially methylated region (VIM, as shown in FIG. 1A) and the CCNA1 differentially methylated region (CCNA1, as shown in FIG. 1B), as described in Moinova et al., with testing of 7 repeat aliquots from each bisulfite converted DNA. Additionally, duplicate aliquots were prepared for cells treated with room temperature CytoLyt® and for cells treated with neutral buffered formalin, that were processed for DNA extraction using either an overnight digestion with Proteinase K or prolonged digestion for a further 48 hours with fresh proteinase K added daily. The samples processed with prolonged digestion with Proteinase K are respectively denoted as "cytolyt-longer digest" and "NBF-longer digest".

As shown in FIGS. 1A and 1B, for DNA extracted from frozen cells, methylation values for both the vimentin and CCNA1 differentially methylated region were highly reproducible in multiple assays performed on cells maintained in the frozen state for an equal period of time. These values were also highly stable and reproducible across time for cells maintained in the frozen state from 0 to 14 days (for vimentin gene associated methylation) or from 0 to 21 days (for CCNA1 gene associated methylation). DNA from cells that had been treated with and stored in methanol based buffers, either 100% methanol or 50% methanol, also showed highly reproducible values for methylation in the vimentin differentially methylated region, and these values were surprisingly even more stable across the 21 day time course than were values from cells stored frozen. In addition, DNA from cells that had been treated with and stored in methanol based buffers, either 100% methanol or 50% methanol, also showed highly reproducible values for methylation in the CCNA1 differentially methylated region, that across the 21 day time course were surprisingly highly similar to values obtained from cells that were cells stored frozen. DNA from cells that had been treated with and stored in DNA/RNA Shield™ also showed highly reproducible values for methylation in the Vimentin and CCNA1 differentially methylated region, that across the day 3 to day 21 time course were highly similar to values obtained from cells that were cells stored frozen. The Day 0 time point for cells treated with DNA/RNA Shield™ was derived from a separate cell preparation and so is not directly comparable to any of the other data points in the study.

In contrast to DNA from frozen cells and from cells treated with and stored in methanol based buffers, DNA from cells treated with either CytoLyt® or PreservCyt® showed a clear time dependent increase in measured DNA methylation values over the 21 day time course in both the Vimentin and the CCNA1 differentially methylated regions. This increase in apparent DNA methylation over time, of approximately 3-fold, was additionally accompanied by a time dependent increase in the variability of the DNA methylation values. The increase in the level of and variability of the DNA methylation value observed in cells treated with and stored in CytoLyt® at ambient temperatures could be prevented if cells were treated with and stored in CytoLyt® at 4 degrees Centigrade. No difference was seen in measured levels of DNA methylation of cells treated with and stored in CytoLyt® between the cells in which DNA was extracted using overnight versus prolonged digestion with Proteinase K.

Also, in contrast to findings in DNA from frozen cells and from cells treated with and stored in methanol based buffers, DNA methylation levels of cells treated with and stored in neutral buffered formalin showed great variation between replicate samples, and this lack of reproducibility was seen both in cells from which DNA was extracted using either overnight digestion or prolonged digestion with Proteinase K.

Thus treating and storing cells in methanol based buffers (100% methanol and 50% methanol) or with DNA/RNA Shield™, provided superiority of reproducible measurements of DNA methylation over time and enabled treatment and storage of cells at ambient temperature.

Example 2

In a separate study, cells from the unmethylated cell line were pelleted and different duplicate aliquots were processed by:
a) addition of 100% methanol at room temperature (denoted "100% MeOH"). A peroxide-free methanol solution was selected for use (Fisher, Cat #BP1105-4, with peroxide less than or equal to 0.001%);
b) addition of a 50% methanol 50% water mixture at room temperature (denoted "50% MeOH"). A peroxide-free methanol solution was selected for use (Fisher, Cat #BP1105-4, with peroxide less than or equal to 0.001%) as was an UltraPure DNase/RNase free distilled water (Invitrogen, Cat #10977-015);
c) addition at room temperature of a commercial cell sample preservative, CytoLyt®, that is composed of methanol, water, and salts of magnesium, sodium, potassium, acetate, and chloride (denoted "cytolyt");
d) addition of a commercial cell sample preservative CytoLyt® refrigerated to 4 degrees Centigrade (denoted "cytolyt 4deg")
e) flash freezing (denoted "frozen");
f) addition of neutral buffered formalin (denoted "NBF");
g) addition at room temperature of a commercial cell sample preservative, PreservCyt®, that is composed of methanol, water, EDTA disodium salt, and glacial acetic acid (denoted "preservecyt"); or h) addition at room temperature of DNA/RNA Shield™, a DNA/RNA stabilization solution produced commercially by Zymo Research (denoted "shield").

Figure 2A:
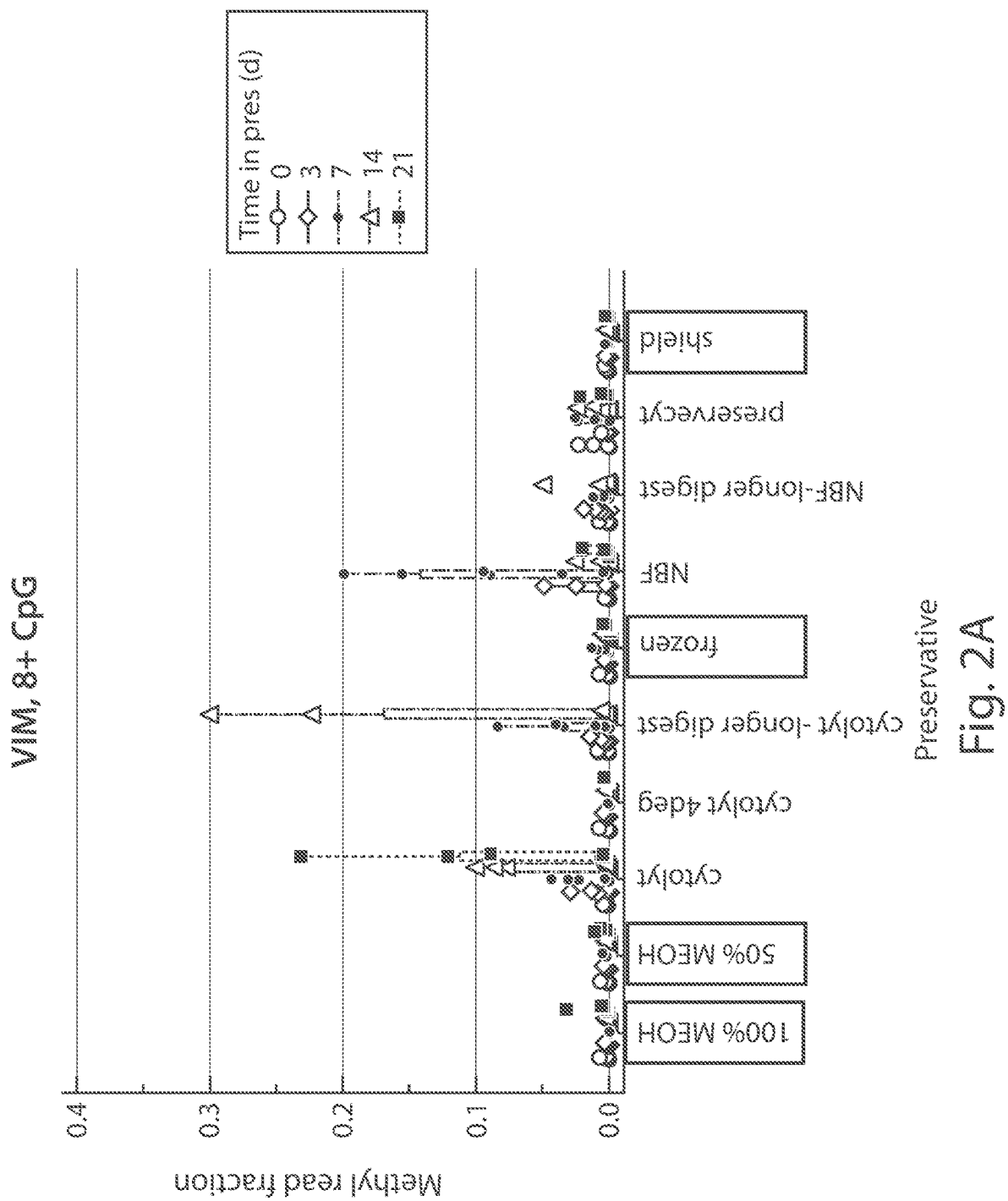

Prior to DNA extraction, cells were then maintained under the conditions a)-h) above for periods of time that included: 0 time, 3 days, 7 days, 14 days and 21 days (as indicated by symbols respectively denoted 0, 3, 7, 14, 21 in FIGS. 2A and 2B). Extracted DNA from the cell mixtures was then assayed for cytosine methylation within the vimentin differentially methylated region (VIM, as shown in FIG. 2A) and the CCNA1 differentially methylated region (CCNA1, as shown in FIG. 2B), as described above, with testing of 7 repeat aliquots from each bisulfite converted DNA. Additionally, duplicate experiments were also done with cells treated with room temperature CytoLyt® and with cells treated with neutral buffered formalin, in which the process of DNA extraction was prolonged by extended Proteinase K digestion for an additional 48 hours with fresh proteinase K added daily. These samples are respectively denoted as "cytolyt-longer digest" and "NBF-longer digest."

As shown on FIGS. 2A and 2B, cells treated with CytoLyt® at room temperature, and cells treated with neutral buffered formalin, all showed the time dependent development of a spurious signal for apparent DNA methylation within the Vimentin differentially methylated region. This same aberrant signal was detected in measured levels of DNA methylation of cells treated with and stored in CytoLyt® from which DNA was extracted after overnight digestion with Proteinase K or from which DNA was extracted after prolonged digestion with Proteinase K. In contrast, surprisingly no spurious methylation signal was detected in DNA from cells treated with and stored in a room temperature methanol based buffer (either 100% or 50% methanol) or in cells treated with and stored in DNA/RNA Shield™.

Example 3

In a further study, a set of master mixtures of cells from the fully methylated cell line and from the unmethylated cell line were prepared to have 0%, 0.25%, 0.5%, 1%, 2% and 4% representation of the methylated cells. The cell mixtures were pelleted and different duplicate aliquots were processed from each of the conditions below by:
 a) addition of 100% methanol at room temperature (denoted "100% MeOH"). A peroxide-free methanol solution was selected for use (Fisher, Cat #BP1105-4, with peroxide less than or equal to 0.001%);
 b) addition of a 50% methanol 50% water mixture at room temperature (denoted "50% MeOH"). A peroxide-free methanol solution was selected for use (Fisher, Cat #BP1105-4, with peroxide less than or equal to 0.001%) as was an UltraPure DNase/RNase free distilled water (Invitrogen, Cat #10977-015);
 c) addition at room temperature of a commercial cell sample preservative, CytoLyt®, that is composed of methanol, water, and salts of magnesium, sodium, potassium, acetate, and chloride (denoted "cytolyt");
 d) addition at room temperature of DNA/RNA Shield™, a DNA/RNA stabilization solution produced commercially by Zymo Research (denoted "shield"). pelleted and processed by:
 e) flash freezing (denoted "frozen");
 f) addition of neutral buffered formalin (denoted "NBF"); or
 g) addition at room temperature of a commercial cell sample preservative, PreservCyt®, that is composed of methanol, water, EDTA disodium salt, and glacial acetic acid (denoted "preservcyt").

A biological replicate of each of the mixtures was independently prepared, and the pelleted cells were processed by flash freezing (denoted "Frozen (Exp0)").

Figure 3A:
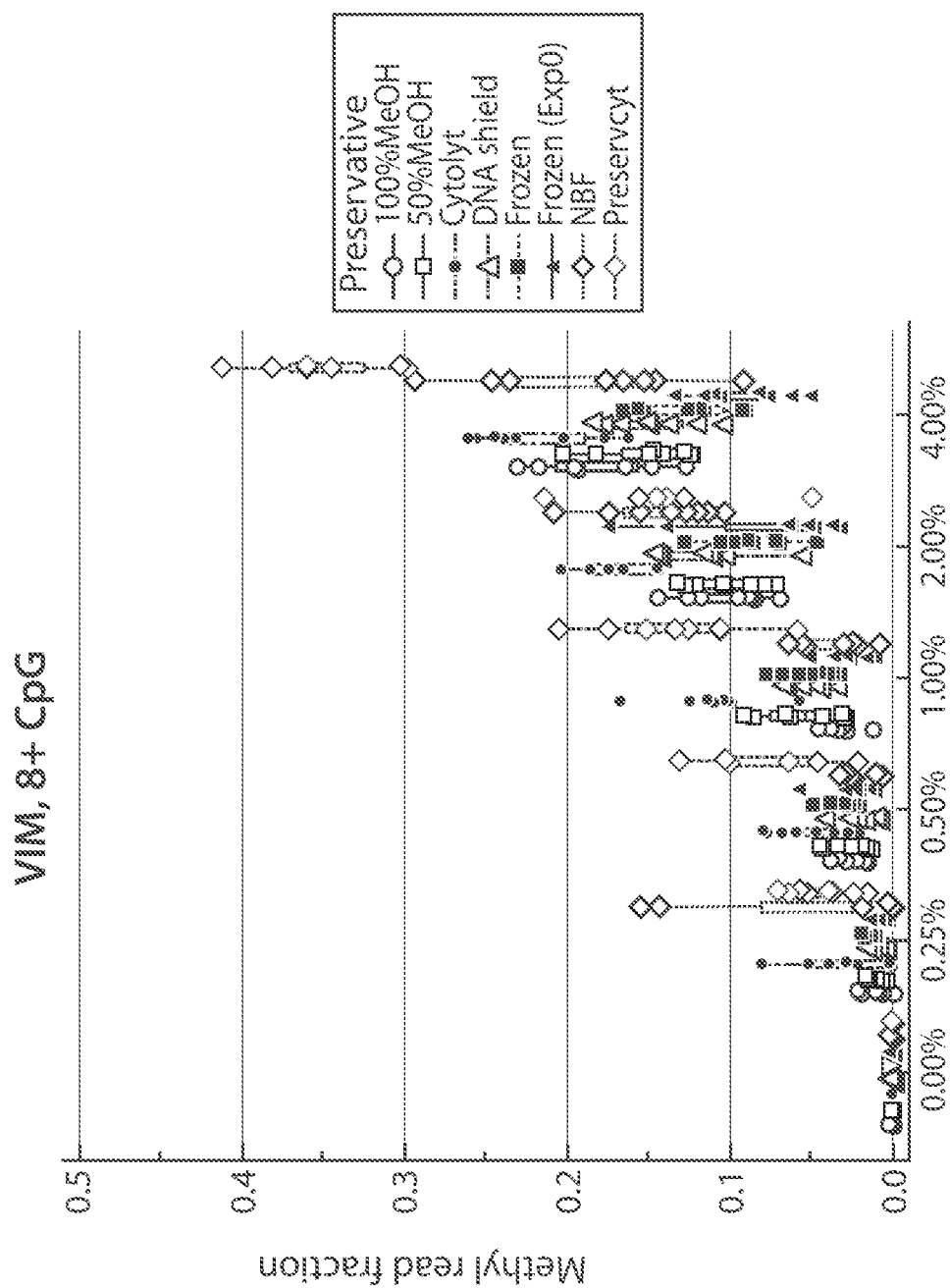
FIGS. 3A and 3B: Dose Response Curve of Liquid Medium Effect on Assay of DNA Methylation Assay. The preservative conditions are indicated on the x-axis, while the methyl read fraction is indicated on the y-axis. "VIM" corresponds to vimentin.
Figure 3B:
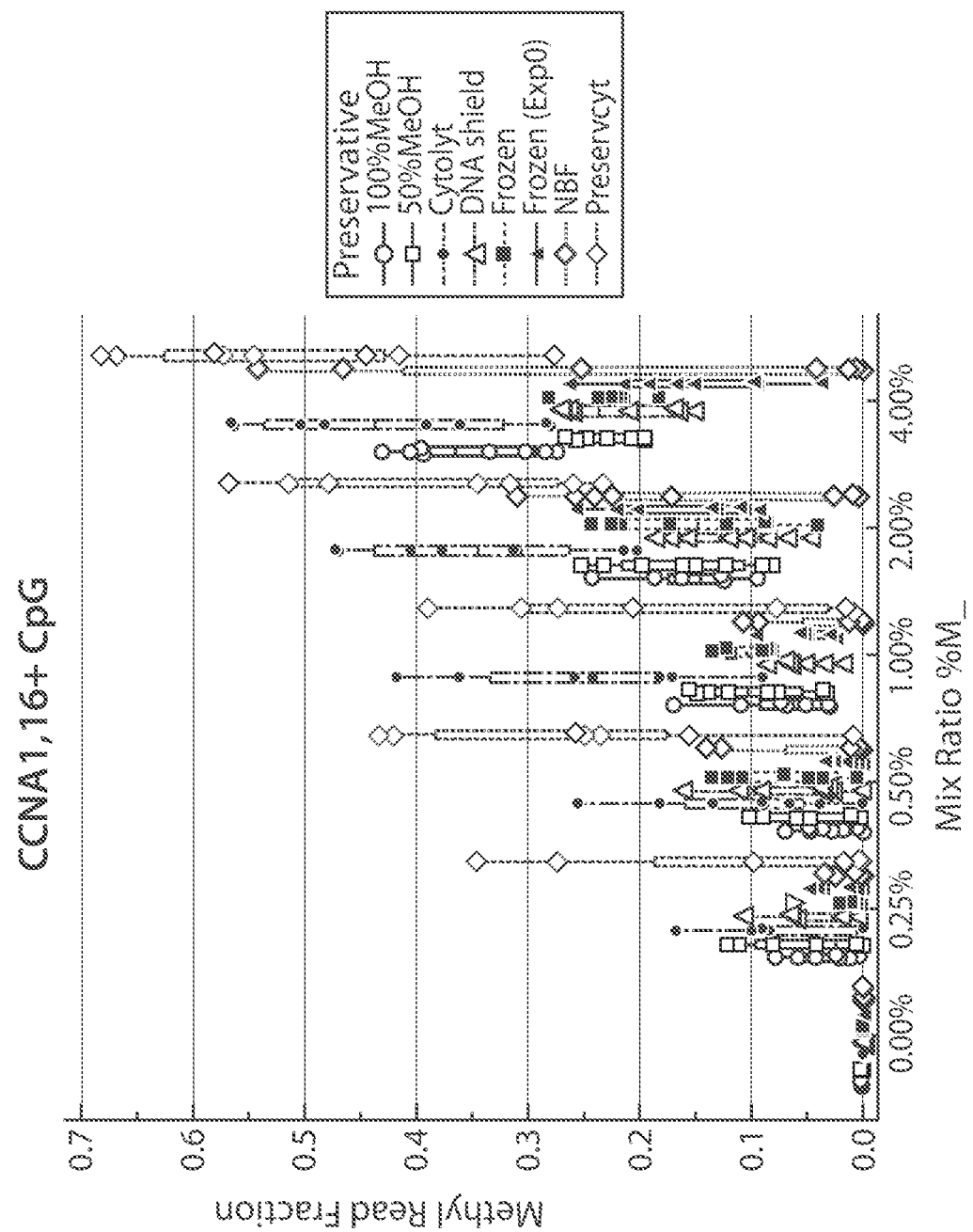

After 7 days of incubation under conditions a)-g) above, DNA was extracted from each of the cell mixtures and then, as shown in FIGS. 3A and 3B, assayed for cytosine methylation within the vimentin differentially methylated region (VIM, as shown in FIG. 3A) and the CCNA1 differentially methylated region (CCNA1, as shown in FIG. 3B), with testing of 8 repeat aliquots from each bisulfite converted DNA, as described above.

Cells that had been treated and stored in either CytoLyt®, PreservCyt®, or Neutral Buffered Formalin, showed the greatest deviation in methylation values compared to frozen cells and also showed the greatest variability in measurement of DNA methylation levels between sample replicates. Cells treated with and stored in methanol based buffers (either 100% or 50% methanol) or cells treated with and stored in DNA/RNA Shield™ showed the greatest reproducibility of measurements of DNA methylation levels and the greatest agreement with the measurements of DNA methylation in the frozen cells. The one outlier noted was the increased level of methylation observed in the CCNA1 differentially methylated region measured in a mixture containing 4% methylated cells that had been treated with and stored in 100% methanol. This behavior was not observed in the vimentin differentially methylated region or in any of the other mixtures containing between 0-2% methylated cells.

Example 4

In a further study, the preservation of DNA methylation marks were compared in cells incubated over a 21 day time course in different preservative buffers. Studies were performed using either a cell line (H1975) that was fully unmethylated at both the Vim and CCNA1 loci (0% methylation) or using the unmethylated cell line admixed with a second cell line (SKGT4) that was fully methylated at both the Vim and CCNA1 loci, with the methylated cell mixed at a contribution of 0.25%, 0.5% or 1.0%. Cell mixtures were incubated at room temperature in different buffers that included: a 50% methanol 50% water mixture, CytoLyt® (that is composed of methanol, water, and salts of magnesium, sodium, potassium, acetate, and chloride; denoted "cytolyt"), or DNA/RNA Shield™ (a DNA/RNA stabilization solution produced commercially by Zymo Research; denoted "shield"). For the 50% methanol 50% water mixture, a peroxide-free methanol solution was selected for use (Fisher, Cat #BP1105-4, with peroxide less than or equal to 0.001%) as was an UltraPure DNase/RNase free distilled water (Invitrogen, Cat #10977-015). Cells were incubated over a time course of 1 hour (designated day 0), 7 days, or 21 days. At the end of each incubation cells were pelleted and DNA was extracted. A comparator group of cells were pelleted directly out of cell culture media at 1 hour into the study, frozen at −80° C., and processed for DNA either immediately, or after 7 days at −80° C., or after 21 days at −80° C. . . . The level of DNA methylation at the Vimentin and CCNA1 loci were then assayed by bisulfite sequencing following the procedure as described in Moinova et al. Each condition was represented by duplicate cell samples, and each cell sample was tested in 4 replicate bisulfite sequencing assays. FIGS. 4A and 4B show the results for each condition within the vimentin differentially methylated region (VIM, as shown in FIG. 4A) and the CCNA1 differentially methylated region (CCNA1, as shown in FIG. 4B). On day 0 in all conditions, no Vim or CCNA1 methylation was detected in samples from the 0% methylated sample, and an increasing level of methylation was seen in going across samples that have 0.25%, 0.5%, and 1% admixture of methylated cells. In examining across the 21 day time course, samples incubated in CytoLyt® showed a clear time dependent increase in the levels of methylation at the Vimentin (Vim) and the CCNA1 loci, that increased from day 0 to day 7 to day 21 and that affects samples with 0.25%, 0.5%, or 1% admixture of the methylated cell line. This effect was highly reduced in samples incubated in the 50% methanol buffer. No increase in DNA methylation over time was observed in samples incubated in DNA/RNA Shield™ or in frozen samples maintained at −80° C. Increased methylation signal created by incubation in CytoLyt® was observed at 21 days even at the Vim locus in cells from the fully unmethylated cell line.

Example 5

In a further study, the preservation of DNA methylation marks was compared in cells incubated in buffers at a range of concentrations of methanol. The preservation of DNA methylation marks was also compared in cells incubated in different buffers across a range of different temperatures. Studies were performed using either a cell line that was fully unmethylated at both the Vim and CCNA1 loci (0% methylation) or using the unmethylated cell line admixed with a 1% contribution of a cell line that was fully methylated at both the Vim and CCNA1 loci (1%). Cells mixtures from the 0% and 1% sets were incubated in DNA/RNA Shield™ (a DNA/RNA stabilization solution produced commercially by Zymo Research; denoted "shield") or were incubated in buffer mixes of methanol plus water containing: 40% methanol, 50% methanol, or 60% methanol. A peroxide-free methanol solution was selected for use (Fisher, Cat #BP1105-4, with peroxide less than or equal to 0.001%) as was an UltraPure DNase/RNase free distilled water (Invitrogen, Cat #10977-015). Samples were incubated in each of the buffer mixes for 1 week across a range of temperatures including: −20° C., 4° C., room temperature, 37° C., and 50° C. Following the one week incubation at each of the above temperatures, all samples were further incubated for 2 weeks at room temperature. At the conclusion of the 21 day full incubation period cells were pelleted and DNA was extracted. A comparator group of samples (denoted day 0 samples) were incubated in each of the above buffers at room temperature for just 1 hour prior to DNA extraction. A further comparator group of samples (denoted frozen samples) were pelleted directly out of cell culture media at 1 hour into the study, frozen at −80° C., and processed for DNA after 21 days at −80° C. The level of DNA methylation at the Vimentin and CCNA1 loci were then assayed by bisulfite sequencing following the procedure as described in Moinova et al. Each condition was represented by duplicate cell samples (excepting 4 replicate samples for methanol buffers), and each cell sample was tested in 6 replicate bisulfite sequencing assays. FIGS. 5A and 5B show the results for the study in samples from day 0 across the different buffer compositions within the vimentin differentially methylated region (VIM, as shown in FIG. 5A) and the CCNA1 differentially methylated region (CCNA1, as shown in FIG. 5B). At day 0, after 1 hour of incubation, all buffer compositions, 40% methanol, 50% methanol, 60% methanol, DNA/RNA Shield™, showed essentially the same distributions of methylation values at the Vim and CCNA1 loci as did the frozen samples both for the unmethylated cell line sample, in which methylation values were all near baseline values, and in the mixture of 1% input methylated cells. FIGS. 6A and 6B show the results of the study for assay of methylation values within the vimentin differentially methylated region (VIM, as shown in FIG. 6A) and the CCNA1 differentially methylated region (CCNA1, as shown in FIG. 6B) in all day 21 samples in which a 1% admixture of methylated cells was present. Samples incubated in methanol plus water mixtures performed near identically across a range of methanol concentrations of 40%, 50%, and 60%. Furthermore, in all of the methanol plus water buffers, methylation values were stable across the full range of temperatures tested ranging from −20° C. to up to 50° C. Last, FIGS. 7A and 7B show the results of the study for assay of methylation values within the vimentin differentially methylated region (VIM, as shown in FIG. 7A) and the CCNA1 differentially methylated region (CCNA1, as shown in FIG. 7B) in all day 21 samples composed of only unmethylated cells. In general, methylation was low to absent in these samples.

We claim:

1. A method of preserving methylation patterns of a methylated DNA sequence in human esophageal cells, comprising:

treating the human esophageal cells with an aqueous storage solution at room temperature;

storing the human esophageal cells in the aqueous storage solution for at least 24 hours, and extracting DNA from the human esophageal cells after the storing of the human esophageal cells in the aqueous storage solution, wherein the aqueous storage solution comprises from 40% to less than 100% methanol, and wherein the methanol is peroxide free or at a level less than or equal to 0.001%, wherein the aqueous storage solution is free of metal ions, wherein the DNA from the human esophageal cells comprises a methylated DNA sequence, wherein the methylated DNA sequence comprises methylation patterns, and wherein at least 60% of the methylation patterns present in the methylated DNA sequence in the human esophageal cells prior to the storing in the aqueous storage solution are preserved when stored for at least 24 hours in the aqueous storage solution.

2. The method of claim 1, comprising storing the human esophageal cells in the aqueous storage solution for at least two weeks, wherein the methylation patterns of the DNA of the human esophageal cells are preserved by at least 60% in comparison to the methylation patterns of the DNA from the human esophageal cells prior to storage in the aqueous storage solution.

3. The method of claim 1, comprising storing the human esophageal cells in the aqueous storage solution for at least 24 hours at room temperature, at 4° C. or at temperatures ranging between −30° C. to 50° C., wherein the methylation patterns of the DNA of the human esophageal cells in the aqueous storage solution are preserved by at least 65% in comparison to the methylation patterns in the human esophageal cells prior to storage in the aqueous storage solution.

4. The method of claim 1, wherein the aqueous storage solution consists essentially of an admixture of from 40% methanol to less than 100% methanol and water.

5. The method of claim 1, comprising storing the human esophageal cells in the aqueous storage solution at room temperature for at least 24 hours to 2 years or at 4° C. for at least 24 hours to 2 years, wherein the methylation patterns of the DNA of the human esophageal cells in the aqueous storage solution are preserved by at least 60% in comparison to the methylation patterns of the DNA from the human esophageal cells prior to storage in the aqueous storage solution.

6. The method of claim 1, comprising storing the human esophageal cells in the aqueous storage solution at temperatures ranging between −30° C. to 50° C. for from at least 24 hours to 2 years, wherein the methylation patterns of the DNA of the human esophageal cells in the aqueous storage solution are preserved by at least 60% in comparison to the methylation patterns of the DNA from the human esophageal cells prior to storage in the aqueous storage solution.

7. A method of preserving methylation patterns of a methylated DNA sequence, comprising:
treating human esophageal cells with an aqueous storage solution at room temperature;
storing the human esophageal cells in the aqueous storage solution for at least 24 hours at ambient temperature, and
extracting DNA from the human esophageal cells after the storing of the human esophageal cells in the aqueous storage solution,
wherein the aqueous storage solution comprises from 40% to less than 100% methanol,
wherein the aqueous storage solution is free of metal ions,
wherein the DNA from the human esophageal cells comprises a methylated DNA sequence,
wherein the methylated DNA sequence comprises methylation patterns, and
wherein at least 60% of the methylation patterns present in the methylated DNA sequence in the human esophageal cells prior to the storing in the aqueous storage solution are preserved when stored for at least 24 hours in the aqueous storage solution at ambient temperature ranging between −30° C. to 50° C.

* * * * *

SEQUENCE LISTING

```
<160> NUMBER OF SEQ ID NOS: 45

<210> SEQ ID NO 1
<211> LENGTH: 345
<212> TYPE: DNA
<213> ORGANISM: Homo sapiens

<400> SEQUENCE: 1
tctgagggat tccttactct ttcctcttcc cgctcctttg cccgcgggtc tccccgcctg      60
accgcagccc cgaggccgcc gcgcacctcc tcccacgccc ctttggcgtg gtgccaccgg     120
acccctctgg ttcagtccca ggcggacccc cccctcaccg cgcgacecccg ccttttcag     180 caccccaggg tgagcccagc tcagactatc atccggaaag ccccaaaag tcccagccca     240 gcgctgaagt aacgggacca tgcccagtcc cacgcccgg agcaggaagg ctcgaggcgc     300
ccccacccca cccgcccacc ctccccgctt ctcgctaggt cccga                   345
```

-continued

```
<210> SEQ ID NO 2
<211> LENGTH: 370
<212> TYPE: DNA
<213> ORGANISM: Homo sapiens

<400> SEQUENCE: 2
ccctcgttcg cctcttctcc gggagccagt ccgcgccacc gccgccgccc aggccatcgc      60
caccctccgc agccatgtcc accaggtccg tgtcctcgtc ctcctaccgc aggatgttcg     120
gcggcccggg caccgcgagc cggccgagct ccagccggag ctacgtgact acgtccaccc     180
gcacctacag cctgggcagc gcgctgcgcc ccagcaccag ccgcagcctc tacgcctcgt     240
ccccgggcgg cgtgtatgcc acgcgctcct ctgccgtgcg cctgcggagc agcgtgcccg     300
gggtgcggct cctgcaggac tcggtggact ctcgctggc cgacgccatc aacaccgagt     360
tcaagaacac                                                           370

<210> SEQ ID NO 3
<211> LENGTH: 432
<212> TYPE: DNA
<213> ORGANISM: Unknown
<220> FEATURE:
<223> OTHER INFORMATION: Description of Unknown:
      Exemplary Vimentin Nucleotide Sequence

<400> SEQUENCE: 3
gcttcctgga gcagcagaat aagatcctgc tggccgagct cgagcagctc aagggccaag      60
gcaagtcgcg cctaggggac ctctacgagg aggagatgcg ggagctgcgc cggcaggtgg     120
accagctaac caacgacaaa gcccgcgtcg aggtggagcg cgacaacctg gccgaggaca     180
tcatgcgcct ccgggagaag taaggctgcg cccatgcaag tagctgggcc tcgggagggg     240
gctggaggga gaggggaacg ccccccccggc ccccgcgaga gctgccacgc ccttggggat     300
gtggccgggg ggaggcctgc cagggagaca gcggagagcg gggctgtggc tgtggtggcg     360
cagccccgcc cagaacccag accttgcagt tcgcatttcc cctctgtcc ccacacattg     420 cccaaggacg ct                                                        432

<210> SEQ ID NO 4
<211> LENGTH: 509
<212> TYPE: DNA
<213> ORGANISM: Homo sapiens

<400> SEQUENCE: 4
tctgagggat tccttactct ttcctcttcc cgctcctttg cccgcgggtc tccccgcctg      60
accgcagccc cgaggccgcc gcgcacctcc tcccacgccc ctttggcgtg gtgccaccgg     120 accccctctgg ttcagtccca ggcggacccc cccctcaccg cgcgacccg ccttttcag     180 caccccaggg tgagcccagc tcagactatc atccggaaag cccccaaaag tcccagccca     240
gcgctgaagt aacgggacca tgcccagtcc cacgccccgg agcaggaagg ctcgaggcgc     300
ccccacccca cccgcccacc ctccccgctt ctcgctaggt cccgattggc tggggcgctc     360
cgcggctggg atggcagtgg gaggggaccc tctttcctaa cggggttata aaacagcgc     420 cctcggcggt gtccagtcct ctgccactct cgctccgagg tccccgcgcc agagacgcag     480
ccgcgctccc accacccaca cccaccgcg                                     509

<210> SEQ ID NO 5
<211> LENGTH: 106
<212> TYPE: DNA
<213> ORGANISM: Homo sapiens
```

<400> SEQUENCE: 5

| ctcgtcctcc taccgcagga tgttcggcgg cccgggcacc gcgagccggc cgagctccag | 60 |
| ccggagctac gtgactacgt ccacccgcac ctacagcctg ggcagc | 106 |

<210> SEQ ID NO 6
<211> LENGTH: 176
<212> TYPE: DNA
<213> ORGANISM: Homo sapiens

<400> SEQUENCE: 6

| gcgactgcac ttggggcagc cccgccgcgt cccagccgcc tcccggcagg aagcgtaggt | 60 |
| gtgtgagccg acccggagcg agccgcgccc tcgggccagc gtgggcaggg cgccgcagcc | 120 |
| tgcgcagccc cgaggacccc gcgtcgctct cccgagccag ggttctcagg agcggg | 176 |

<210> SEQ ID NO 7
<211> LENGTH: 390
<212> TYPE: DNA
<213> ORGANISM: Homo sapiens

<400> SEQUENCE: 7

| cggggcaggc gcggcccgca aggaccccg cgatggagac gcaacactgc cgcgactgca | 60 |
| cttggggcag cccgccgcg tcccagccgc ctcccggcag gaagcgtagg tgtgtgagcc | 120 |
| gacccggagc gagccgcgcc ctcgggccag cgtgggcagg gcgccgcagc ctgcgcagcc | 180 |
| ccgaggaccc cgcgtcgctc tcccgagcca gggttctcag gagcgggccg cgcaggagac | 240 |
| gttagagggg gttgttagcg gctgttggga gaacgggtca cggaaacagt cccttccaaa | 300 |
| gccggggcca tcgtggggtg ggcgagtccg ccctcccagg ccgggggcgc ggaccagagg | 360 |
| ggacgtgtgc agacggccgc ggtcagcccc | 390 |

<210> SEQ ID NO 8
<211> LENGTH: 615
<212> TYPE: DNA
<213> ORGANISM: Unknown
<220> FEATURE:
<223> OTHER INFORMATION: Description of Unknown:
      Exemplary Up10 nucleotide sequence

<400> SEQUENCE: 8

| ccgtgactct ccctacctcc ccgactcccc aggcttctta cagtgacctc ttaccgtgcc | 60 |
| ccactccatg aatcgccaga gctattcgtc cctaaatttc aaaccttgcg caatgtccct | 120 |
| tcacagaccc ctccaggtat cacgcagccc cgagccccga gccccgcccc ggggcctca | 180 |
| tcccgcccct tcgcgtccgc ggctcgtttt ccccactga gcgcccagct cccgcagttt | 240 |
| ccccggccgt cgagcgccgt gggcggggct ccagggcggc ggcgcctcgc ggggagggtc | 300 |
| ctccgtgctg ggggcgaggc caccgaggc agctcccgc ccgcccccaa ccccgccccg | 360 |
| ctctcggagc ctataaaggg aggcgacccg cggcccgccc ggctggcatc cccagccgc | 420 |
| cgccagcccc gccgagggga gccagcgccg tctctgaggg gcgtccggcg ccggagccat | 480 |
| gaccctccgc cgactcagga agctgcagca gaaggaggag gcggcggcca ccccggaccc | 540 |
| cgccgcccgg actcccgact cggaagtcgc gcccgccgct ccggtcccga cccgggacc | 600 |
| ccctgccgca gccgc | 615 |

<210> SEQ ID NO 9
<211> LENGTH: 615

<210> SEQ ID NO 9
<211> LENGTH: 615
<212> TYPE: DNA
<213> ORGANISM: Unknown
<220> FEATURE:
<223> OTHER INFORMATION: Description of Unknown:
      Exemplary Up10 nucleotide sequence

<400> SEQUENCE: 9

```
gcggctgcgg caggggtcc  cggggtcggg accggagcgg cgggcgcgac ttccgagtcg    60
ggagtccggg cggcgggtc  cggggtggcc gccgcctcct ccttctgctg cagcttcctg   120
agtcggcgga gggtcatggc tccggcgccg gacgcccctc agagacggcg ctggctcccc   180
tcggcgggc  tggcggcggc tggggatgc  cagccgggcg gccgcgggt  cgcctccctt   240
tataggctcc gagagcgggg cggggttggg ggcgggcggg gagctgcctc gggtggcctc   300
gcccccagca cggaggaccc tccccgcgag gcgccgccgc cctggagccc cgcccacggc   360
gctcgacggc cggggaaact gcgggagctg ggcgctcagt gggggaaaac gagccgcgga   420
cgcgaagggg cgggatgagg cccccgggc  ggggctcggg gctcggggct gcgtgatacc   480
tggagggtc  tgtgaaggga cattgcgcaa ggtttgaaat ttaggacga  atagctctgg   540
cgattcatgg agtggggcac ggtaagaggt cactgtaaga agcctgggga gtcggggagg   600
tagggagagt cacgg                                                    615
```

<210> SEQ ID NO 10
<211> LENGTH: 288
<212> TYPE: DNA
<213> ORGANISM: Unknown
<220> FEATURE:
<223> OTHER INFORMATION: Description of Unknown:
      Exemplary Up10 nucleotide sequence

<400> SEQUENCE: 10

```
aaaccttgcg caatgtccct tcacagaccc ctccaggtat cacgcagccc cgagccccga    60
gccccgcccc gggggcctca tcccgcccct tcgcgtccgc ggctcgtttt ccccactga   120
gcgcccagct cccgcagttt ccccggccgt cgagcgccgt gggcggggct ccagggcggc   180
ggcgcctcgc gggagggtc  ctccgtgctg ggggcgaggc cacccgaggc agctccccgc   240
ccgcccccaa ccccgcccg  ctctcggagc ctataaaggg aggcgacc               288
```

<210> SEQ ID NO 11
<211> LENGTH: 287
<212> TYPE: DNA
<213> ORGANISM: Unknown
<220> FEATURE:
<223> OTHER INFORMATION: Description of Unknown:
      Exemplary Up10 nucleotide sequence

<400> SEQUENCE: 11

```
ggtcgcctcc ctttataggc tccgagagcg gggcggggtt ggggcgggc  ggggagctgc    60
ctcgggtggc ctcgccccca gcacggagga ccctccccgc gaggcgccgc cgccctggag   120
ccccgcccac ggcgctcgac ggccggggaa actgcgggag ctgggcgctc agtgggggaa   180
aacgagccgc ggacgcgaag gggcgggatg aggcccccgg ggcggggctc ggggctcggg   240
gctgcgtgat acctggaggg gtctgtgaag ggacattgcg caaggtt               287
```

<210> SEQ ID NO 12
<211> LENGTH: 1539
<212> TYPE: DNA
<213> ORGANISM: Unknown
<220> FEATURE:
<223> OTHER INFORMATION: Description of Unknown:

Exemplary Up35-1/Up35-2 nucleotide sequence

<400> SEQUENCE: 12

| | | | | | |
|---|---|---|---|---|---|
| tctggcccca | tgctcagctc | cgcggccatc | gctgaagcga | ggcgcagccg | ccgctgccgc | 60 |
| ccgggaaact | ttgcggccgg | ccggagcgcg | ccgagccaag | cgcggggggg | aagagcggag | 120 |
| aagagctggg | gaggcgggga | gcgagggcgc | agcgggccgg | ggccgccggc | caagcctttg | 180 |
| tctggggacg | cggcggcgcg | ccggagagtc | ccgaggctgc | ctgcaccgcc | ccagagctct | 240 |
| gggctgtgcc | cgcgcaggga | ccgggccggg | tagagtcggc | cggggtggag | aggcaagcgg | 300 |
| agcgcgcggt | ggggctgagg | ggaggcgtgg | ggcgagtgcc | cgttgctcgc | tctctagctc | 360 |
| tcttgctctt | acgctctctc | gctcgcagcc | gctcgcagct | cggcggtgca | gctgtgctgg | 420 |
| atccggcggc | gccgcagcct | tttatcgcct | cctgatgtca | ctggggtgcg | ggggcccggg | 480 |
| cggcccggtg | cgcgggccaa | tagctgcacg | gcctccgcgg | cccagcggcg | cagggcgggg | 540 |
| cgcgcctgac | agctcccccg | cccccgcgt | cagctgactg | gcggcccgag | cggcccggga | 600 |
| gcggcggagg | cctggcggag | cgctggagcg | gagtgggacg | gccagcctgg | gcccaccccc | 660 |
| gtaccctgca | ggtcccggcc | cacgcacgct | cgcctggagt | gcgcgcccca | cctctaggcc | 720 |
| aaatcaccgc | tttcccctcc | tcgcgcactc | tcctccctca | gttccctttg | caccccaccc | 780 |
| ccatcccgtg | tcaccccccaa | ggaggctcag | aatgagcgcc | gggacaacgc | ctcctgggcc | 840 |
| ctttgttccc | aagcggcccc | cgcccagtgg | gcgacgctct | gtgtgtcctc | gcggcttctg | 900 |
| gccgtgtgtg | tcgtgcgttc | ctgtttctgg | agatctgcgc | gtatttgtat | gttggggagg | 960 |
| gcgggctcga | ggctccgaga | gttgtgttca | gacccaactc | ttaacctcag | gggacctttc | 1020 |
| tcaggccaag | cgagggcccc | tcctggcggg | tgcagtcgca | gagccctgag | gttcgactcc | 1080 |
| actgccccg | ccgctccccg | cgttcacccc | accgcacaat | gttcacagtg | aaggcgacgg | 1140 |
| gaaaagcagc | agcccaaagg | ctctgaattc | ctcttccccg | ccacacgcac | ggaatcctga | 1200 |
| gccccccggag | cctcggggcc | gaggccggcc | cgggacggtg | ctccgagtag | ctctccactg | 1260 |
| ctggggagcc | ggccctgttt | ttgtttgaac | gttttgtaac | gattaagcag | atcccggcgt | 1320 |
| cagcccgccg | cggagaggct | caaacaggca | taaagtgcga | ccccaagtgg | ccactgtgcg | 1380 |
| caaaggcgcc | gcgaccgccc | ggcccacggc | cggaaggctt | ggacggcgcc | tcgtacccag | 1440 |
| ccaggtctcc | cctacctggc | caacccaag | ccagcccaga | acgcatacta | tgtgtgcacc | 1500 |
| agagcccagg | acaggttccc | ctcgagcgat | gtacaggtc | | | 1539 |

<210> SEQ ID NO 13
<211> LENGTH: 1539
<212> TYPE: DNA
<213> ORGANISM: Unknown
<220> FEATURE:
<223> OTHER INFORMATION: Description of Unknown:
Exemplary Up35-1/Up35-2 nucleotide sequence

<400> SEQUENCE: 13

| | | | | | |
|---|---|---|---|---|---|
| gacctgtaca | tcgctcgagg | ggaacctgtc | ctgggctctg | gtgcacacat | agtatgcgtt | 60 |
| ctgggctggc | ttgggttggg | ccaggtaggg | gagacctggc | tgggtacgag | gcgccgtcca | 120 |
| agccttccgg | ccgtgggccg | gcggtcgcg | gcgcctttgc | gcacagtggc | cacttggggt | 180 |
| cgcactttat | gcctgtttga | gcctctccgc | ggcgggctga | cgccgggatc | tgcttaatcg | 240 |
| ttacaaaacg | ttcaaacaaa | acagggccg | gctccccagc | agtggagagc | tactcggagc | 300 |
| accgtcccgg | gccggcctcg | gccccgaggc | tccgggggct | caggattccg | tgcgtgtggc | 360 |

```
ggggaagagg aattcagagc ctttgggctg ctgcttttcc cgtcgccttc actgtgaaca    420
ttgtgcggtg gggtgaacgc ggggagcggc ggggccagtg gagtcgaacc tcagggctct    480
gcgactgcac ccgccaggag gggccctcgc ttggcctgag aaaggtcccc tgaggttaag    540
agttgggtct gaacacaact ctcggagcct cgagcccgcc ctccccaaca tacaaatacg    600
cgcagatctc cagaaacagg aacgcacgac acacacggcc agaagccgcg aggacacaca    660
gagcgtcgcc cactgggcgg gggccgcttg ggaacaaagg gcccaggagg cgttgtcccg    720
gcgctcattc tgagcctcct tgggggtgac acgggatggg ggtgggtgc aaagggaact     780 gagggaggag agtgcgcgag gaggggaaag cggtgatttg gcctagaggt ggggcgcgca    840
ctccaggcga gcgtgcgtgg gccgggacct gcagggtacg ggggtgggcc caggctggcc    900
gtcccactcc gctccagcgc tccgccagge ctccgccgct ccggggccgc tcggccgcc     960 agtcagctga cgcggggggc gggggagctg tcaggcgcgc cccgccctgc gccgctgggc   1020
cgcggaggcc gtgcagctat tggcccgcgc accgggccgc ccgggccccc gcaccccagt   1080
gacatcagga ggcgataaaa ggctgcgcg ccgccggatc cagcacagct gcaccgccga    1140
gctgcgagcg gctgcgagcg agagagcgta agagcaagag agctagagag cgagcaacgg   1200
gcactcgccc cacgcctccc ctcagcccca ccgcgcgctc cgcttgcctc tccaccccgc   1260
ccgactctac ccggcccggt ccctgcgcgg gcacagccca gagctctggg gcggtgcagg   1320
cagcctcggg actctccggc gcgccgccgc gtccccagac aaaggcttgg ccggcggccc   1380
cggcccgctg cgccctcgct ccccgcctcc ccagctcttc tccgctcttc ccccccgcgc   1440
ttggctcggc gcgctccggc cggccgcaaa gtttcccggg cggcagcggc ggctgcgcct   1500
cgcttcagcg atggccgcgg agctgagcat ggggccaga                          1539

<210> SEQ ID NO 14
<211> LENGTH: 254
<212> TYPE: DNA
<213> ORGANISM: Unknown
<220> FEATURE:
<223> OTHER INFORMATION: Description of Unknown:
      Exemplary Up35-1 nucleotide sequence

<400> SEQUENCE: 14
cctgcaccgc cccagagctc tgggctgtgc ccgcgcaggg accgggccgg gtagagtcgg     60
gcggggtgga gaggcaagcg gagcgcgcgg tggggctgag gggaggcgtg gggcgagtgc    120
ccgttgctcg ctctctagct ctcttgctct tacgctctct cgctcgcagc cgctcgcagc    180
tcggcggtgc agctgtgctg gatccggcgg cgccgcagcc ttttatcgcc tcctgatgtc    240
actggggtgc gggg                                                      254

<210> SEQ ID NO 15
<211> LENGTH: 254
<212> TYPE: DNA
<213> ORGANISM: Unknown
<220> FEATURE:
<223> OTHER INFORMATION: Description of Unknown:
      Exemplary Up35-1 nucleotide sequence

<400> SEQUENCE: 15
ccccgcaccc cagtgacatc aggaggcgat aaaaggctgc ggcgccgccg gatccagcac     60
agctgcaccg ccgagctgcg agcggctgcg agcgagagag cgtaagagca agagagctag    120
agagcgagca acgggcactc gccccacgcc tcccctcagc ccaccgcgc gctccgcttg     180 cctctccacc ccgcccgact ctacccggcc cggtccctgc gcgggcacag cccagagctc    240
```
tggggcggtg cagg                                                           254

<210> SEQ ID NO 16
<211> LENGTH: 220
<212> TYPE: DNA
<213> ORGANISM: Unknown
<220> FEATURE:
<223> OTHER INFORMATION: Description of Unknown:
      Exemplary Up35-2 nucleotide sequence

<400> SEQUENCE: 16
gggaaaagca gcagcccaaa ggctctgaat tcctcttccc cgccacacgc acggaatcct      60
gagcccccgg agcctcgggg ccgaggccgg cccgggacgg tgctccgagt agctctccac     120
tgctggggag ccggccctgt ttttgtttga acgttttgta acgattaagc agatcccggc     180
gtcagcccgc cgcggagagg ctcaaacagg cataaagtgc                           220

<210> SEQ ID NO 17
<211> LENGTH: 220
<212> TYPE: DNA
<213> ORGANISM: Unknown
<220> FEATURE:
<223> OTHER INFORMATION: Description of Unknown:
      Exemplary Up35-2 nucleotide sequence

<400> SEQUENCE: 17
gcactttatg cctgtttgag cctctccgcg gcgggctgac gccgggatct gcttaatcgt      60
tacaaaacgt tcaaacaaaa acagggccgg ctccccagca gtggagagct actcggagca     120
ccgtcccggg ccggcctcgg ccccgaggct ccggggggctc aggattccgt gcgtgtggcg   180
gggaagagga attcagagcc tttgggctgc tgcttttccc                           220

<210> SEQ ID NO 18
<211> LENGTH: 880
<212> TYPE: DNA
<213> ORGANISM: Homo sapiens

<400> SEQUENCE: 18
tctgagggat tccttactct ttcctcttcc cgctcctttg cccgcgggtc tccccgcctg      60
accgcagccc cgagaccgcc gcgcacctcc tcccacgccc ctttggcgtg gtgccaccgg     120
acccctctgg ttcagtccca ggcggacccc ccctcaccg cgcgacccg ccttttttcag     180
cacccccaggg tgagcccagc tcagactatc atccggaaag ccccaaaag tcccagccca    240
gcgctgaagt aacgggacca tgcccagtcc caggccccgg agcaggaagg ctcgagggcg    300
ccccccacccc acccgcccac cctccccgct tctcgctagg tccctattgg ctggcgcgct   360
ccgcggctgg gatggcagtg ggagggggacc ctctttccta acggggttat aaaaacagcg   420
ccctcggcgg ggtccagtcc tctgccactc tcgctccgag gtccccgcgc cagagacgca    480
gccgcgctcc caccacccac acccaccgcg ccctcgttcg cctcttctcc gggagccagt    540
ccgcgccacc gccgccgccc aggccatcgc caccctccgc agccatgtcc accaggtccg    600
tgtcctcgtc ctcctaccgc aggatgttcg gcggcccggg caccgcgagc cggccgagct    660
ccagccggag ctacgtgact acgtccaccc gcacctacag cctgggcagc gcgctgcgcc    720
ccagcaccag ccgcagcctc tacgcctcgt ccccggggcgg cgtgtatgcc acgcgctcct   780
ctgccgtgcg cctgcggagc agcgtgcccg gggtgcggct cctgcaggac tcggtggact   840
tctcgctggc cgacgccatc aacaccgagt tcaagaacac                          880

<210> SEQ ID NO 19
<211> LENGTH: 696
<212> TYPE: DNA
<213> ORGANISM: Homo sapiens

<400> SEQUENCE: 19

```
cggggctcgg ctgtcgcagc gcggtcgccg ccgaggacca cggtcggggc gcgggcgggc      60
tccagtgcgc aggcgcggcg ggcgggaggg gacgcgctcc gggcgcgcgc gcggggcagc     120
cggcgcccca actccgcccg ccccgcgccc cgcgccccgg cgcctcgccg cccgccgccc     180
gcccgccccg gcgccgccgc ccgcgccccg gcgccccggg ccggcgaggg gcgcgccccgc    240
ggccgcggcc gctgcatggc gctgagatgg cggggggcgcc gcgcggcgga ggcggcggcg     300
gaggcggcgc gggcgagccc gggggcgccg agcgggcggc cggacaagc cgccggcgcg      360
ggctccgggc gtgcgacgag gagttcgctt gcccagagct ggaggcgctg ttccgcggct     420
acacgctgcg gctggagcag gcggccacgc tgaaggcgct ggccgttctc agcctgctgg     480
cgggcgcgct ggcgctggcc gagctgctgg gcgcgccggg gcccgcgccc ggcctggcca     540
agggctcaca cccggtgcac tgcgtcctct tcctggcgct gctcgtggta accaacgtcc     600
ggtccctgca ggtgccccag ctgcagcagg tcggccagct ggcgctgctc ttcagcctca     660
ccttcgcgct gctctgctgt cctttcgcgc tgggcg                              696
```

<210> SEQ ID NO 20
<211> LENGTH: 55
<212> TYPE: DNA
<213> ORGANISM: Homo sapiens

<400> SEQUENCE: 20

```
gttcaaccct cggctccgcc gccggctcct tgcgccttcg gagtgtcccg cagcg          55
```

<210> SEQ ID NO 21
<211> LENGTH: 90
<212> TYPE: DNA
<213> ORGANISM: Homo sapiens

<400> SEQUENCE: 21

```
ctaaataaat acactttcct ttgtgttccc atatactcct tgttcccatg tcaactataa     60
cacatacgct accatttat aattacttaa                                       90
```

<210> SEQ ID NO 22
<211> LENGTH: 409
<212> TYPE: DNA
<213> ORGANISM: Homo sapiens

<400> SEQUENCE: 22

```
cggaaaggga cgtgagctga gcggcggggg agaagagtgc gcaggtcaga gggcggcgcg      60
cagcggcgct ccgcgaggtc cccacgccgg gcgatatggg gtgcctgctg tttctgctgc     120
tctgggcgct cctccaggct tggggaagcg ctgaaggtgg gtggaacgag ggcgcttgag     180
tgcactcgcg ggagggcgga gagggagc tgggtaggga cggggagggc aacgcctgat      240
ggggactggt gagacccggg acgcactggc gcgatctagg tagaaaactc gctgctccct    300
ggctccgggg agaggcagcg cggcacagag ttcgctggca tcagccgcct cctgaagctc    360
atctcctctt gtttctttct tccttctctt tatgctggct gctctcccg                409
```

<210> SEQ ID NO 23
<211> LENGTH: 54

```
<212> TYPE: DNA
<213> ORGANISM: Homo sapiens

<400> SEQUENCE: 23
gttgggcagc gccccgcct ccagcagcgc ccgcacctcc tctacccgac ccg         54

<210> SEQ ID NO 24
<211> LENGTH: 147
<212> TYPE: DNA
<213> ORGANISM: Homo sapiens

<400> SEQUENCE: 24
gagcacttag cgaatgtggc acccctgaag tcgccccagg ttgggtctcc ccgggggca   60 ccagccggaa gcagccctcg ccagagccag cgttggcaag gaaggaggac tgggctcctc  120
cccacctgcc ccccacaccg ccctccg                                     147

<210> SEQ ID NO 25
<211> LENGTH: 42
<212> TYPE: DNA
<213> ORGANISM: Homo sapiens

<400> SEQUENCE: 25
gcccgcgctc taccgagccc agccagctcc tacctcggcc cg                    42

<210> SEQ ID NO 26
<211> LENGTH: 97
<212> TYPE: DNA
<213> ORGANISM: Homo sapiens

<400> SEQUENCE: 26
gcaagaggcg ggttttctc tcttgcaccc ccactcttcc caccccttc cctcctctga    60 agcttctcga agactttcca aactctgcgc tccccg                           97

<210> SEQ ID NO 27
<211> LENGTH: 723
<212> TYPE: DNA
<213> ORGANISM: Homo sapiens

<400> SEQUENCE: 27
cgggggattc cctcccatcc ccgagtgcag gagaagacgc cgagtctgag ccgcagccgc   60
ttctctagct ctataggaat cttgactcca agatcccagc cccacatccc ccgtcccag   120 taaccccgcg ccagcgtcgc aaccctcccg cgcccccct cccgcagacc ctggtcgaaa   180
tgtctcggcg ggctcccggg ccccgggccc tgcgcttcat ccgcgggcgc cgcacctcca   240 gcgcccctc cctccgctcc cactcccact cccgccatcc ccggagctca gacttcccca   300
actgcagagc gccccgacgc gccgcagcc ctcaccctgc cgagcgcggc ggccacccc    360 gcccgagccg cggcgcccc agggaggaaa caaaagtgtc tccgcggcgc ccggagtccc   420
ccggagcagg acgcctcctc ccggcccag tccggcccc ctcccctgcc gcgccgaggt    480
cagcgagtcg gggcgcggcg ccagcccagg aaactttacg aacctgcttg gggtcgcagg   540
acagcagcgg caagggttcc cggcgatcag agctccggcg acccgccacc attgaagggg   600
aactggaggc tctgtcgccc agcgtggggc gcggcggcg tgggtggctc tgcctctatc    660
ctgtgcccat cctcgcccgc tcccgctcgc cccagcacac gcacttacac tctgggtcgg   720
ccg                                                               723

<210> SEQ ID NO 28
```

```
<211> LENGTH: 440
<212> TYPE: DNA
<213> ORGANISM: Homo sapiens

<400> SEQUENCE: 28
cggtgcgtgg gtccaggaga gaaagaaagc gcggcggtgt cggtggcggc gcgcggcccc      60
actcaccatg atccgcagcg gctgtggcgc ggcgacccgg gcgggcggcg atgcgctgtc     120
cagggtagcc gggtccctct gcccggcgct atctcggcgc ccgcgccggt tacccccacc     180
cacacccacg cccggcgcgc gcacacccgc ccgcgcctcc ccgcccccct gggctcgcgc     240
cgccgccgcg cggcgctccg agcctcgggg ccgtttcgtc cccgcccct ctcccacagg      300 ggcctcgccg gccgccgcgc caggagggcg cgcggggag gggcgcaggg caagtgaggc      360
ggcgcccccc gcccctgcgg cctcgcgcgc cccctcctgg gcgaccgacc tcgccctcgc     420
gtccgcggcg tcccctgccg                                                 440

<210> SEQ ID NO 29
<211> LENGTH: 206
<212> TYPE: DNA
<213> ORGANISM: Homo sapiens

<400> SEQUENCE: 29
cggcacgtgc gtagcgagtg ccgcgtcgac caggggcgcg tcgtcccgca gctgcaggcg      60
gaggctgcgc gtcagcggcg ggaagagctc acgaagctc agctgctcgt tccattcggg      120
cgccgccgcc tcggcgctca ccgacgtctc gccctgaagg tggcgttaaa gacaggagaa     180
gggagatcag cgcggagtcg gggccg                                          206

<210> SEQ ID NO 30
<211> LENGTH: 71
<212> TYPE: DNA
<213> ORGANISM: Homo sapiens

<400> SEQUENCE: 30
cggcaggggc ggcggatccg tggcgaggcg ggaaccaggg ctagaggagg tgggctctta      60
tgtcgggggg c                                                          71

<210> SEQ ID NO 31
<211> LENGTH: 318
<212> TYPE: DNA
<213> ORGANISM: Homo sapiens

<400> SEQUENCE: 31
cggagcccag gaacatagtc cccgctggct agcggcggca gcagcagcag cggggcccct      60
gcgcgcggcg cccaccgtct cctcctcgcg ccgggctcgc ggtgttgcag gcggcagcca     120
cgcagactgc tctctcatcc ttttgtcctt cagtcagaac gtgaatgtac tgctgacgca     180
tactgttctg ggagaagatt agcgtgatgc agtgctctta tgtattagcg ccgctccccc     240
tccgtcgcct gcctcgcggg gttaacgccg gcgccttcca gcgccgcgcc ggccggcgcc     300
gcgcagcccc gcgcctcc                                                   318

<210> SEQ ID NO 32
<211> LENGTH: 57
<212> TYPE: DNA
<213> ORGANISM: Homo sapiens

<400> SEQUENCE: 32
cggtccccgc tcgccctccc gcccgcccac cgggcacccc agccgcgcag aaggcgg        57
```

<210> SEQ ID NO 33
<211> LENGTH: 72
<212> TYPE: DNA
<213> ORGANISM: Homo sapiens

<400> SEQUENCE: 33
cggcctcgct cgcttgctcg ctcgcccgcc cttgcccgct cgctcccgc ccgccgcctc    60 cctcgcgcgc cc                                                       72

<210> SEQ ID NO 34
<211> LENGTH: 99
<212> TYPE: DNA
<213> ORGANISM: Homo sapiens

<400> SEQUENCE: 34
gccatattga aactggcacg gtttctaaag actccttccc cgcagttgtg gcgcttccaa    60
gaaaacacga gtacggatca ggctctggat gagtgtccg                          99

<210> SEQ ID NO 35
<211> LENGTH: 424
<212> TYPE: DNA
<213> ORGANISM: Homo sapiens

<400> SEQUENCE: 35
gcacgcatat taaaaataa actccagaac cagctcaagt cagcaatttt gaaaggggt     60 cgaataagag gagacaaccg gaaagcccct aagtgacagg atattacttt aaagagaaaa   120
taatgaacaa aaagaccatc ctcgctggag cacgctccaa aactactact gccaattta    180 tttcagttgc tcaggcaaat gtttccaagg gagcgattcc gaatgtctgc acgatttta    240 cccccatgcc ggtctccgat tccccgtcct caccatcttt ttctcccacc caaaccaaaa   300
gaaaggggag accccagcgc ggaggagacg cgggagcgcg gggtaggtag cagcggcggc   360
tgcgtcgcta aaatgagtgc agaaacgagg aaggtgggcg cgggagggg acaggctgcg    420 cccg                                                              424

<210> SEQ ID NO 36
<211> LENGTH: 590
<212> TYPE: DNA
<213> ORGANISM: Homo sapiens

<400> SEQUENCE: 36
cggcgtgtcg ccatcgttca gcctcgctgc ccaggtggga ggggtcacct gccgcggggt    60
ctccaagcca gtgccgcttg ctcccggccc ccacccactg acagcacggc gtccgagtga   120
ccctgtctag cctcgttctg cgctcctgca aaccacgttg ctgcgctaac tacaaacctg   180
gccaacatgt ctttgtaacc ctatcattta aaaacgcttc caggcacctg gccgctgcca   240
gatcaggttc gcgggcccgg aggaggtcct cccacctgcc ccgccagcc cggggaccg    300 tgcgcggcct ccgtgtggcc cccgcccacg aggtccctcg ggcaggaacc gccgcgcgac   360
ctctgttcag cggccgcgtc ctggccacgg gcgaccctg tcgggaaccc tgttcccggc    420
taagctgcgt tcccgcattc cggtggctct cacccgagct cgcgtttgct ggctttccct   480
ctggctcctc tgcctgaccc cgatttgtc tccgaactcc actcccagat cctccccgcc    540
ctggaacgcc gaccttttccc ccgcacttcg ccgcccactc acatccccg              590

<210> SEQ ID NO 37

-continued

```
<211> LENGTH: 93
<212> TYPE: DNA
<213> ORGANISM: Homo sapiens

<400> SEQUENCE: 37
cgggagaagg ctcggctccc tcctaaacat gtggcccgtg gcgtcccctt gtccctccg      60 agcgatgctc ctgcgccctt cgccgcctcc cgc                                  93

<210> SEQ ID NO 38
<211> LENGTH: 363
<212> TYPE: DNA
<213> ORGANISM: Homo sapiens

<400> SEQUENCE: 38
cggaggagct gcgcggacgc agcggcttcc aggccacccc accccgcgcc agcctgcacc      60
tgtgccgcct gggtgtcttc cccgagactc tggtactgtg aagggtccgg gtcgcgcggg     120
gcgtcgtccg gagcagggcg gactcgggct ttggcgcggc cttttgcccg gttttttggcg    180 cgggaggact ttcgaccccg acttcggccg ctcatggtgg cggcggaggc agcttcaaag     240
acacgctgtg accctgcggc tcctgacgcc agctctcggt cgggaccgag cgggtctctc     300
cacggcaacc gccgacgtca cgaacgtaca actgtaccgt cgcgagagga cgtgatgcgc     360
ccg                                                                   363

<210> SEQ ID NO 39
<211> LENGTH: 72
<212> TYPE: DNA
<213> ORGANISM: Homo sapiens

<400> SEQUENCE: 39
cgcgcgggat cgagggagca ggagccgcgg ctgacgggtc gcgggcgccg cgctaggctc      60
ggctccggtc cc                                                         72

<210> SEQ ID NO 40
<211> LENGTH: 88
<212> TYPE: DNA
<213> ORGANISM: Homo sapiens

<400> SEQUENCE: 40
cggaagttga gtggggccgc ggggcctgct gggaggtgtt gtcctcggaa acgtcgctgg      60
cgcggaggga tggttcggcg ctttaggc                                        88

<210> SEQ ID NO 41
<211> LENGTH: 169
<212> TYPE: DNA
<213> ORGANISM: Homo sapiens

<400> SEQUENCE: 41
cggaagttga gtggggccgc ggggcctgct gggaggtgtt gtcctcggaa acgtcgctgg      60
cgcggaggga tggttcggcg ctttaggcgt ctgtcacaga cctatctgcg ggtcgccttc    120
acccagcatc tcagaaactg cgcgcgggat gaacattcgg gtgtttccg                169

<210> SEQ ID NO 42
<211> LENGTH: 287
<212> TYPE: DNA
<213> ORGANISM: Homo sapiens

<400> SEQUENCE: 42
cggggccaca ctcagccaga cgaatgtctg gcaaatgaca gtcacttcac gccagactct      60
```

-continued

```
cacagtcctt cacacgccac tcccactgcc tcagggaacc acaagcacag gcatcgcccc      120
gcccggcgtc ctcctccaaa gattggggca ccaggaccgc gggcccccac tcccacccag      180
cacaaagagt ccggcgctca gagctagcgg tttcccgagg actcaccacc aagcccgcgg      240
acacaggccc cgattccaca cttaacgctg ccaaagtggc agagccg                    287
```

<210> SEQ ID NO 43
<211> LENGTH: 511
<212> TYPE: DNA
<213> ORGANISM: Homo sapiens

<400> SEQUENCE: 43

```
cggaagcgga tcgcgtgggt agaaggtcac accgcagcgc gtcagtttcc ctttgtttag       60
attcaatctg ggcttcccag ctcccccgcg cttctgtacc cgggatctga gagtcaacac      120
agaccttgaa atccccgcac cgctccctcc accccgtgta aattcaggcg tctccgtgag      180
agtccggcgc tcgcttccct gtgtgttaaa atcgctcggc gacgggtcct gtccccgctc      240
gttctgcctt gggccaggta aacacggatt ttcgagactc ctttccgctt aaaactcttt      300
actgacccaa cgtcctgccc cgcgctttta aaagtcctta ccgcaaggtg gattcccgcc      360
cggggagcct cccaacctcg cccccggccc ctgaagcgca gcgccgcagc cccagtcccg      420 gcggggagg ccgcgtcctg tactgggtcc tgggacccct gagacccac acttctaata       480 attcagcccc acccttttcc tccttgatcc g                                     511
```

<210> SEQ ID NO 44
<211> LENGTH: 146
<212> TYPE: DNA
<213> ORGANISM: Homo sapiens

<400> SEQUENCE: 44

```
cgggagcggc aggcgtctcg atcggggacg caggcacttc cgtccctgca gagcatcaga       60
cgcgtctcgg gacactgggg acaacatctc ctccgcgctt tcccaacacc tccacctgcg      120
gcccacacaa gcgttacaga accccg                                           146
```

<210> SEQ ID NO 45
<211> LENGTH: 128
<212> TYPE: DNA
<213> ORGANISM: Homo sapiens

<400> SEQUENCE: 45

```
cgggatcaca gcacttccca cgcacaaacc acacacgggg tctggactct gccctgagga       60
cgcttccatt gtccccgcag tcggggcaga cgcaagaacg cgcgcggctc ttcccagggt      120
gggctccg                                                               128
```